(12) United States Patent
Kato et al.

(10) Patent No.: US 7,962,533 B2
(45) Date of Patent: Jun. 14, 2011

(54) INFORMATION PROCESSING APPARATUS, INFORMATION PROCESSING METHOD, PROGRAM RECORDING MEDIUM, COMPUTER PROGRAM, DATA STRUCTURE, AND MANUFACTURING METHOD OF RECORDING MEDIUM

(75) Inventors: Motoki Kato, Kanagawa (JP); Yoshiyuki Kobayashi, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 11/686,544

(22) Filed: Mar. 15, 2007

(65) Prior Publication Data
US 2007/0220021 A1  Sep. 20, 2007

(30) Foreign Application Priority Data
Mar. 20, 2006 (JP) ................................. 2006-077123

(51) Int. Cl.
*G06F 7/00* (2006.01)
(52) U.S. Cl. ............. 707/831; 707/E17.009; 707/E17.01
(58) Field of Classification Search .................. 707/100, 707/104.1, E17.009, E17.01, 999.1, 831; 369/30.03–30.09
See application file for complete search history.

(56) References Cited

U.S. PATENT DOCUMENTS

| | | | |
|---|---|---|---|
| 5,475,668 A | 12/1995 | Azumatani et al. | 369/47.14 |
| 6,580,870 B1 * | 6/2003 | Kanazawa et al. | 386/95 |
| 2002/0048448 A1 * | 4/2002 | Daniels | 386/40 |
| 2004/0126095 A1 * | 7/2004 | Tsumagari et al. | 386/95 |
| 2005/0105894 A1 * | 5/2005 | Jung et al. | 386/96 |
| 2005/0196155 A1 * | 9/2005 | Yoo et al. | 386/126 |
| 2006/0077773 A1 * | 4/2006 | Seo et al. | 369/30.09 |

FOREIGN PATENT DOCUMENTS

| | | |
|---|---|---|
| JP | 2005-122888 | 5/2005 |
| JP | 2005-159589 | 6/2005 |

OTHER PUBLICATIONS

U.S. Appl. No. 12/905,818, filed Oct. 15, 2010, Kobayashi et al.

* cited by examiner

*Primary Examiner* — Tim T. Vo
*Assistant Examiner* — Shiow-Jy Fan
(74) *Attorney, Agent, or Firm* — Oblon, Spivak, McClelland, Maier & Neustadt, L.L.P.

(57) ABSTRACT

An information processing apparatus includes a reading unit for reading data from a recording medium, a storage unit for storing a variety of types of data, and a control unit for controlling setting of a directory structure when a first data group recorded on a first recording medium and a second data group recorded on the storage unit are recorded on a second recording medium different from the first recording medium. The control unit includes a first detecting unit for detecting the directory structure of the first data group recorded on the first recording medium, a second detecting unit for detecting the directory structure of the second data group stored on the storage unit, and a setting unit for setting the directory structure in accordance with which the first data group read by the reading unit from the first recording medium and the second data group stored on the storage unit are recorded on the second recording medium directory.

11 Claims, 33 Drawing Sheets

FIG. 12

| DATA STRUCTURE | NUMBER OF BITS | MNEMONIC DENOTATION |
|---|---|---|
| Manifest() | | |
| { | | |
| manifest_id | 8 | uimsbf |
| author_id | 8 | uimsbf |
| disc_id | 8 | uimsbf |
| permission | 8 | uimsbf |
| src_file_name | 8*1024 | bslbf |
| dst_file_name | 8*1024 | bslbf |
| credential | 8 | uimsbf |
| } | | |

FIG. 13

| VALUE | MEANING |
|---|---|
| 0x00 | ATTRIBUTE INVISIBLE (TO USER) |
| 0x01 | ATTRIBUTE VISIBLE (TO USER) |
| 0x02 | OVERWRITE INHIBIT ATTRIBUTE |

FIG. 18

| DATA STRUCTURE | NUMBER OF BITS | MNEMONIC DENOTATION |
|---|---|---|
| File_package() | | |
| { | | |
|   Package_header() | | |
|   { | | |
|     compression_type | 8 | uimsbf |
|     encryption_type | 8 | uimsbf |
|   } | | |
|   Package_Body() | | |
|   { | | |
|     file_count | 16 | uimsbf |
|     for(i=0;i<file_count;i++) | | |
|     { | | |
|       Manifest() | | |
|       { | | |
|         manifest_id | 8 | uimsbf |
|         author_id | 8 | uimsbf |
|         disc_id | 8 | uimsbf |
|         permission | 8 | uimsbf |
|         src_file_name | 8*1024 | bslbf |
|         dst_file_name | 8*1024 | bslbf |
|         credential | 8 | uimsbf |
|       } | | |
|       File() | | |
|       { | | |
|         file_size | 32 | uimsbf |
|         for(j=0;j<file_size;j++) | | |
|         { | | |
|           file_data | 8 | bslbf |
|         } | | |
|       } | | |
|     } | | |
|   } | | |
| } | | |

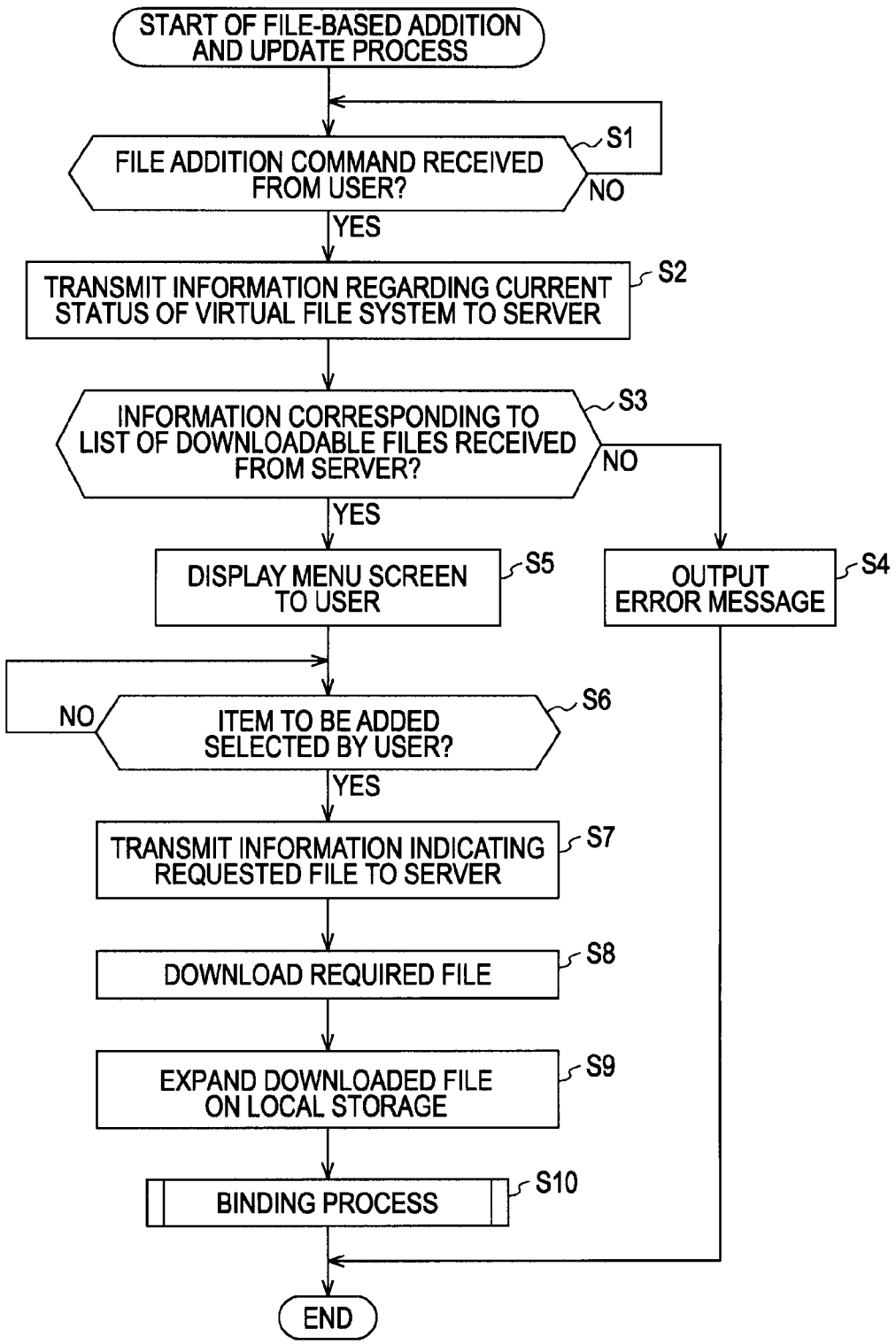

INFORMATION PROCESSING APPARATUS, INFORMATION PROCESSING METHOD, PROGRAM RECORDING MEDIUM, COMPUTER PROGRAM, DATA STRUCTURE, AND MANUFACTURING METHOD OF RECORDING MEDIUM

CROSS REFERENCES TO RELATED APPLICATIONS

The present invention contains subject matter related to Japanese Patent Application JP 2006-077123 filed in the Japanese Patent Office on Mar. 20, 2006, the entire contents of which are incorporated herein by reference.

BACKGROUND OF THE INVENTION

1. Field of the Invention

The present invention relates to an information processing method, an information processing apparatus, a program storage medium, a computer program, a data structure and a manufacturing method of a recording medium and in particular to an information processing method, an information processing apparatus, a program storage medium, a computer program, a data structure and a manufacturing method of a recording medium, appropriate for recording a variety of data such as content and supplying users with the data.

2. Description of the Related Art

Japanese Unexamined Patent Application Publication No. 2005-159589 discloses a technique for downloading an update file for content recorded on a recording medium and reproducing the content together with the update file.

A user can download an update file on a reproducing apparatus having a recording medium loaded thereon in accordance with the known technique. For example, if the content recorded on the recording medium is a movie having an original English caption, the user can enjoy the movie with a Japanese caption displayed instead of the original English caption.

Japanese Unexamined Patent Application Publication No. 2005-122888 discloses another technique that allows a plurality of related data units to be reproduced from a single disk.

SUMMARY OF THE INVENTION

The technique disclosed in Japanese Unexamined Patent Application Publication No. 2005-159589 does not allow the update file to be used on a reproducing apparatus other than the reproducing apparatus that has downloaded the update file. The user may wish to reproduce a movie on a recording medium with a Japanese caption originally not recorded on a recording medium on a different reproducing apparatus. In this case, the user needs to download the update file on that apparatus as well.

Using the technique disclosed in Japanese Unexamined Patent Application Publication No. 2005-122888, an audio-visual (AV) stream is then read from a disk or any other recording medium that has recorded audio data, video data, and image data (such Joint Photographic Experts Group (JPEG) data). In this process, an animation composed of the plurality of still images at the predetermined frame rate may be reproduced in synchronization with the AV stream. Depending on data reading rate of the reproducing apparatus, the AV stream and the still image cannot be read to within a reproducing rate. A priority may be placed on the playing of the AV stream rather than the still image, and the reading of a still image data file from the recording medium such as a disk may be lowered. Depending on the rate setting of the AV stream, the still image data file may not be read at all.

The frame rate requirement on the playing of the animation cannot be satisfied, leading to judder in the displaying of the animation. At the worst case, image tearing occurs, for example, one quarter of a screen shows a current image while the remaining three quarters of the screen show a previous image.

It is desirable to record content recorded on a recording medium and an update file stored on a reproducing apparatus on a single recording medium and then to reproduce the recorded data from the single recording medium, and to record additionally update data on the recording medium having recorded the content.

It is also desirable to copy a portion of data on a recording medium loaded on an apparatus to a recording unit in the apparatus and to reproduce the copied data in accordance with the content.

In accordance with one embodiment of the present invention, an information processing apparatus includes a reading unit for reading data from a recording medium loaded, a storage unit for storing a variety of types of data, a control unit for controlling setting of a directory structure when a first data group recorded on a first recording medium loaded and a second data group recorded on the storage unit are recorded on a second recording medium different from the first recording medium. The control unit includes a first detecting unit for detecting the directory structure of the first data group recorded on the first recording medium, a second detecting unit for detecting the directory structure of the second data group recorded on the storage unit, and a setting unit for setting the directory structure in accordance with which the first data group read by the reading unit from the first recording medium and the second data group stored on the storage unit are recorded on the second recording medium. The setting unit sets the directory structure on the second recording medium by setting a first directory with the directory structure of the first data group detected by the first detecting unit maintained, and by setting a second directory in parallel with the first directory so that the directory structure of the second data group detected by the second detecting unit is contained in the second directory.

The reading unit may read, from the first recording medium, identification information for use in uniquely identifying the first recording medium, and the second data group may be recorded in a directory identifiable by the identification information on the storage unit.

The information processing apparatus may further includes a recording unit for recording, on the second recording medium loaded, the first data group and the second data group with the setting of the directory structure thereof controlled by the control unit.

The reading unit may read, from the first recording medium, identification information for use in uniquely identifying the first recording medium, and the recording unit may record on the second recording medium the identification information read by the reading unit.

The storage unit may store thereon file management information, the file management information containing first information indicating a path of a file in the directory structure of the second data group stored on the storage unit, and second information indicating a path of a file in a virtual file system of the second data group. The control unit may control the setting of the directory structure in accordance with which the file management information is recorded on the second recording medium together with the first data group and the second data group.

The reading unit may read from the second recording medium loaded, the first data group, the second data group and file management information. The file management information may contains first information indicating a path of a file in the directory structure of the second data group stored on the storage unit, and second information indicating a path of a file in a virtual file system of the second data group. The control unit may include a storage control unit for controlling storage of the second data group, read by the reading unit from the second recording medium, onto the storage unit, and a virtual file system generating unit for generating the virtual file system, containing at least a portion of each of the first data group and the second data group, in accordance with the directory structure of the first data group detected by the first detecting unit and the file management information read by the reading unit from the second recording medium.

The information processing apparatus may further includes a reproducing unit for reproducing, in accordance with the virtual file system generated by the virtual file system generating unit, the first data group read by the reading unit and the second data group that is stored on the storage unit under the control of the storage control unit.

The information processing apparatus may further include an output unit for outputting the first data group and the second data group with the directory structures thereof set under the control of the control unit.

In accordance with one embodiment of the present invention, each of an information processing method and a program of an information processing apparatus sets a directory structure in accordance with which a first data group recorded on a first recording medium loaded and a second data group recorded on a storage unit are recorded on a second recording medium. One of information processing method and the program includes steps of setting a first directory with a directory structure of the first data group recorded on the first recording medium loaded maintained therewithin, setting a second directory in parallel with the first directory, the second directory containing data to be copied to a recording unit of the apparatus that reproduces data recorded on the second recording medium, and setting the directory structure so that the second data group read from the storage unit is contained in the second directory.

In accordance with embodiments of the present invention, the first directory maintaining the directory structure of the first data group recorded on the first recording medium loaded is set up, and the second directory is set up in parallel with the first directory. The second directory has the directory structure in which the second data group read from the storage unit is contained in the second directory.

In accordance with one embodiment of the present invention, an information processing apparatus for recording a second data group on a recording medium having recorded a first data group, includes an acquisition unit for acquiring the second data group, a first detecting unit for detecting a directory structure of the first data group recorded on the recording medium, a second detecting unit for detecting a directory structure of the second data group acquired by the acquisition unit, a setting unit for setting a directory structure in accordance with which the first data group and the second data group are recorded on the recording medium, and a recording control unit for controlling recording of the second data group on the recording medium in accordance with the directory structure set by the setting unit. The setting unit sets the directory structure of the recording medium in accordance with which the first data group and the second data group are recorded, by setting a first directory with the directory structure of the first data group detected by the first detecting unit maintained, and by setting a second directory in parallel with the first directory so that the directory structure of the second data group detected by the second detecting unit is contained in the second directory.

The information processing apparatus may further include an encode unit for encoding the second data group acquired by the acquisition unit, wherein the recording control unit controls the recording of the second data group encoded by the encode unit on the recording medium.

The second detecting unit may generate file management information, the file management information containing first information and second information, the first information indicating a path of a file in a file system when the second data group is stored, on a storage unit in the apparatus that reproduces data from the recording medium, in accordance with the directory structure of the second data group detected, and the second information indicating a path of a file in a virtual file system of the second data group. The setting unit may set the directory structure so that the file management information generated by the second detecting unit contained in the second directory. The virtual file system may include at least a portion of each of the first data group and the second data group and may be referenced when the first data group and the second data group are reproduced in the apparatus.

In accordance with one embodiment of the present invention, one of an information processing method and a program of an information processing apparatus recording a second data group on a recording medium having recorded a first data group, includes steps of acquiring the second data group, setting a second directory in parallel a first directory of the first data group recorded on the recording medium, the second directory recording data to be copied to a recording unit of the apparatus that reproduces data recorded on the recording medium, and recording the second data group in the second directory.

In accordance with embodiments of the present invention, the second data group is acquired, the second data group is acquired, the second directory is set up in parallel with the first directory of the first data group recorded on the recording medium, and the second data group is recorded in the second directory.

In accordance with one embodiment of the present invention, an information processing apparatus for setting a directory structure in accordance with which a first data group and a second data group are recorded on a predetermined recording medium, includes a first acquisition unit for acquiring the first data group, a second acquisition unit for acquiring the second data group, a first detecting unit for detecting a directory structure of the first data group acquired by the first acquisition unit, a second detecting unit for detecting a directory structure of the second data group acquired by the second acquisition unit, and a setting unit for setting the directory structure in accordance with which the first data group and the second data group are recorded on the predetermined recording medium. The second setting unit sets the directory structure of the predetermined recording medium by setting a first directory with the directory structure of the first data group detected by the first detecting unit maintained, and by setting a second directory in parallel with the first directory so that the directory structure of the second data group detected by the second detecting unit is contained in the second directory.

The information processing apparatus may further include a recording control unit for controlling recording of the first data group and the second data group on the predetermined recording medium in accordance with the directory structure set by the setting unit.

The second detecting unit may generate file management information, the file management information containing first information and second information, the first information indicating a path of a file in a file system when the second data group is stored, on a storage unit in the apparatus that reproduces data from the predetermined recording medium, in accordance with the directory structure of the second data group detected, and the second information indicating a path of a file in a virtual file system of the second data group. The setting unit may set the directory structure in recording on the predetermined recording medium so that the file management information generated by the second detecting unit contained in the second directory. The virtual file system may include at least a portion of each of the first data group and the second data group and is referenced when the first data group and the second data group are reproduced from the predetermined recording medium in the apparatus.

In accordance with one embodiment of the present invention, one of an information processing method and a program of an information processing apparatus for setting a directory structure in accordance with which a first data group and a second data group are recorded on a predetermined recording medium, includes steps of acquiring the first data group, acquiring the second data group, setting a first directory with the directory structure of the first data group maintained, and setting a second directory in parallel with the first directory, the second directory containing data to be copied to a recording unit of the apparatus that reproduces data recorded on the recording medium.

In accordance with embodiments of the present invention, the first data group is acquired, the second data group is acquired, the first directory having the directory structure of the first data group maintained is set up, and the second directory recording the second data group is set up in parallel with the first directory.

In accordance with one embodiment of the present invention, an information processing apparatus for reproducing data recorded on a recording medium loaded, includes a reading unit for reading the data recorded on the recording medium loaded, a storage unit for storing a variety of types of data, a reproducing unit for reproducing the data recorded on the recording medium and data stored on the storage unit, and a control unit for controlling management of each of the reading unit, the storage unit, and the reproducing unit. The recording unit records at least a first data group in a first directory, and records, as necessary, a second data group and file management information in a second directory distinguishable from the first directory. The file management information contains first information indicating a path of a file in the file system of the second data group stored on the storage unit, and second information indicating a path of a file in a virtual file system of the second data group. The control unit includes a storage control unit for controlling storage of data contained in the second directory on the storage unit when the second directory is recorded on the recording medium, a detecting unit for detecting a first directory structure of the first data group recorded on the recording medium, a virtual file system generating unit for generating the virtual file system, containing at least a portion of each of the first data group and the second data group, in accordance with the directory structure of the first data group detected by the first detecting unit and the file management information stored on the storage unit under the control of the storage control unit, and a reproducing control unit for controlling reproducing of the first data group read by the reading unit and the second data group stored on the storage unit under the control of the storage control unit, in accordance with the virtual file system generated by the virtual file system generating unit.

The reading unit may read, from the recording medium, identification information for use in uniquely identifying the recording medium, and the storage control unit may control storage of data, contained in the second directory, on a directory identifiable by the identification information on the storage unit.

In accordance with one embodiment of the present invention, one of an information processing method and a program of an information processing apparatus for reproducing data recorded on a recording medium loaded, includes steps of determining whether data is recorded on the recording medium using a second directory having recorded a second data group and file management information, the second directory being different from a first directory having recorded a first data group, controlling storage of the data contained in the second directory on an internal storage unit if the data is determined to be recorded on the recording medium, generating a virtual file system containing at least a portion of each of the first data group and the second data group, in accordance with file management information and a directory structure of the first directory, the file management information containing first information and second information, the first information indicating a path of a file in the file system of the second data group stored on the storage unit, and the second information indicating a path of a file in a virtual file system of the second data group, and reproducing the first data group and the second data group, the second data group stored on the storage unit in a controlled manner, in accordance with the virtual file system.

In accordance with embodiments of the present invention, whether data is recorded on the recording medium is determined using the second directory having recorded the second data group and the file management information, the second directory being different from the first directory having recorded the first data group. The storage of the data contained in the second directory on a storage unit is controlled if the data is determined to be recorded the recording medium. The virtual file system containing at least the portion of each of the first data group and the second data group is generated in accordance with file management information and the directory structure of the first directory, the file management information containing the first information and the second information, the first information indicating the path of the file in the file system of the second data group stored on the storage unit, and the second information indicating the path of the file in the virtual file system of the second data group. The first data group and the second data group, which has been stored on the storage unit in a controlled manner are reproduced in accordance with the virtual file system.

In accordance with one embodiment of the present invention, an information processing apparatus for reproducing data recorded on a recording medium loaded, includes a reading unit for reading the data recorded on the recording medium loaded, a reproducing unit for reproducing the data recorded on the recording medium, and a control unit for controlling the reading unit and the reproducing unit. The recording medium records at least a first data group in a first directory, and records, as necessary, a second data group and first file management information in a second directory distinguishable from the first directory. The file management information contains first information indicating a path of a file of the second data group recorded on the recording medium under the second directory and second information indicating a path of a file in a virtual file system of the second data group. The control unit includes a first detecting unit for detecting a first directory structure of the first data group recorded on the recording medium, a virtual file system generating unit for generating a first virtual system, containing at least a portion of each of the first data group and the second data group, in accordance with the directory structure of the first data group detected by the first detecting unit and the first file management information recorded on the recording medium, when the second directory is recorded on the recording medium, and a reproducing control unit for controlling reproducing of the first data group and the second data group in accordance with the first virtual file system generated by the virtual file system generating unit.

The information processing apparatus may further include a storage unit for storing a third data group and second file management information. The second file management information contains third information and fourth information, the third information indicating, on the storage unit, a path of a file of the third data group recorded on the recording medium, and the fourth information indicating a path of a file in a virtual file system of the third data group. The reproducing unit reproduces data contained in the third data group stored on the storage unit. The control unit generates a second virtual file system containing a portion of each of the first data group, the second data group, and the third data group in accordance with the first virtual file system, and the second file management information stored on the storage unit, and controls reproducing of the first data group, the second data group, and the third data group in accordance with the second virtual file system generated by the virtual file system generating unit.

In accordance with embodiments of the present invention, one of an information processing method and a program of an information processing apparatus for reproducing data recorded on a recording medium loaded, includes steps of determining whether data is recorded on the recording medium using a second directory having recorded a second data group and file management information, the second directory being different from a first directory having recorded a first data group, if the data is determined to be recorded on the recording medium, generating a virtual file system containing at least a portion of each of the first data group and the second data group, in accordance with the file management information and the directory structure of the first directory, the file management information containing first information and second information, the first information indicating a path of a file in the file system of the second data group stored on the recording medium under the second directory, and the second information indicating a path of a file in a virtual file system of the second data group, and reproducing the first data group and the second data group in accordance with the virtual file system.

In accordance with embodiments of the present invention, whether data is recorded on the recording medium is determined using the second directory having recorded a second data group and file management information, the second directory being different from the first directory having recorded the first data group. If the data is determined to be recorded on the recording medium, the virtual file system containing at least the portion of each of the first data group and the second data group is generated in accordance with the file management information and the directory structure of the first directory, the file management information containing first information and second information, the first information indicating the path of the file in the file system of the second data group stored on the recording medium under the second directory, and the second information indicating the path of the file in the virtual file system of the second data group. The first data group and the second data group are reproduced in accordance with the virtual file system.

In accordance with one embodiment of the present invention, a data structure of data to be supplied to an information processing apparatus, includes a first data group contained in a first directory, and a second data group and file management information contained in a second directory distinguishable from the first directory. The file management information contains first information and second information, the first information indicating a path of a file in a file system in accordance with which the second data group is recorded on a recording unit of the information processing apparatus, and the second information indicating a path of a file of the second data group in a virtual file system, the virtual file system containing at least a portion of each of the first data group and the second data group, and being referenced when the first data group and the second data group are reproduced on the information processing apparatus.

In accordance with one embodiment of the present invention, a method of manufacturing a recording medium recording data to be supplied to an information processing apparatus, includes steps of generating the data to be supplied to the information processing apparatus, and recording the generated data on the recording medium. The data having the data structure including a first data group contained in a first directory, and a second data group and file management information contained in a second directory distinguishable from the first directory. The file management information contains first information and second information, the first information indicating a path of a file in a file system in accordance with which the second data group is recorded on a recording unit of the information processing apparatus, and the second information indicating a path of a file of the second data group in a virtual file system, the virtual file system containing at least a portion of each of the first data group and the second data group, and being referenced when the first data group and the second data group are reproduced on the information processing apparatus.

In accordance with one embodiment of the present invention, the first data group is contained in the first directory, and the second data group and the file management information are contained in a second directory distinguishable from the first directory. The file management information contains the first information and the second information, the first information indicating a path of the file in the file system in accordance with which the second data group is recorded on the recording unit of the information processing apparatus, and the second information indicating the path of the file of the second data group in the virtual file system, the virtual file system containing at least the portion of each of the first data group and the second data group, and being referenced when the first data group and the second data group are reproduced on the information processing apparatus.

Network refers to a mechanism that connects at least two apparatuses to each other so that information is exchanged between one apparatus and the other apparatus. The apparatuses communicating with each other via the network may be independent of each other or may be blocks arranged in a single apparatus.

Communications refers to wireless communication, wired communication, or a combination thereof. For example, wired communication performed in one area and wireless communication performed in another area may be combined. Furthermore, wired communication may be performed between a first apparatus and a second apparatus, and wireless communication may be performed between the second apparatus and a third apparatus.

The recording device may be an independent device or a block for performing a recording process in the recording and reproducing apparatus. The reproducing apparatus may be an independent apparatus or a block for performing a reproducing process in the recording and reproducing apparatus.

In accordance with embodiments of the present invention, the directory structure in accordance with which information is recorded on the recording medium is set. The directory structure is arranged so that the first data group recorded on the first recording medium loaded and the second data group stored inside are recorded in different directories on the second recording medium.

In accordance with embodiments of the present invention, information is recorded on the recording medium. Particularly, the second data group is recorded on a directory different from the director of the first data group on the recording medium.

In accordance with embodiments of the present invention, the directory structure in accordance with which information is to be recorded on the recording medium is set. The first directory having the directory structure of the first data group maintained is set and the second directory having the second data group recorded therein is set in parallel with the first directory.

In accordance with embodiments of the present invention, data recorded on the recording medium loaded is reproduced. Since a portion of the data recorded on the recording medium loaded is copied to an internal memory and then reproduced, a reproducing rate higher than a reading rate from the recording medium is achieved.

In accordance with embodiments of the present invention, data recorded on the recording medium loaded is reproduced. Since the virtual file system is generated based on a file system of data in a different directory recorded on the recording medium loaded, a reproducing process is performed on the data, which is recorded on the recording medium in a format to achieve a reproducing speed higher than the reading speed from the recording medium, without copying a portion of the data to an internal memory.

In accordance with embodiments of the present invention, data provided has the data structure composed of the first data group and the second data group. Since the first data group and the second data group are arranged in different directories, a reproducing rate higher than a reading rate from the recording medium is achieved by recording the data in the data structure on the recording medium.

BRIEF DESCRIPTION OF THE DRAWINGS

FIG. 12 illustrates a syntax of a manifest file;

FIG. 13 illustrates values specifiable for permission contained Manifest ( );

FIG. 18 illustrates definition of a content delivery file format through which a content author delivers content;

FIG. 19 is a flowchart illustrating a file-based addition and update process;

DESCRIPTION OF THE PREFERRED EMBODIMENTS

Figure 1:
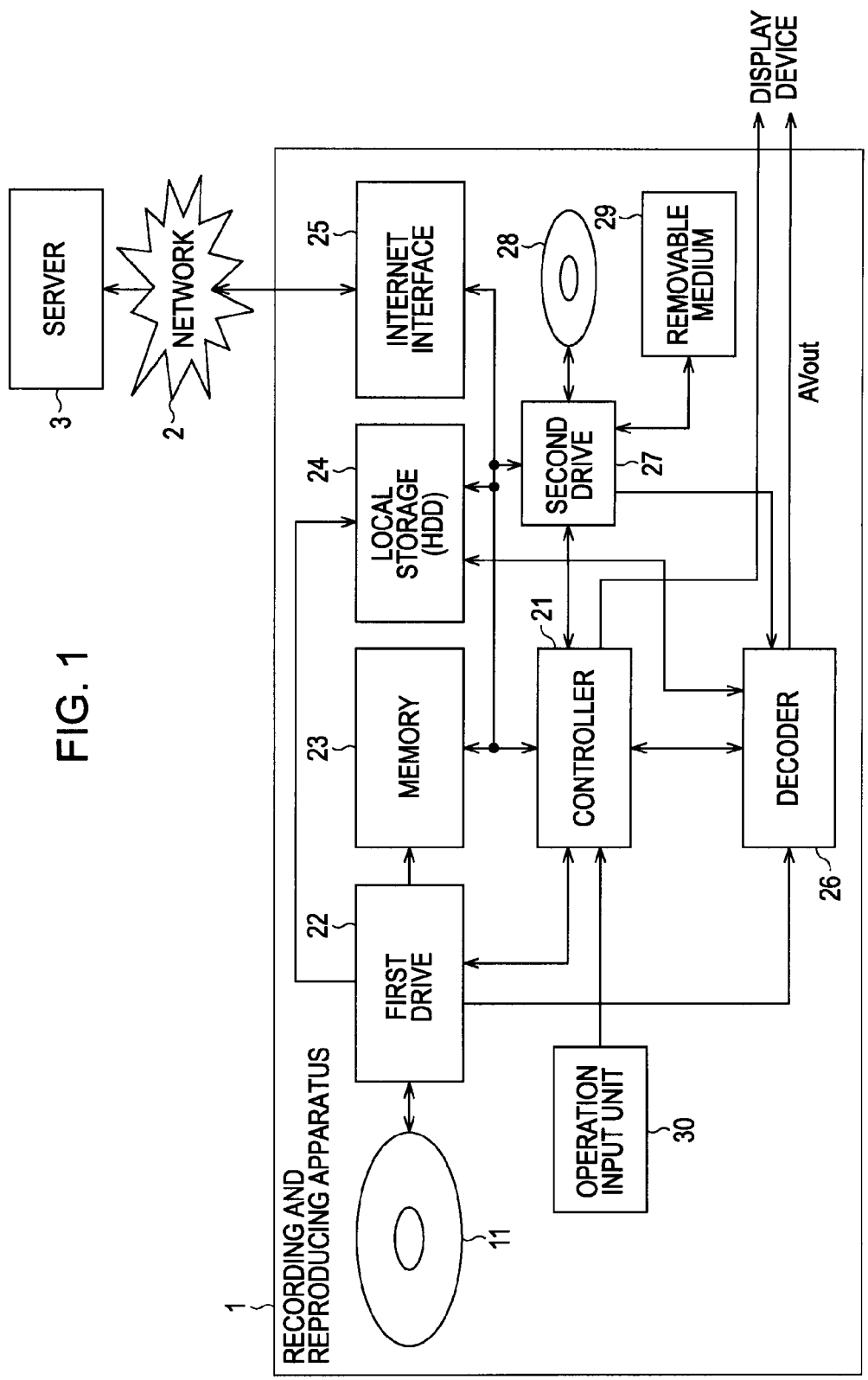
FIG. 1 is a block diagram of a reproducing apparatus.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

In accordance with one embodiment of the present invention, an information processing apparatus (for example, recording and reproducing apparatus 1 or recording and reproducing apparatus 71) includes a reading unit (for example, first drive 22) for reading data from a recording medium loaded, a storage unit (for example, local storage 24) for storing a variety of types of data, a control unit (for example, controller 21) for controlling setting of a directory structure when a first data group recorded on a first recording medium (for example, optical disk 11) loaded and a second data group recorded on the storage unit are recorded on a second recording medium (for example, optical disk 28) different from the first recording medium. The control unit includes a first detecting unit (for example, optical disk directory manager 64 of FIG. 25) for detecting the directory structure of the first data group recorded on the first recording medium, a second detecting unit (for example, local storage directory manager 63 of FIG. 25) for detecting the directory structure of the second data group recorded on the storage unit, and a setting unit (for example, copy data directory manager 65 of FIG. 25) for setting the directory structure in accordance with which the first data group read by the reading unit from the first recording medium and the second data group stored on the storage unit are recorded on the second recording medium. The setting unit sets the directory structure on the second recording medium by setting a first directory with the directory structure of the first data group detected by the first detecting unit maintained, and by setting a second directory in parallel with the first directory so that the directory structure of the second data group detected by the second detecting unit is contained in the second directory.

The reading unit may read, from the first recording medium, identification information (for example, author_id and disc_id) for use in uniquely identifying the first recording medium, and the second data group may be recorded in a directory identifiable by the identification information on the storage unit.

The information processing apparatus may further includes a recording unit (for example, second drive 27) for recording, on the second recording medium (for example, optical disk 28) loaded, the first data group and the second data group with the setting of the directory structure thereof controlled by the control unit.

The reading unit may read, from the first recording medium, identification information (for example, author_id and disc_id) for use in uniquely identifying the first recording medium, and the recording unit may record on the second recording medium the identification information read by the reading unit.

The storage unit may store thereon file management information (for example, manifest file), the file management information containing first information (for example, src_file_name) indicating a path of a file in the directory structure of the second data group stored on the storage unit, and second information (for example, dst_file_name) indicating a path of a file in a virtual file system of the second data group. The control unit may control the setting of the directory structure in accordance with which the file management information is recorded on the second recording medium together with the first data group and the second data group.

The reading unit may read from the second recording medium loaded, the first data group, the second data group and file management information (for example, manifest file). The file management information may contains first information (for example, src_file_name) indicating a path of a file in the directory structure of the second data group stored on the storage unit, and second information (for example, dst_file_name) indicating a path of a file in a virtual file system of the second data group. The control unit may include a storage control unit (for example, file copy controller 66 of FIG. 25) for controlling storage of the second data group, read by the reading unit from the second recording medium, onto the storage unit, and a virtual file system generating unit (for example, file system merge processor 36 of FIG. 8) for generating the virtual file system, containing at least a portion of each of the first data group and the second data group, in accordance with the directory structure of the first data group detected by the first detecting unit and the file management information read by the reading unit from the second recording medium.

The information processing apparatus may further includes a reproducing unit (for example, decoder 26 of FIG. 1) for reproducing, in accordance with the virtual file system generated by the virtual file system generating unit, the first data group read by the reading unit and the second data group that is stored on the storage unit under the control of the storage control unit.

The information processing apparatus may further include an output unit (for example, Internet interface 25) for outputting the first data group and the second data group with the directory structures thereof set under the control of the control unit.

In accordance with one embodiment of the present invention, each of an information processing method and a program of an information processing apparatus sets a directory structure in accordance with which a first data group recorded on a first recording medium (for example, optical disk 11) loaded and a second data group recorded on a storage unit are recorded on a second recording medium (for example, optical disk 28). One of information processing method and the program includes steps of setting a first directory with the directory structure of the first data group recorded on the first recording medium (for example, optical disk 11) loaded maintained therewithin (for example, in step S205 of FIG. 26), setting a second directory in parallel with the first directory, the second directory containing data to be copied to a recording unit of the apparatus that reproduces data recorded on the second recording medium (for example, in step S206 of FIG. 6), and setting the directory structure so that the second data group read from the storage unit (for example, local storage 24) is contained in the second directory (for example, in step S208 of FIG. 26).

In accordance with one embodiment of the present invention, an information processing apparatus for recording a second data group on a recording medium having recorded a first data group, includes an acquisition unit (for example, data acquisition unit 101 of FIG. 31) for acquiring the second data group, a first detecting unit (for example, optical disk directory manager 64 of FIG. 31) for detecting a directory structure of the first data group recorded on the recording medium, a second detecting unit (for example, acquired data directory manager 102 of FIG. 31) for detecting a directory structure of the second data group acquired by the acquisition unit, a setting unit (for example, recording data directory manger 103 of FIG. 31) for setting a directory structure in accordance with which the first data group and the second data group are recorded on the recording medium, and a recording control unit (for example, file recording controller 104 of FIG. 31) for controlling recording of the second data group on the recording medium in accordance with the directory structure set by the setting unit. The setting unit sets the directory structure of the recording medium in accordance with which the first data group and the second data group are recorded, by setting a first directory with the directory structure of the first data group detected by the first detecting unit maintained, and by setting a second directory in parallel with the first directory so that the directory structure of the second data group detected by the second detecting unit is contained in the second directory.

The information processing apparatus may further include an encode unit (for example, encoder 82 of FIG. 29) for encoding the second data group acquired by the acquisition unit, wherein the recording control unit controls the recording of the second data group encoded by the encode unit on the recording medium.

The second detecting unit may generate file management information (for example, manifest file), the file management information containing first information (for example, src_file_name) and second information (for example, dst_file_name), the first information indicating a path of a file in a file system when the second data group is stored, on a storage unit in the apparatus that reproduces data from the recording medium, in accordance with the directory structure of the second data group detected, and the second information indicating a path of a file in a virtual file system of the second data group. The setting unit may set the directory structure so that the file management information generated by the second detecting unit contained in the second directory. The virtual file system may include at least a portion of each of the first data group and the second data group and may be referenced when the first data group and the second data group are reproduced from the recording medium in the apparatus.

Figure 32:
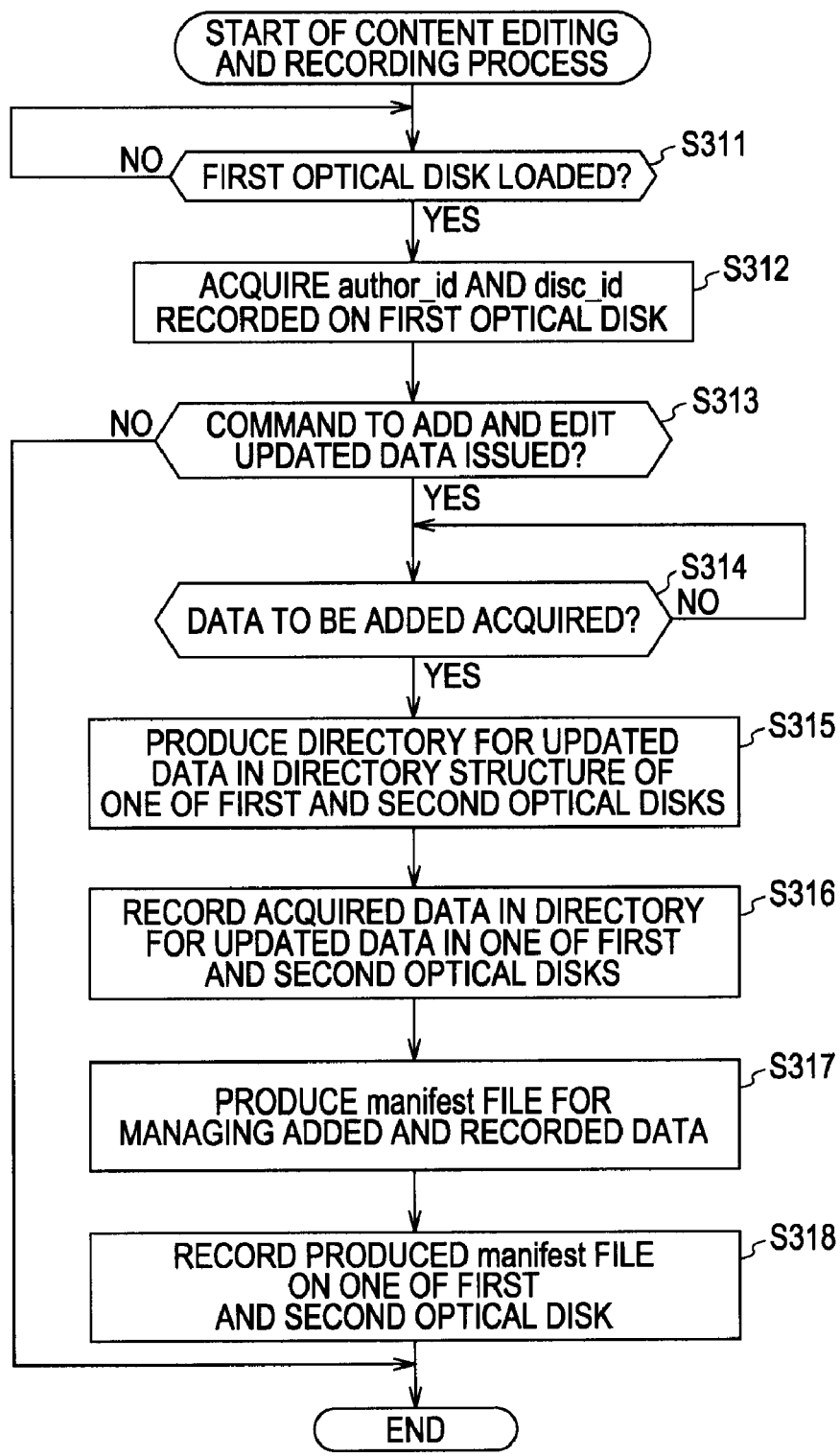
FIG. 32 is a flowchart illustrating content editing or recording process.

In accordance with one embodiment of the present invention, one of an information processing method and a program of an information processing apparatus recording a second data group on a recording medium having recorded a first data group, includes steps of acquiring the second data group (for example, in step S314 of FIG. 32), setting a second directory in parallel a first directory of the first data group recorded on the recording medium, the second directory recording data to be copied to a recording unit of the apparatus that reproduces data recorded on the recording medium (for example, in step S315 of FIG. 32), and recording the second data group in the second directory (for example, in step S316 of FIG. 32).

In accordance with one embodiment of the present invention, an information processing apparatus for setting a directory structure in accordance with which a first data group and a second data group are recorded on a predetermined recording medium, includes a first acquisition unit (for example, first drive 22) for acquiring the first data group, a second acquisition unit (for example, encoder 82 or data acquisition unit 101 of FIG. 31) for acquiring the second data group, a first detecting unit (for example, optical disk directory manager 64 of FIG. 31) for detecting the directory structure of the first data group acquired by the first acquisition unit, a second detecting unit (for example, acquired data directory manager 102 of FIG. 31) for detecting the directory structure of the second data group acquired by the second acquisition unit, and a setting unit (for example, recording data directory manager 103 of FIG. 31) for setting the directory structure in accordance with which the first data group and the second data group are recorded on the predetermined recording medium. The second setting unit sets the directory structure of the predetermined recording medium by setting a first directory with the directory structure of the first data group detected by the first detecting unit maintained, and by setting a second directory in parallel with the first directory so that the directory structure of the second data group detected by the second detecting unit is contained in the second directory.

The information processing apparatus may further include a recording control unit (for example, file recording controller 104 of FIG. 31) for controlling recording of the first data group and the second data group on the predetermined recording medium in accordance with the directory structure set by the setting unit.

The second detecting unit may generate file management information (for example, manifest file), the file management information containing first information (for example, src_file_name) and second information (for example, dst_file_name), the first information indicating a path of a file in a file system when the second data group is stored, on a storage unit in the apparatus that reproduces data from the predetermined recording medium, in accordance with the directory structure of the second data group detected, and the second information indicating a path of a file in a virtual file system of the second data group. The setting unit may set the directory structure in recording on the predetermined recording medium so that the file management information generated by the second detecting unit contained in the second directory. The virtual file system may include at least a portion of each of the first data group and the second data group and is referenced when the first data group and the second data group are reproduced from the predetermined recording medium in the apparatus.

In accordance with one embodiment of the present invention, one of an information processing method and a program of an information processing apparatus for setting a directory structure in accordance with which a first data group and a second data group are recorded on a predetermined recording medium, includes steps of acquiring the first data group, acquiring the second data group (for example, in step S314 of FIG. 32), setting a first directory with the directory structure of the first data group maintained, and setting a second directory in parallel with the first directory, the second directory containing data to be copied to a recording unit of the apparatus that reproduces data recorded on the recording medium (for example, in step S315 of FIG. 32).

In accordance with one embodiment of the present invention, an information processing apparatus for reproducing data recorded on a recording medium loaded, includes a reading unit (for example, first drive 22) for reading the data recorded on the recording medium loaded, a storage unit (for example, local storage 24) for storing a variety of types of data, a reproducing unit (for example, decoder 26) for reproducing the data recorded on the recording medium and data stored on the storage unit, and a control unit (for example, controller 21) for controlling management of each of the reading unit, the storage unit, and the reproducing unit. The recording unit records at least a first data group in a first directory (for example, BDMV directory), and records, as necessary, a second data group and file management information (for example, manifest file) in a second directory (for example, BUDA_BDMV directory) distinguishable from the first directory. The file management information contains first information (for example, src_file_name) indicating a path of a file in the file system of the second data group stored on the storage unit, and second information (for example, dst_file_name) indicating a path of a file in a virtual file system of the second data group. The control unit includes a storage control unit (for example, file copy controller 66 of FIG. 25) for controlling storage of data contained in the second directory on the storage unit when the second directory is recorded on the recording medium, a detecting unit (for example, optical disk directory manager 64 of FIG. 8) for detecting a first directory structure of the first data group recorded on the recording medium, a virtual file system generating unit (for example, file system merge processor 36 of FIG. 8) for generating the virtual file system, containing at least a portion of each of the first data group and the second data group, in accordance with the directory structure of the first data group detected by the first detecting unit and the file management information stored on the storage unit under the control of the storage control unit, and a reproducing control unit (for example, reproducing controller 37 of FIG. 8) for controlling reproducing of the first data group read by the reading unit and the second data group stored on the storage unit under the control of the storage control unit in accordance with the virtual file system generated by the virtual file system generating unit.

The reading unit may read, from the recording medium, identification information (for example, author_id and disc_id) for use in uniquely identifying the recording medium, and the storage control unit may control storage of data contained in the second directory on a directory identifiable by the identification information on the storage unit.

Figure 27:
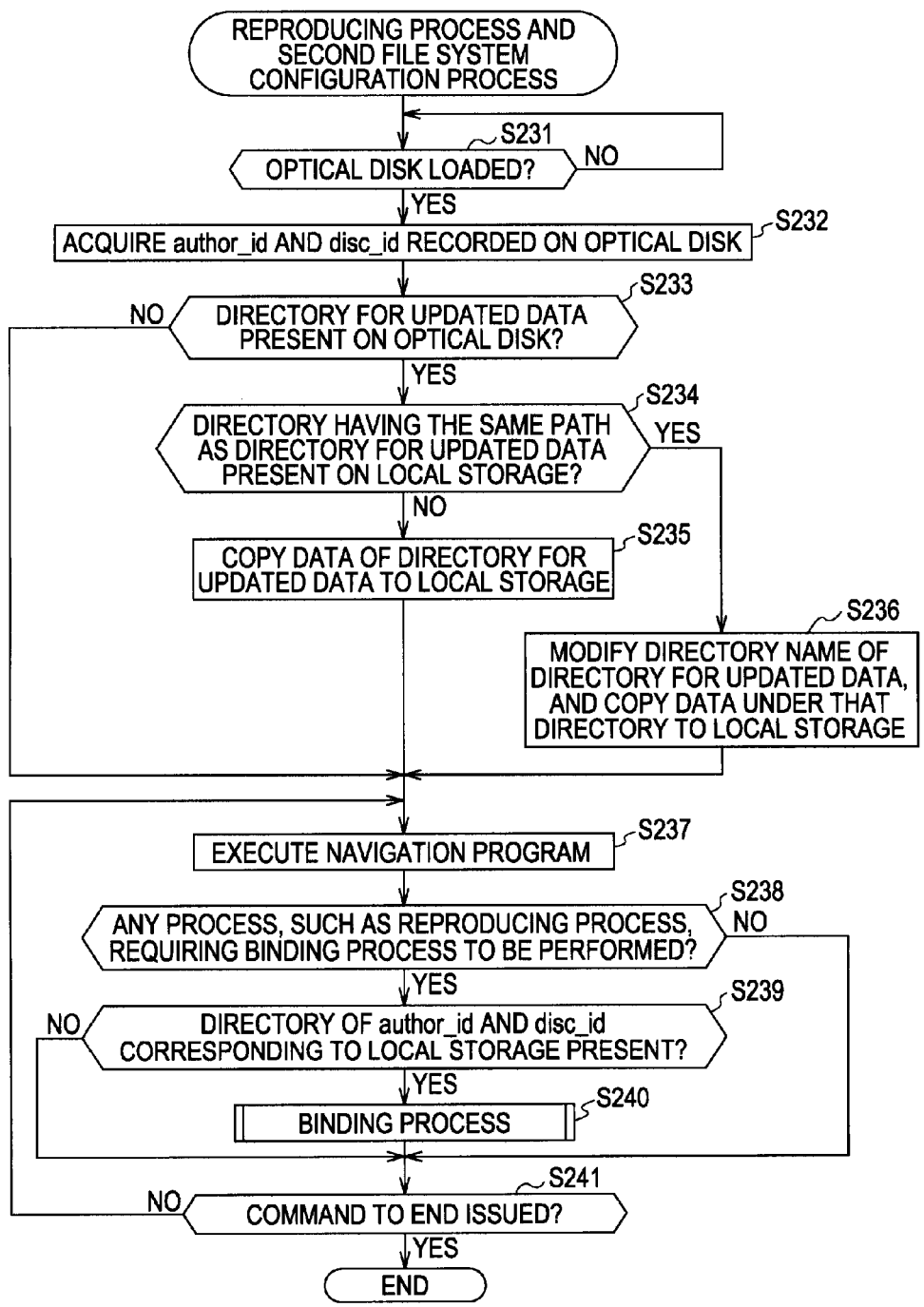
FIG. 27 is a flowchart illustrating a reproducing process and a second file system configuration process.

In accordance with one embodiment of the present invention, one of an information processing method and a program of an information processing apparatus for reproducing data recorded on a recording medium loaded, includes steps of determining whether data is recorded on the recording medium using a second directory (for example, BUDA_BDMV directory) having recorded a second data group and file management information (for example, manifest file), the second directory being different from a first directory (for example, BDMV directory) having recorded a first data group (for example, in step S233 of FIG. 27), controlling storage of the data contained in the second directory on a storage unit (for example, local storage 24) if the data is determined to be recorded on the recording medium (for example, in step S235 or step S236 of FIG. 27), generating a virtual file system containing at least a portion of each of the first data group and the second data group, in accordance with file management information and a directory structure of the first directory, the file management information containing first information (for example, src_file_name) and second information (for example, dst_file_name), the first information indicating a path of a file in the file system of the second data group stored on the storage unit, and the second information indicating a path of a file in a virtual file system of the second data group (for example, in step S240 of FIG. 27), and reproducing the first data group and the second data group, which has been stored on the storage unit in a controlled manner, in accordance with the virtual file system (for example, in step S237 of FIG. 27).

In accordance with one embodiment of the present invention, an information processing apparatus for reproducing data recorded on a recording medium loaded, includes a reading unit (for example, first drive 22) for reading the data recorded on the recording medium loaded, a reproducing unit (for example, decoder 26) for reproducing the data recorded on the recording medium, and a control unit (for example, controller 21) for controlling the reading unit and the reproducing unit. The recording medium records at least a first data group in a first directory (for example, BDMV directory), and records, as necessary, a second data group and first file management information (for example, manifest file) in a second directory (for example, BUDA_BDMV directory) distinguishable from the first directory. The file management information contains first information (for example, src_file_name) indicating a path of a file of the second data group recorded on the recording medium under the second directory and second information (for example, dst_file_name) indicating a path of a file in a virtual file system of the second data group. The control unit includes a first detecting unit (for example, optical disk directory manager 64 of FIG. 8) for detecting a first directory structure of the first data group recorded on the recording medium, a virtual file system generating unit (for example, file system merge processor 36 of FIG. 8) for generating a first virtual system, containing at least a portion of each of the first data group and the second data group, in accordance with the directory structure of the first data group detected by the first detecting unit and the first file management information recorded on the recording medium, if the second directory is recorded on the recording medium, and a reproducing control unit (for example, reproducing controller 37 of FIG. 8) for controlling reproducing of the first data group and the second data group in accordance with the first virtual file system generated by the virtual file system generating unit.

The information processing apparatus may further include a storage unit (for example, local storage 24) for storing a third data group and second file management information. The second file management information contains third information (for example, src_file_name) and fourth information (for example, dst_file_name), the third information indicating, on the storage unit, a path of a file of the third data group recorded on the recording medium, and the fourth information indicating a path of a file in a virtual file system of the third data group. The reproducing unit reproduces data contained in the third data group stored on the storage unit. The control unit generates a second virtual file system containing a portion of each of the first data group, the second data group, and the third data group in accordance with the first virtual file system, and the second file management information stored on the storage unit, and controls reproducing of the first data group, the second data group, and the third data group in accordance with the second virtual file system generated by the virtual file system generating unit.

Figure 28:
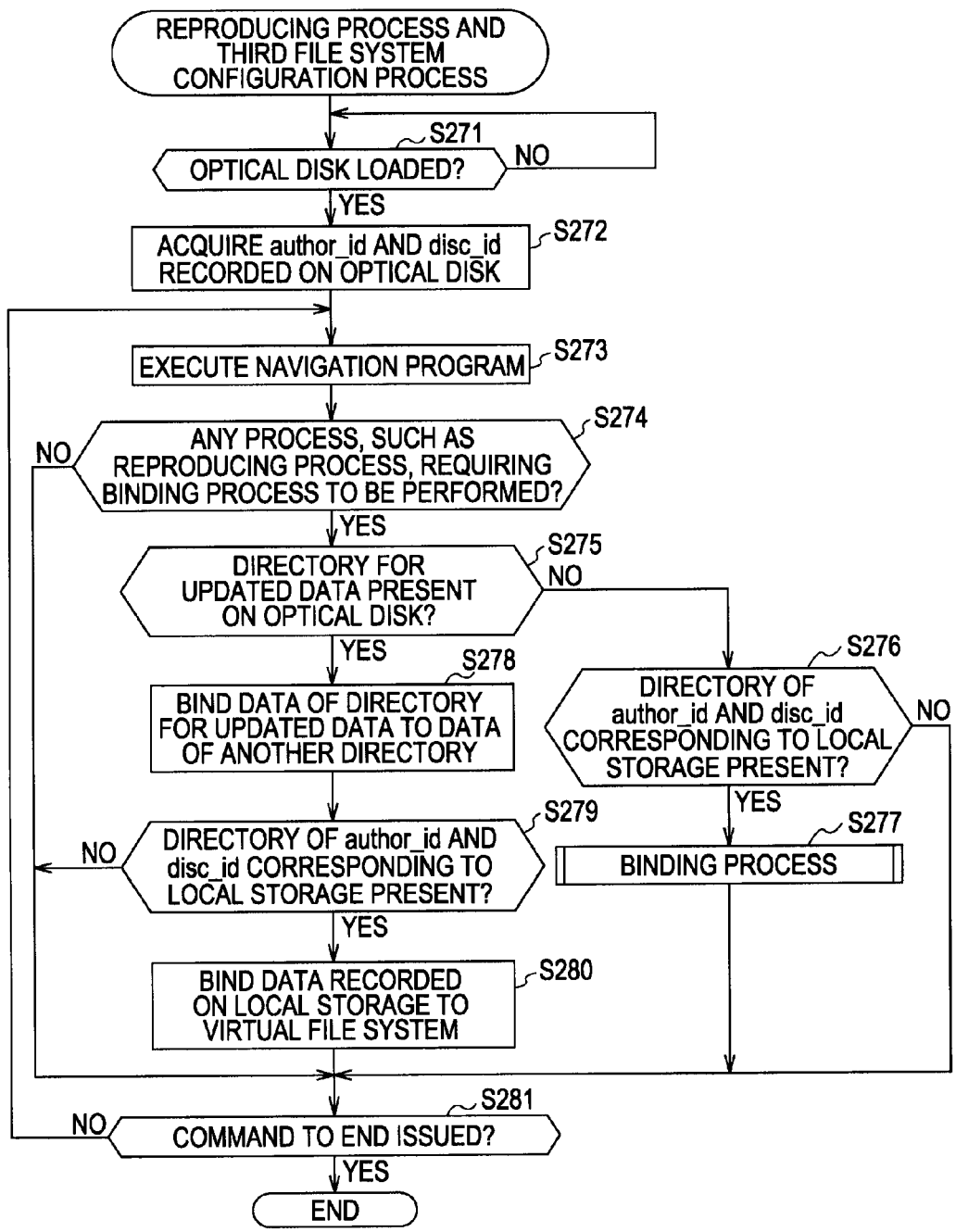
FIG. 28 is a flowchart illustrating a reproducing process and a third file system configuration process.

In accordance with one embodiment of the present invention, one of an information processing method and a program of an information processing apparatus for reproducing data recorded on a recording medium loaded, includes steps of determining whether data is recorded on the recording medium using a second directory (for example, BUDA_BDMV directory) having recorded a second data group and file management information (for example, manifest file), the second directory being different from a first directory (for example, BDMV directory) having recorded a first data group, if the data is determined to be recorded on the recording medium (for example, in step S275 of FIG. 8), generating a virtual file system containing at least a portion of each of the first data group and the second data group, in accordance with the file management information and the directory structure of the first directory, the file management information containing first information (for example, src_file_name and second information (for example, dst_file_name), the first information indicating a path of a file in the file system of the second data group stored on the recording medium under the second directory, and the second information indicating a path of a file in a virtual file system of the second data group (for example, in step S275 of FIG. 28), and reproducing the first data group and the second data group in accordance with the virtual file system (for example, in step S273 of FIG. 28).

In accordance with one embodiment of the present invention, a data structure of data to be supplied to an information processing apparatus, includes a first data group contained in a first directory (for example, BDMV directory), and a second data group and file management information (for example, manifest file) contained in a second directory (for example, BUDA_BDMV directory) distinguishable from the first directory. The file management information contains first information (for example, src_file_name) and second information (for example, dst_file_name), the first information indicating a path of a file in a file system in accordance with which the second data group is recorded on a recording unit of the information processing apparatus, and the second information indicating a path of a file of the second data group in a virtual file system, the virtual file system containing at least a portion of each of the first data group and the second data group, and being referenced when the first data group and the second data group are reproduced on the information processing apparatus.

In accordance with one embodiment of the present invention, a method of manufacturing a recording medium recording data to be supplied to an information processing apparatus, includes steps of generating the data to be supplied to the information processing apparatus, and recording the generated data on the recording medium. The data having the data structure including a first data group contained in a first directory (for example, BDMV directory), and a second data group and file management information (for example, manifest file) contained in a second directory (for example, BUDA_BDMV directory) distinguishable from the first directory. The file management information contains first information (for example, src_file_name) and second information (for example, dst_file_name), the first information indicating a path of a file in a file system in accordance with which the second data group is recorded on a recording unit of the information processing apparatus, and the second information indicating a path of a file of the second data group in a virtual file system, the virtual file system containing at least a portion of each of the first data group and the second data group, and being referenced when the first data group and the second data group are reproduced on the information processing apparatus.

The embodiments of the present invention are described below with reference to the drawings.

FIG. 1 is a block diagram illustrating the recording and reproducing apparatus 1 in accordance with a first embodiment of the present invention.

A controller 21 executes a prepared control program. The controller 21 also reads a navigation program (to be discussed later) recorded on an optical disk 11 by controlling an optical disk drive 22, and expands the navigation program on a memory 23 to execute the navigation program. The controller 21 thus generally controls the recording and reproducing apparatus 1. When the optical disk 11 is loaded, the controller 21 causes a predetermined menu screen to be displayed on an external display device.

Under the control of the controller 21, the optical disk drive 22 reads data from the optical disk 11, and outputs the read data to one of the controller 21, the memory 23, and a decoder 26. If information read from the optical disk 11 by the optical disk drive 22 is one of a navigation program and information for controlling playing of content (such as PlayList discussed with reference to FIG. 2), the read information is supplied to one of the controller 21 and the memory 23. If the information read from the optical disk 11 by the optical disk drive 22 is one of an AV stream and text data, the read information is output to the decoder 26.

The first drive 22 under the control of the controller 21 reads at least a portion of predetermined information recorded on the optical disk 11 and supplies the read portion of the predetermined information to a local storage 24 for copying.

Figure 2:
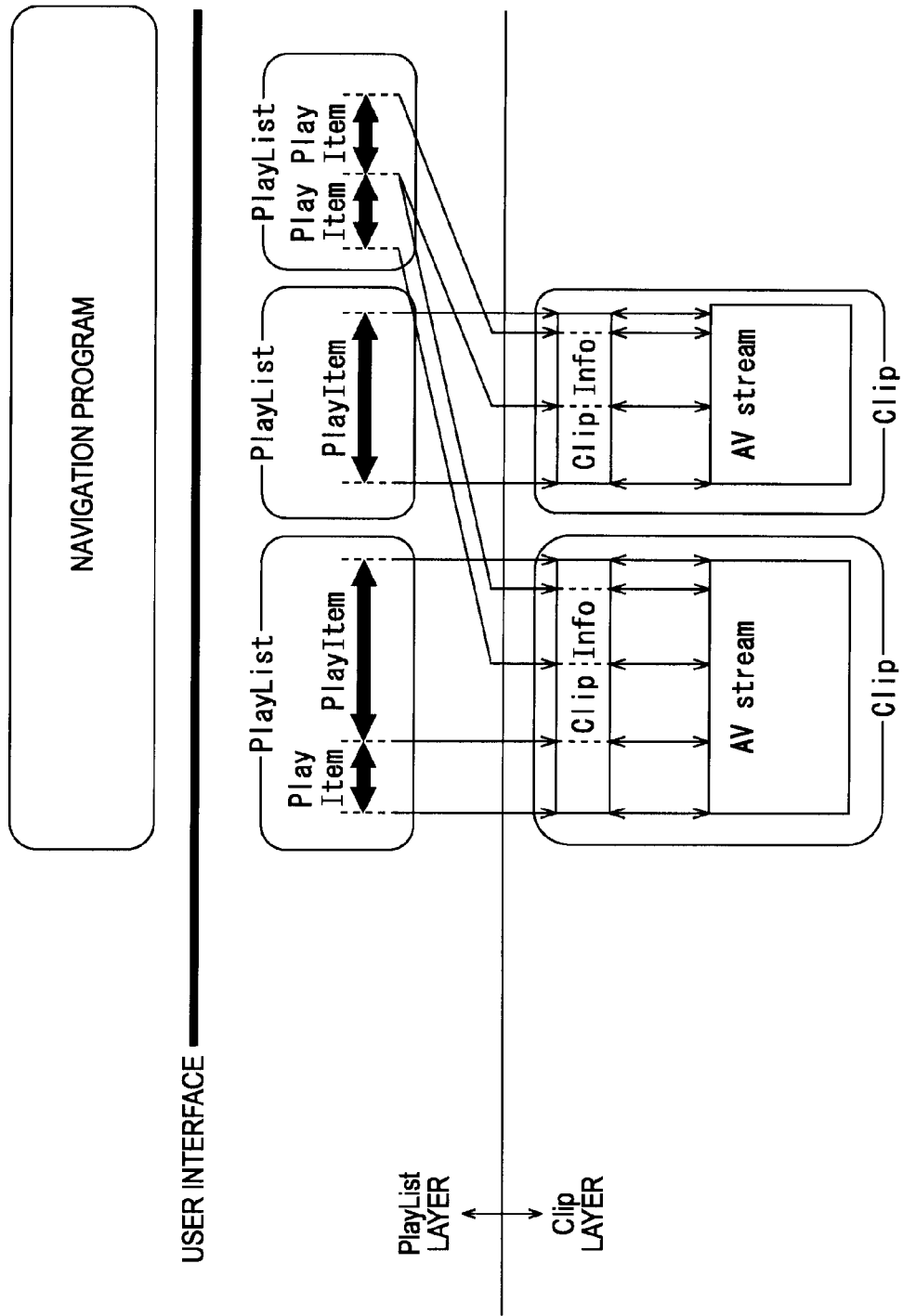
FIG. 2 illustrates an application format on a recording medium loaded on the reproducing apparatus.

FIG. 2 illustrates an application format of the optical disk 11 loaded on the recording and reproducing apparatus 1 of the embodiment of the present invention. The recording medium is the optical disk 11 herein. Alternatively, the recording medium can be a magnetic disk, a semiconductor memory or the like.

The application format contains two layers of PlayList and Clip for managing an AV (audio-visual) stream. A pair of one AV stream or text data and clip information accompanying the AV stream or the text data is handled as one object and referred to as a clip. A data file of the AV stream is referred to as an AV stream file. A data file of the clip information is referred to as a clip information file.

Files used by computers are generally handled as byte strings. Content of an AV stream file is expanded along time axis, and an access point of the clip is typically specified by a timestamp in PlayList.

When the access point in the clip is specified by a timestamp in the PlayList, the clip information file is used to find, from the timestamp, address information at which decoding of the AV stream file is to be started.

The PlayList is a set of information indicating a playback period of the AV stream. Information indicating one playback period in the AV stream is referred to as PlayItem. PlayItem is represented by a pair of an IN point (playback start point) and an OUT point (playback end point) of the playback period along time axis. PlayList is composed at least one PlayItem as shown in FIG. 2.

As shown in FIG. 2, a first PlayList shown on the leftmost portion is composed of two PlayItems. The two PlayItems reference a first portion and a second portion of the AV stream contained in a first clip on the leftmost portion. A second PlayList from the left is composed of a single PlayItem. The PlayItem references the entire second clip shown on the right side. A third PlayList shown on a third position from the left is composed of two PlayItems. The two PlayItems reference a predetermined portion of the AV stream contained in the first clip and a predetermined portion of the AV stream contained in the second clip shown on the right side.

Navigation program is a program for causing the controller 21 to control the order of playback of PlayList and interactive playback of the PlayList. The navigation program has also a function to display a menus screen on which a user enters a command to execute playback. The navigation program is described in programming language such as Java (registered trademark), and recorded on a recording medium such as the optical disk 11. The controller 21 now executes the navigation program.

The controller 21 now executes the navigation program. If the first PlayItem contained in the first PlayList shown on the leftmost portion of FIG. 2 is specified as information indicating a playback position, the first portion of the AV stream contained in the first clip shown on the leftmost portion, referenced by the first PlayItem, is reproduced.

Figure 3:
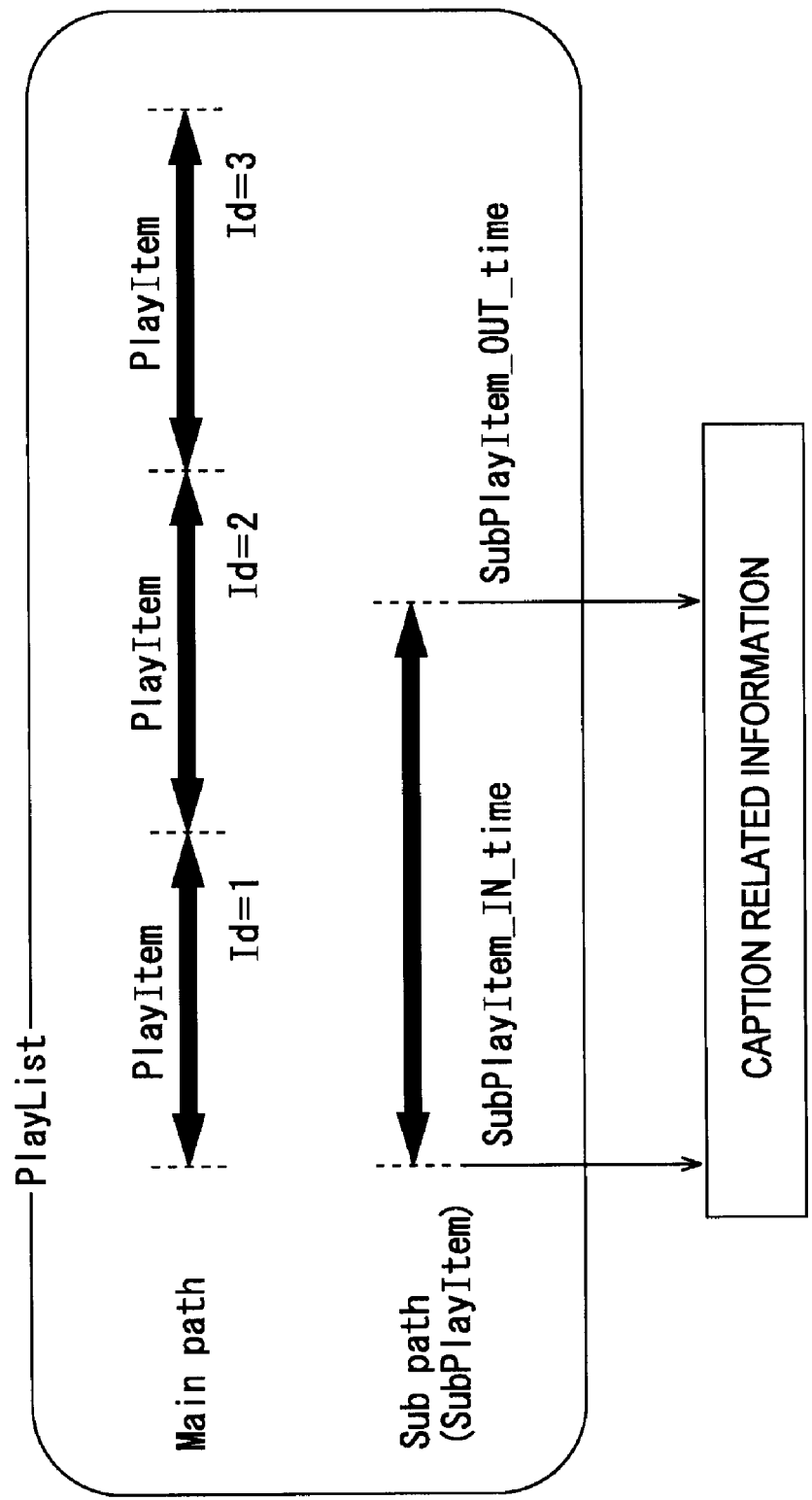
FIG. 3 illustrates another application format on the recording medium loaded on the reproducing apparatus.

In addition to a main path specified by the PlayItem, sub path information specified by a sub play item of FIG. 3 can be contained in the PlayList of FIG. 2. With the SubPlayItem defined, a separate data stream not multiplexed with a clip (such as an MPEG 2 transport stream) specified by PlayItem can be reproduced in synchronization with the AV stream.

Caption-related information including a caption text file and a font file required for rendering and SubPlayItem specifying a playback period of the caption-related information are prepared in association with a clip AV stream of the main path specified by PlayItem. The clip AV stream is reproduced while a caption corresponding to data described in the caption text file is displayed on a display device in a display font based on the font data written in the font file. For example, dubbed-in voice data of a different language and SubPlayItem corresponding to the dubbed-in voice data are prepared in association with the clip AV stream of the main path specified by PlayItem. The clip AV stream is thus reproduced while the dubbed-in voice data of the different language is reproduced and output at the same time.

The SubPlayItem and the corresponding data (clip) may be recorded on the optical disk 11 or may be downloaded from the server 3 via the network 2 as additional data (update data) or may be acquired in a removable medium (such as a removable medium 29 to be discussed later). A method of downloading the additional data from the server 3 will be described in detail later with reference to FIG. 4.

Returning to FIG. 1, the apparatus 1 is further described.

The memory 23 stores data the controller 21 requires to execute a variety of processes. A local storage 24 is an HDD (hard disk drive), for example. The local storage 24 may be a semiconductor memory instead of the hard disk drive, and the local storage 24 as the semiconductor memory may be removable from the recording and reproducing apparatus 1.

An Internet interface 25 is connected to the network 2 in a wired fashion or a wireless fashion. Under the control of the controller 21, the Internet interface 25 communicates with the server 3 via the network 2, and supplies data downloaded from the server 3 to the local storage 24. The server 3 downloads content that updates the data discussed with reference to FIG. 2 and recorded on the optical disk 11 loaded on the recording and reproducing apparatus 1. The local storage 24 records the content downloaded from the server 3 via the network 2.

The decoder 26 decodes the AV stream or text data, supplied from one of the optical disk drive 22, the local storage 24 and the second drive 27, and outputs the resulting video signal and audio signal to the external display device. In response to the decoded signals from the decoder 26, the display device outputs the content of the optical disk 11 (i.e., displaying a video and outputting an audio).

The second drive 27 under the control of the controller 21 reads data from the optical disk 28, and outputs the read data to one of the controller 21, the memory 23, and the decoder 26. The second drive 27 acquires data supplied from one of the first drive 22 and the local storage 24 or information generated by the controller 21, and records data on the optical disk 28 under the control of the controller 21.

The optical disk 28 in the recording and reproducing apparatus 1 records content data in the same application format as the one of the optical disk 11 discussed with reference to FIGS. 2 and 3.

The removable medium 29 is loaded on the drive 27 for information exchange as necessary. The removable medium 29 may include one of a magnetic disk (including a floppy disk), an optical disk (such as compact disk read-only memory (CD-ROM), or DVD), a magneto-optical disk such as Mini-Disk (MD (registered trademark)), and a semiconductor memory.

The operation input unit 30 includes an input device including buttons, keys, touchpanel, jogdial, and the like, and a receiver receiving an infrared signal transmitted from a predetermined remote commander. The operation input unit 30 receives an operation input from a user, and supplies the operation input to the controller 21.

With reference to FIG. 1, the recording and reproducing apparatus 1 includes the two drives, namely, the first drive 22 for reading data from the optical disk 11, and the second drive 27 for reading and recording data on the optical disk 28. The number of drives in the recording and reproducing apparatus 1 is not limited to two. Three drives may be employed. Alternatively, at least one drive for reading and recording data on a recording medium loaded.

The recording and reproducing apparatus 1 reproduces the content recorded on the optical disk 11 loaded thereon and the content recorded on the local storage 24 in association with each other. The reproducing process is described below with reference to FIG. 4.

The recording and reproducing apparatus 1 includes the local storage 24 such as HDD (Hard Disk Drive). The recording and reproducing apparatus 1, connected to the network 2 in a wired fashion or a wireless fashion, stores on the local storage 24 the content downloaded from the server 3 via the network 2. The server 3 downloads the data that updates the content, such as a movie, recorded on the optical disk 11 loaded on the recording and reproducing apparatus 1.

When the operation input unit 30 is commanded to reproduce the content recorded on the optical disk 11 with the downloaded content recorded on the local storage 24, the controller 21 associates the content recorded on the optical disk 11 with the content recorded on the local storage 24, and performs the reproducing process of the content.

For example, the optical disk 11 of FIG. 1 may be a medium sold in package, and record a movie content. Only an English caption text file, for example, may be recorded on the optical disk 11 as a caption data file that can be displayed superimposed on the video of the movie content.

Figure 4:
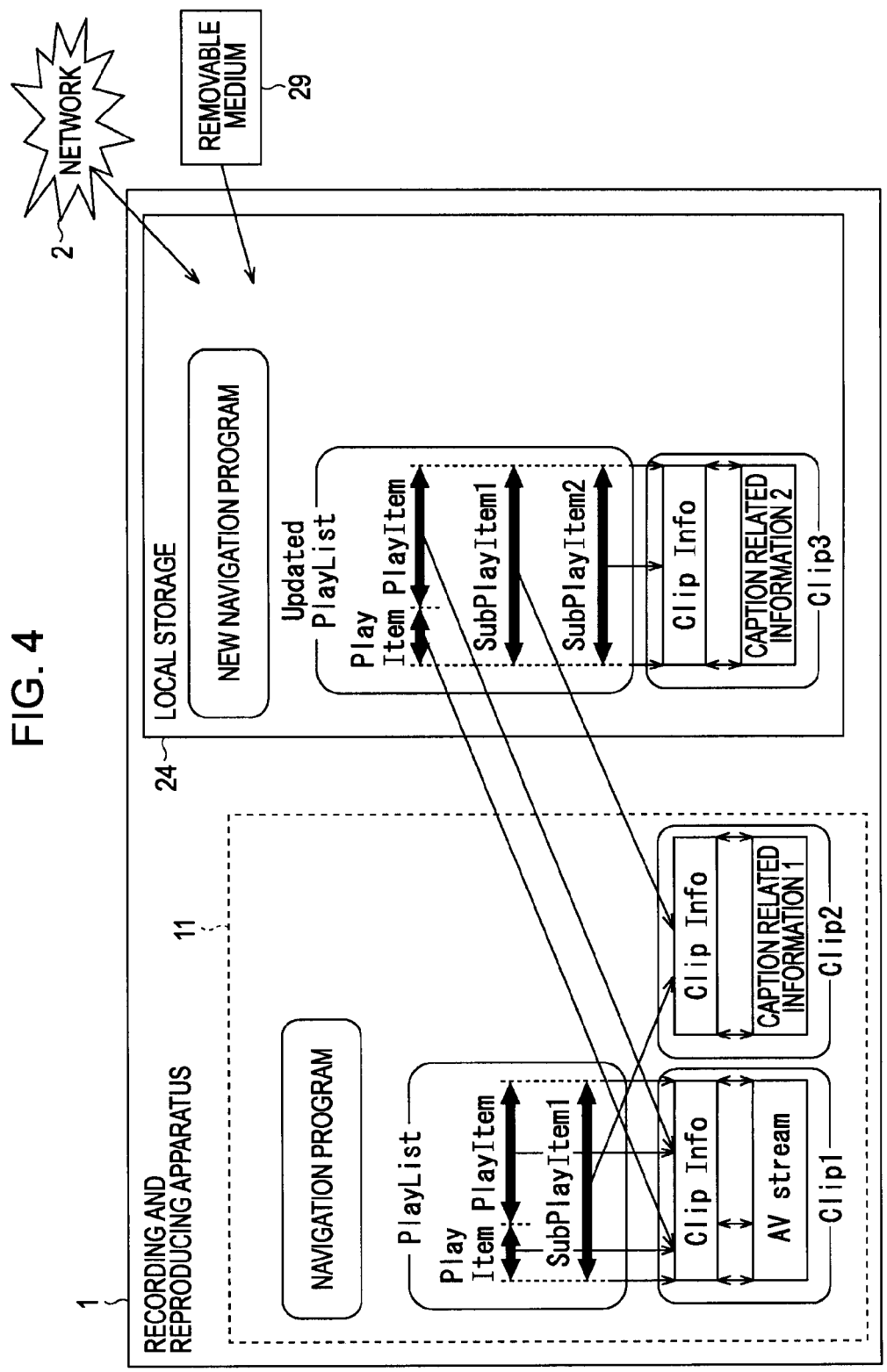
FIG. 4 illustrates the state of the reproducing apparatus that has completed a file download process.

The AV stream of clip 1 recorded on the optical disk 11 and referenced by the PlayItem of the PlayList, as shown in FIG. 4, is a stream for displaying the video of the movie content and reproducing the corresponding audio. Caption-related information 1 of Clip 2 referenced by the SubPlayItem of the PlayList is a caption text file for displaying an English caption to be superimposed on the video.

A user, for example, might want to view the movie content recorded on the optical disk 11 with a caption of a language different from English. The optical disk 11 has no recorded caption of the language different from English. In this condition, the user cannot view the movie with the caption data of the language different from English.

The user then downloads a caption text file of the desired language of the movie recorded on the optical disk 11 from the server 3 via the network 2 (or retrieves the caption text file from the removable medium 29). The caption text file of Arabic, for example, might be downloaded (or copied from the removable medium 29 to the local storage 24).

When the user issues an instruction to download the caption text file of Arabic corresponding to the PlayList pre-recorded on the optical disk 11, the recording and reproducing apparatus 1 accesses the server 3 and then downloads a file prepared on the server 3 for updating the content recorded on the optical disk 11.

With reference to FIG. 4, there are shown clip 3 composed of an Arabic caption text file (caption-related information 2) and a clip information file attached thereto, a PlayList file (updated PlayList file) enabled to control playback and displaying of caption data of clip 3 in addition to the video clip and the audio clip (AV stream data) of movie content, and the English caption text file pre-recorded on the optical disk 11, and a new navigation program file updated from the navigation program file stored on the optical disk 11. These pieces of information are downloaded and stored on the local storage 24.

The updated PlayList includes SubPlayItem 1 and Sub-PlayItem 2, each representing a sub path, in addition to PlayItem representing a main path. The PlayItem of the updated PlayList is used to reference clip 1 containing the AV stream recorded on the optical disk 11. SubPlayItem 1 is used to reference clip 2 containing caption-related information 1 recorded on the optical disk 11. SubPlayItem 2 is used to reference clip 3, downloaded from the server 3 together with the updated PlayList, and containing caption-related information 2 as the Arabic caption text file.

The new navigation program file of FIG. 4 specifies one of SubPlayItem 1 and SubPlayItem 2 together with PlayItem of the updated PlayList as a playback period. A desired video is associated with audio data. With this arrangement, the user can display one of the English caption defined by the English caption text file pre-recorded on the optical disk 11 and the Arabic caption defined by the Arabic caption text file not pre-recoded on the optical disk 11, whichever is desired.

When downloading from the server 3 (copying from the removable medium 29) is performed, the recording and reproducing apparatus 1 can reproduce and display any of clip 2 as the English caption text file and clip 3 as the Arabic caption text file not pre-recoded on the optical disk 11. More specifically, the user selects a desired language from caption languages displayable on a menu screen presented on the display device. The user can thus view the movie on any of English caption and Arabic caption.

Figure 5:
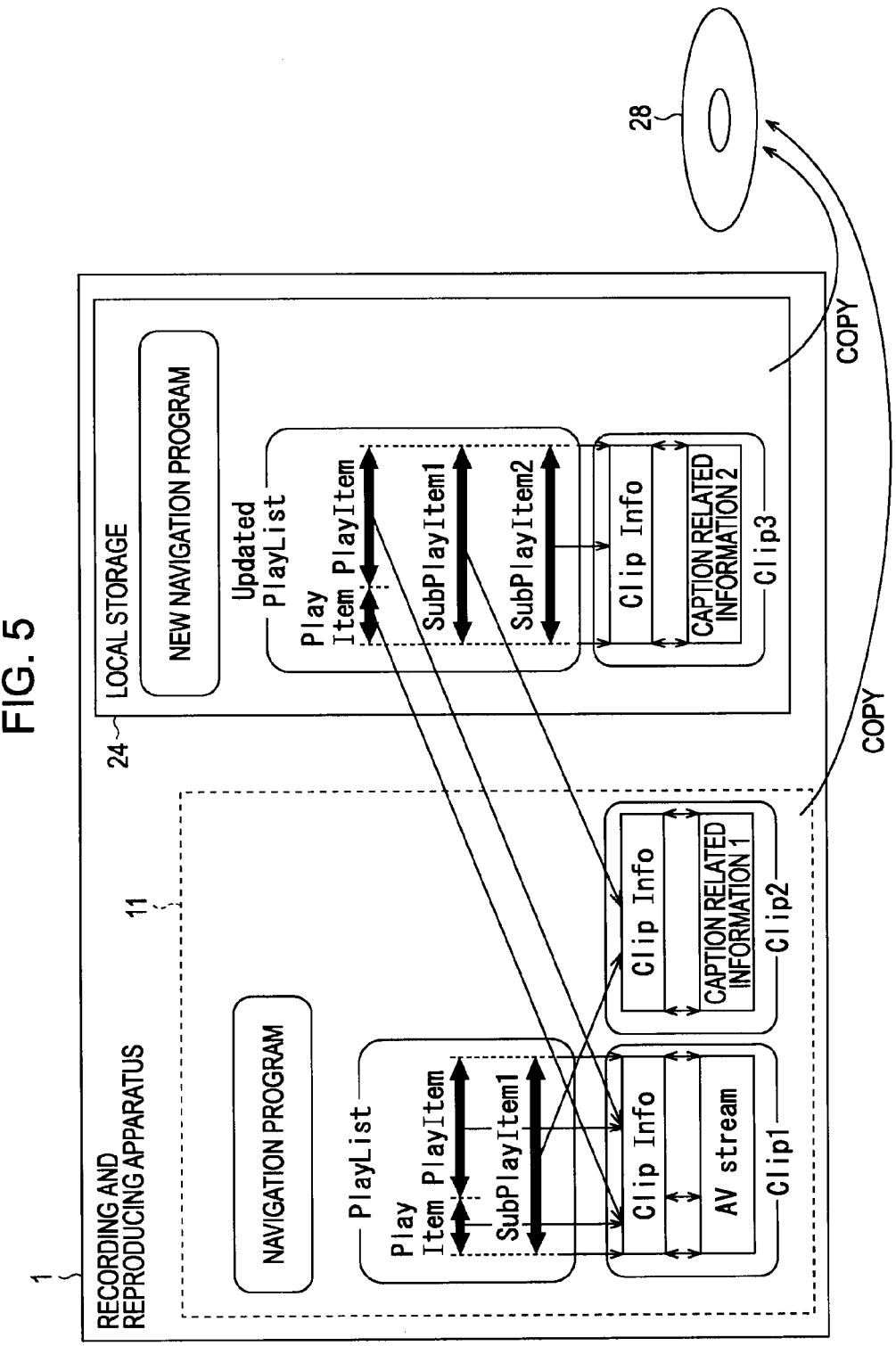
FIG. 5 illustrates the state of the reproducing apparatus that has completed a file copy process from an optical disk and a local storage to another optical disk.

When the program pre-stored in the recording and reproducing apparatus 1 is executed, the recording and reproducing apparatus 1 reads at least a portion of the data recorded on the optical disk 11 and the update file stored on the local storage 24, and copies the read portion to the optical disk 28 loaded on the second drive 27. FIG. 5 illustrates the state of the recording and reproducing apparatus 1 that has copied the file from the optical disk 11 and the local storage 24 to the optical disk 28.

As previously discussed with reference to FIG. 4, the optical disk 11 records a stream for displaying a video of movie content and reproducing a corresponding audio as a AV stream of a clip 1 to be referenced by PlayItem of PlayList, and records as the caption-related information 1 of clip 2 to be referenced by SubPlayItem of PlayList, a text caption file for displaying an English caption together with a displaying of video as shown in FIG. 5.

The local storage 24 stores the clip 3 composed of an Arabic caption text file (caption-related information 2) and a clip information file attached thereto, a PlayList file (updated PlayList file) enabled to control playback and displaying of caption data of clip 3 in addition to the video clip and the audio clip (AV stream data) of movie content, and the English caption text file pre-recorded on the optical disk 11, and a new navigation program file updated from the navigation program file stored on the optical disk 11.

The recording and reproducing apparatus 1 records, on the optical disk 28, the content data recorded on the optical disk 11, and the data of the update file for the content data recorded on the optical disk 11 in a format to be discussed later.

Figure 6:
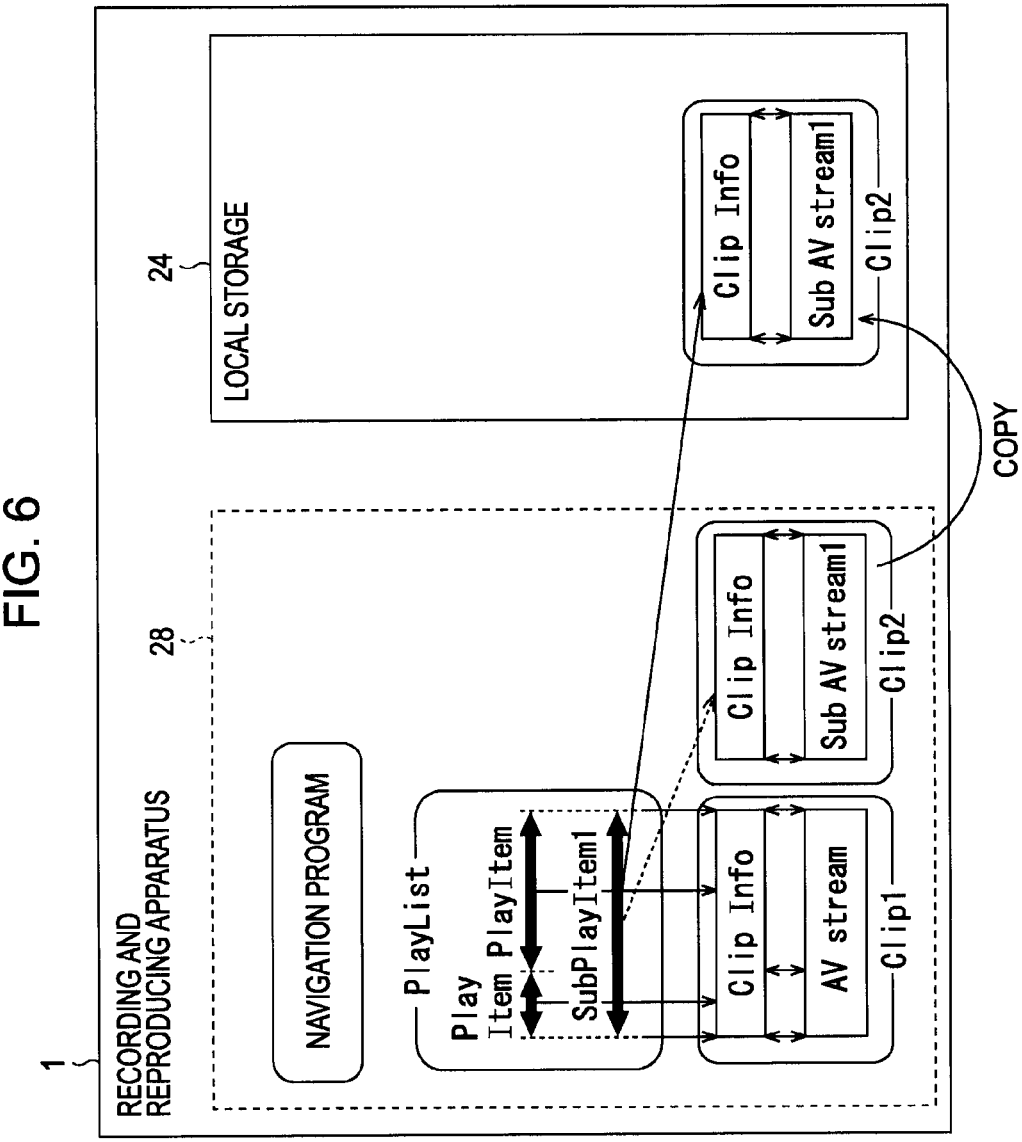
FIG. 6 illustrates the state of the reproducing apparatus that has completed a copy process of a predetermined file recorded on the optical disk to the local storage.

When the program pre-stored in the recording and reproducing apparatus 1 is executed, the recording and reproducing apparatus 1 reads at least a portion of the data recorded on the optical disk 11 and the optical disk 28 loaded on one of the first drive 22 and the second drive 27 to the local storage 24. FIG. 6 illustrates the state of the recording and reproducing apparatus 1 that has copied a file from the optical disk 28 to the local storage 24.

As shown in FIG. 6, the optical disk 28 pre-records the clip 1 containing the AV stream to be referenced by the PlayItem representing the main path, and the clip 2 containing sub AV stream to be referenced by the SubPlayItem representing a sub path. The content data recorded on the optical disk 28 is the one that has been copied from the optical disk 11 and the local storage 24 to the optical disk 28 in accordance with the process discussed with reference to FIG. 5. The clip 1 containing the AV stream to be referenced by the PlayItem is the one recorded on the optical disk 11, and the clip 2 containing the sub AV stream to be referenced by the SubPlayItem is the one recorded on the local storage 24.

When the optical disk 28 is loaded on one of the first drive 22 and the second drive 27 in the recording and reproducing apparatus 1, the reproducing process of the data recorded on the optical disk 28 starts. If the data is set to be read directly from the optical disk 28, the reproducing process fails to be in step with the reading process depending on the reading rate from one of the first drive 22 and the second drive 27 and the reproducing rate of the AV stream and the sub AV stream.

In the recording and reproducing apparatus 1, the clip 2 recorded on the optical disk 28 is copied beforehand to the local storage 24 and the clip 2 may be read from the local storage 24 rather than from the optical disk 28.

Figure 7:
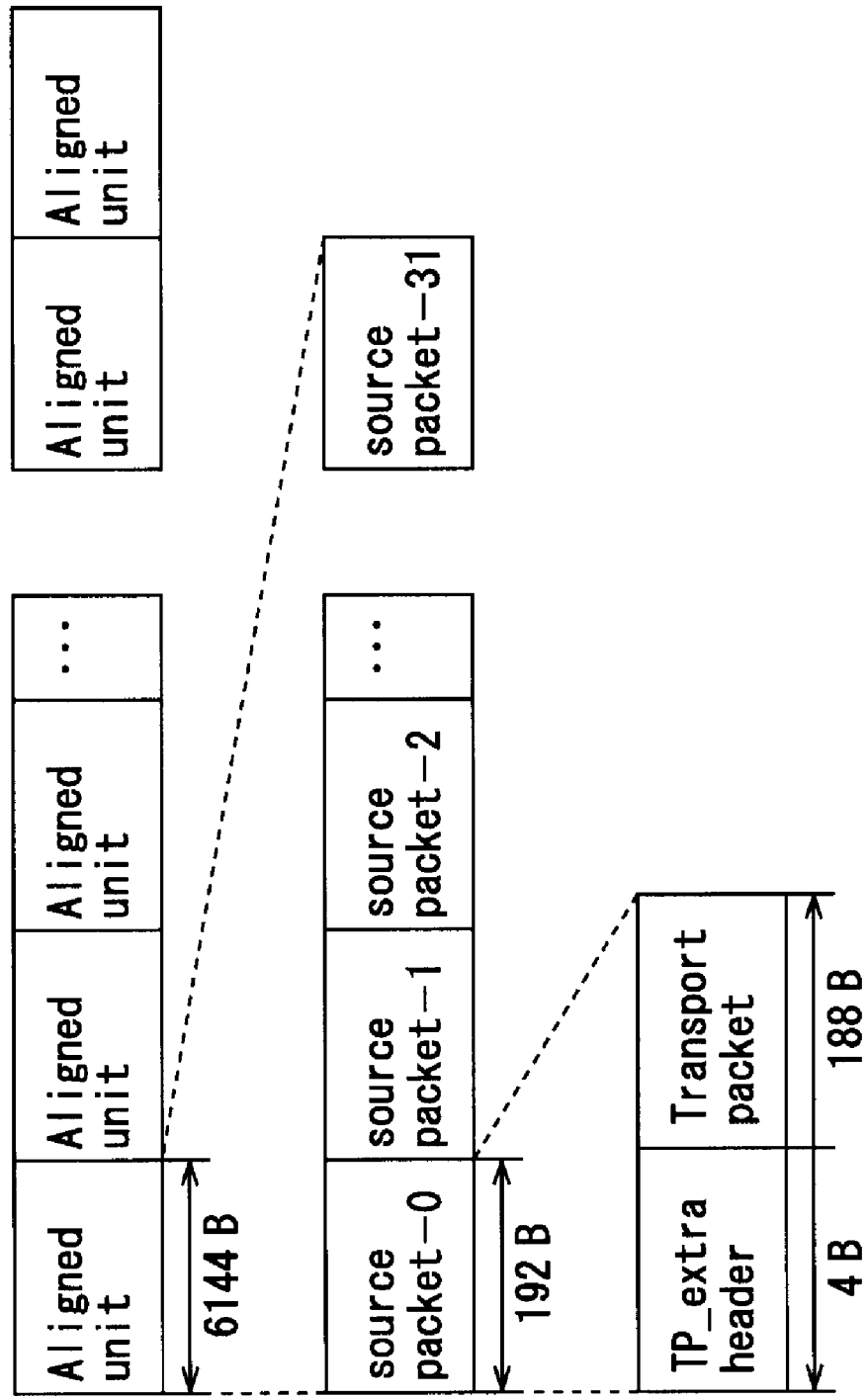
FIG. 7 illustrates a structure of an audio-visual (AV) stream.

The AV stream recorded on the optical disk 11 and the optical disk 28 includes a moving picture experts group (MPEG) 2 transport stream as shown in FIG. 7. Each MPEG 2 transport stream contains an integer number of aligned units. The aligned unit has a size of 6144 bytes (2048×3 bytes), and starts with a first byte of a source packet. The source packet is 192 bytes long. One source packet contains TP_extra_header and a transport packet. TP_extra_header is 4 bytes long, and the transport packet is 188 bytes long. One aligned unit is composed of 32 source packets. Data of a video stream or an audio stream is packetized into MPEG 2 PES (packetized elementary stream), and a PES packet is packetized into transport packets.

Figure 8:
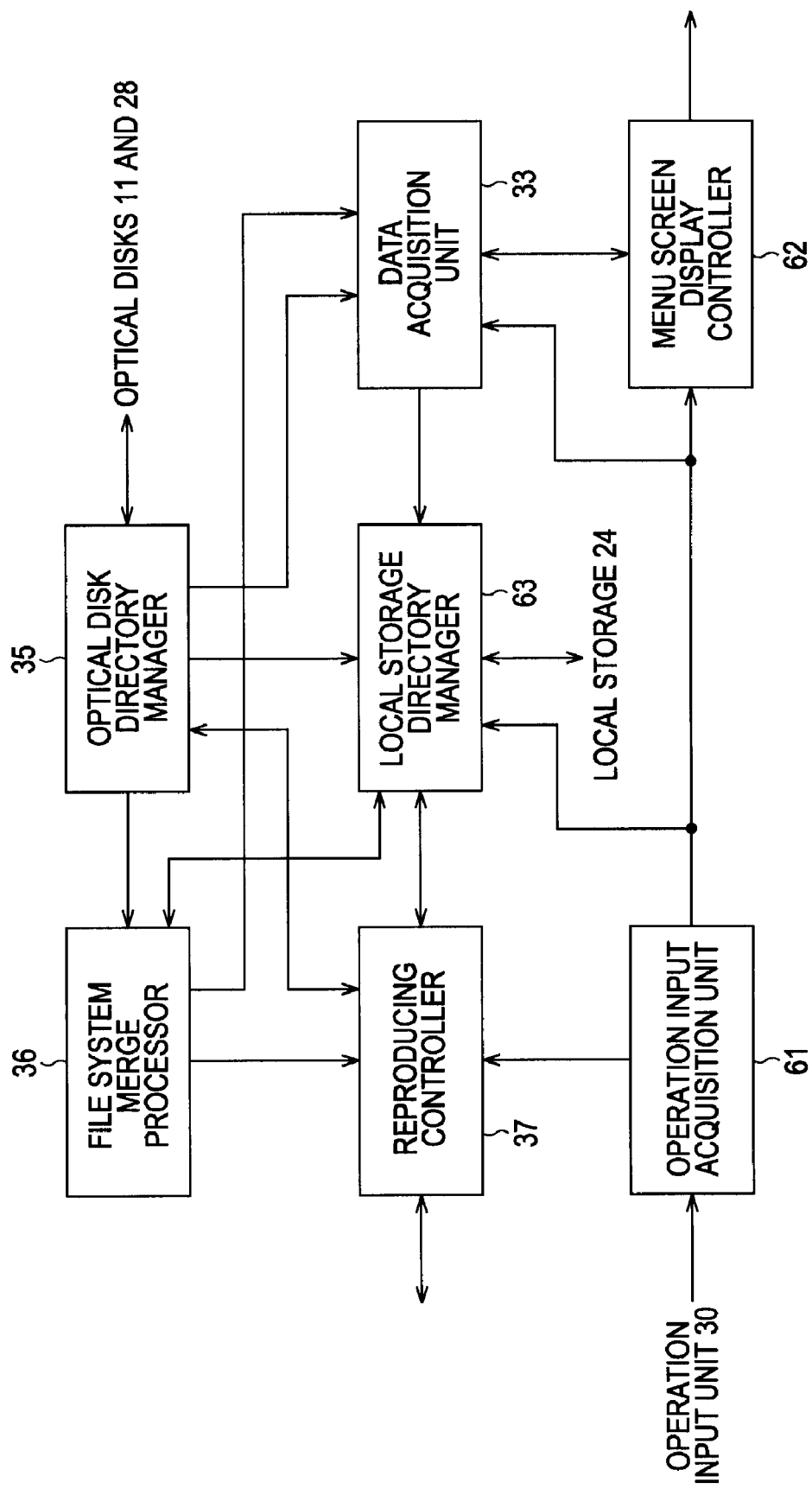
FIG. 8 illustrates a functional block diagram of a controller of FIG. 1.

FIG. 8 is a functional block diagram illustrating the controller 21 of FIG. 1.

The functions of FIG. 8 are executed when the controller 21 performs a prepared control program or when the controller 21 performs a navigation program recorded on one of the optical disk 11 and the optical disk 28.

A menu screen display controller 62 causes the external display device to display a menu screen. The menu screen shows buttons operated for the user to select the audio of the content recorded on one of the optical disk 11 and the optical disk 28, the language of the caption, the angle of the video, and buttons operated for the user to select an update file to be downloaded, and a file to be deleted.

An operation input acquisition unit 61 acquires a signal indicating a operation input entered by the user via the operation input unit 30, and outputs the signal indicating the user operation input to any corresponding one of the menu screen display controller 62, a data acquisition unit 33, a local storage directory manager 63, and a reproducing controller 37.

The data acquisition unit 33 controls communications performed on the Internet interface 25 of FIG. 1 and information exchange with the removable medium 29 on the drive 27. For example, the data acquisition unit 33 downloads the update file indicated by the user from the server 3, and outputs the acquired file to the local storage directory manager 63. Upon receiving information indicating a required file from a file system merge processor 36 to be discussed later, the data acquisition unit 33 acquires the required file from the server 3 through downloading, and outputs the acquired file to the local storage directory manager 63.

The local storage directory manager 63 manages directories on the local storage 24, controls writing of data onto the local storage 24, reading of data from the local storage 24 and deleting of data from the local storage 24. The PlayList, read from the local storage 24 under the control of the local storage directory manager 63, is output to the memory 23. The audio data and the video data of the AV stream, and text data of the caption text file, read from the local storage 24, are output to the decoder 26. When the file system merge processor 36 merges a file system on one of the optical disk 11 and the optical disk 28 with a file system on the local storage 24, the local storage directory manager 63 outputs information relating to the file system on the local storage 24 to the file system merge processor 36.

The optical disk directory manager 64 manages directories of one of the optical disk 11 and the optical disk 28, and controls reading of data from the one of the optical disk 11 and the optical disk 28. The optical disk 11 has author_id and disc_id as identification information set thereon. The optical disk 28 also records the author_id and disc_id as a data copy source as identification information. The identification information author_id and disc_id read from the optical disk 11 under the control of the optical disk directory manager 64 are supplied to the data acquisition unit 33 and the local storage directory manager 63. The author_id and disc_id, read from the one of the optical disk 11 and the optical disk 28 under the control of the optical disk directory manager 64, is output to the data acquisition unit 33 and the local storage directory manager 63. The PlayList, read from the one of the optical disk 11 and the optical disk 28 under the control of the optical disk directory manager 64, is output to the memory 23. The audio data and the video data of the AV stream and the text data of the caption text file, read from one of the optical disk 11 and the optical disk 28, are output to the decoder 26. When the file system merge processor 36 merges the file system on one of the optical disk 11 and the optical disk 28 with the file system on the local storage 24, the optical disk directory manager 64 outputs information relating to the file system on one of the optical disk 11 and the optical disk 28 to the file system merge processor 36. The identification information author_id and disc_id will be described later.

The file system merge processor 36 merges the file system on one of the optical disk 11 and the optical disk 28 supplied from the optical disk directory manager 64 and the file system on the local storage 24 supplied from the local storage directory manager 63, thereby creating a single virtual file system. The file system merge processor 36 outputs the created virtual file system to the reproducing controller 37.

In a process to be discussed later, the file system merge processor 36 determines whether a deletion of several files recorded on the local storage 24 can cause a malfunction in a link structure of files in the virtual file system (in the link structure, data is linked to reproduce the clip in accordance with the PlayList based on an application format of the optical disk 11 as discussed with reference to FIGS. 2 through 4). If the file system merge processor 36 determines that a malfunction can take place in the link structure of the files in the virtual file system, a file required to correct the malfunction is extracted. Information regarding the required file is supplied to the data acquisition unit 33. The required file can be downloaded as necessary.

When several files are deleted from the local storage 24, a file that cannot be reproduced in accordance with any PlayList in the virtual file system (i.e., cannot be specified by any of PlayLists) occurs. In the process to be discussed later, the file system merge processor 36 commands the local storage directory manager 63 to delete such an unnecessary file.

Whether or not to delete the unnecessary file caused in response to the deletion of files may be set by the user.

The reproducing controller 37 executes the navigation program specified by the virtual file system supplied from the file system merge processor 36, and controls playback of content. More specifically, the reproducing controller 37 references the PlayList supplied to and stored on the memory 23, and controls the local storage directory manager 63 and the optical disk directory manager 64 to read the audio data and the video data of the AV stream and, as necessary, the text data of the caption text file from one of the optical disk 11 and the optical disk 28 and the local storage 24 based on the virtual file system. The reproducing controller 37 controls the decoder 26 of FIG. 1 to decode (reproduce) the audio data and the video data of the AV stream and, as necessary, the text data of the caption text file stored on one of the optical disk 11, the optical disk 28 and the local storage 24.

The file system merge processor 36 merges the file system on one of the optical disk 11 and the optical disk 28 with the file system for managing a data group that is recorded on the local storage 24. The data group recorded on the local storage 24 may be downloaded from the server 3, copied from the removable medium 29, or copied from one of the optical disk 11 and the optical disk 28. The merge process is described below with reference to FIGS. 9 through 18.

With reference to FIGS. 9 through 18, the file system of the data recorded on the optical disk 11 and the file system of the data stored on the local storage 24 are merged to obtain a virtual file system. Alternatively, the file system of the data recorded on the optical disk 28 and the file system of the data stored on the local storage 24 may also be merged. In this case, as well, as described with reference to FIG. 6, predetermined information of the data recorded on the optical disk 28 is copied to the local storage 24, and basically identical process is then performed to produce a virtual file system.

The merging operation is performed when the optical disk 11 is loaded on the recording and reproducing apparatus 1, when the playback of a content recorded on the recording and reproducing apparatus 1 is requested, when inputting or outputting of any data recorded on one of the optical disk 11 and the local storage 24 is requested, or when the user issues a command to perform the merging operation.

Figure 9:
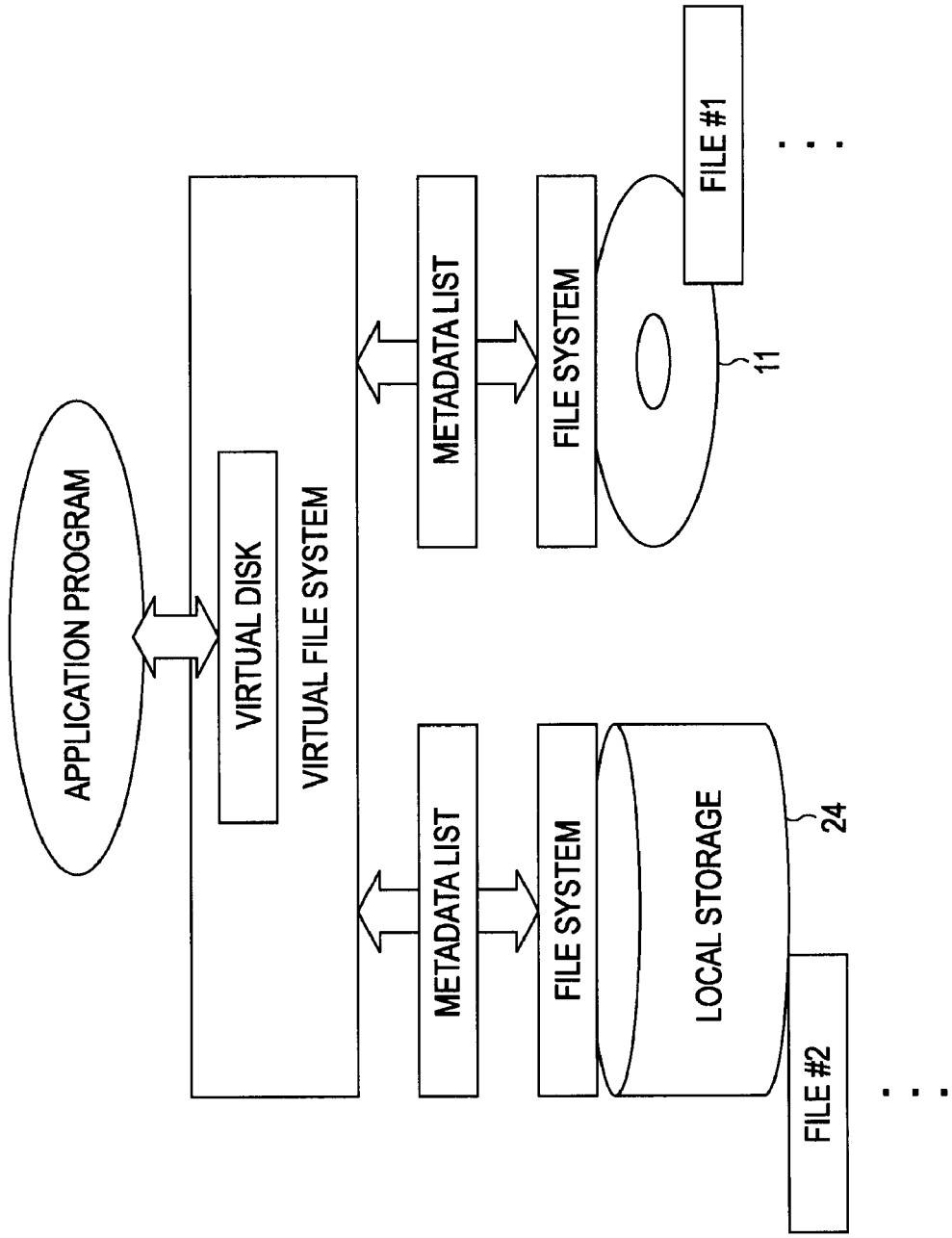
FIG. 9 illustrates a virtual file system.

A virtual file system is defined as an upper layer of a native file system of the system of the recording and reproducing apparatus 1 (i.e., the file system of the data actually recorded on one of the optical disk 11 and the local storage 24). More specifically, as shown in FIG. 9, an application program and a user handling the application program can recognize only the virtual file system as an upper layer. The application program causes the local storage 24 to record new data by downloading the new data from the server 3, and reproduces the data actually stored on one of the optical disk 11 and the local storage 24. The virtual file system abstracts the native file system, thereby hiding a native structure such as a physical device and an operating system in the recording and reproducing apparatus 1.

The main functions of the virtual file system include mounting a file/directory on a physical device (such as the optical disk 11 or the local storage 24) to create a file system of a virtual disk recognized by the user, and supplying a file access application programming interface (API) to the created virtual disk.

Figure 10:
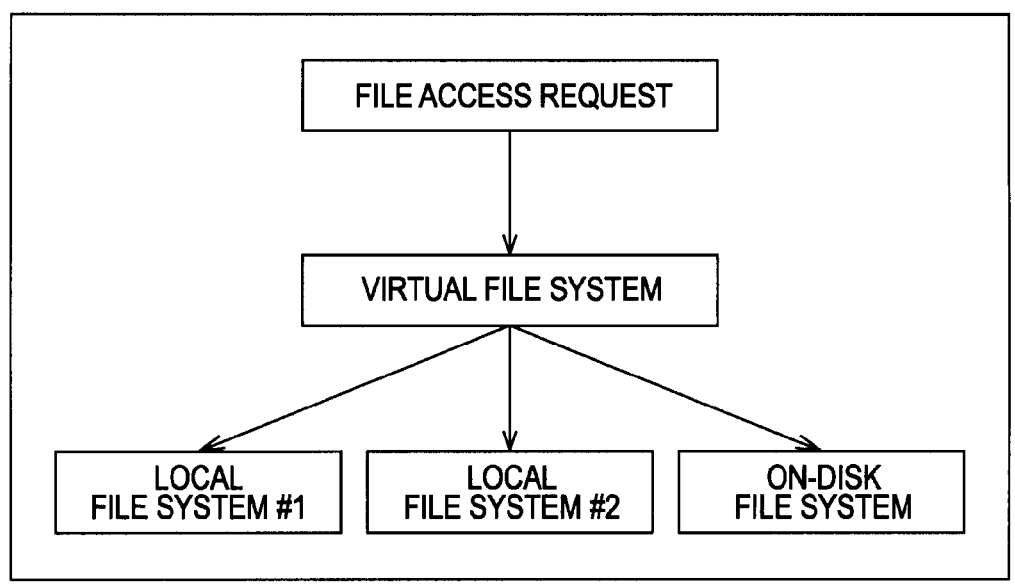
FIG. 10 illustrates a directory structure of the local storage.

When the user enters an operation input requesting an access to any file recorded on one of the optical disk 11 and the local storage 24, the application program of FIG. 10 can recognize only the virtual file system. A local file system #1, and a local file system #2 recorded on one of the optical disk 11 and the local storage 24 and the structure of the file system of the optical disk 11 are hidden from the application program and the user handling the application program, and can be accessed via the virtual file system.

To perform a file access request of FIG. 10, the application program of the recording and reproducing apparatus 1 calls an API (Application Programming Interface) for file input and output provided by the virtual file system, and then accesses the data stored on one of the optical disk 11 and the local storage 24 without being aware of the physical structure of the disk drive and the software structure of the file system. More specifically, the API of the virtual file system calls, in practice, API of the native file system within the recording and reproducing apparatus 1.

The virtual file system provides a variety of types of APIs. For example, the virtual file system provides an open API ( ) for opening a specified file, a close ( ) API for closing a specified file, a seek ( ) API for setting a reading position or writing position of a specified file, a stat ( ) API for acquiring status of a specified file, a read ( ) API for reading a specified file, a write ( ) API for writing a specified file, etc. The application program executed by the reproducing controller 37 manipulates the files stored on one of the optical disk 11 and the local storage 24 using these APIs.

Figure 11:
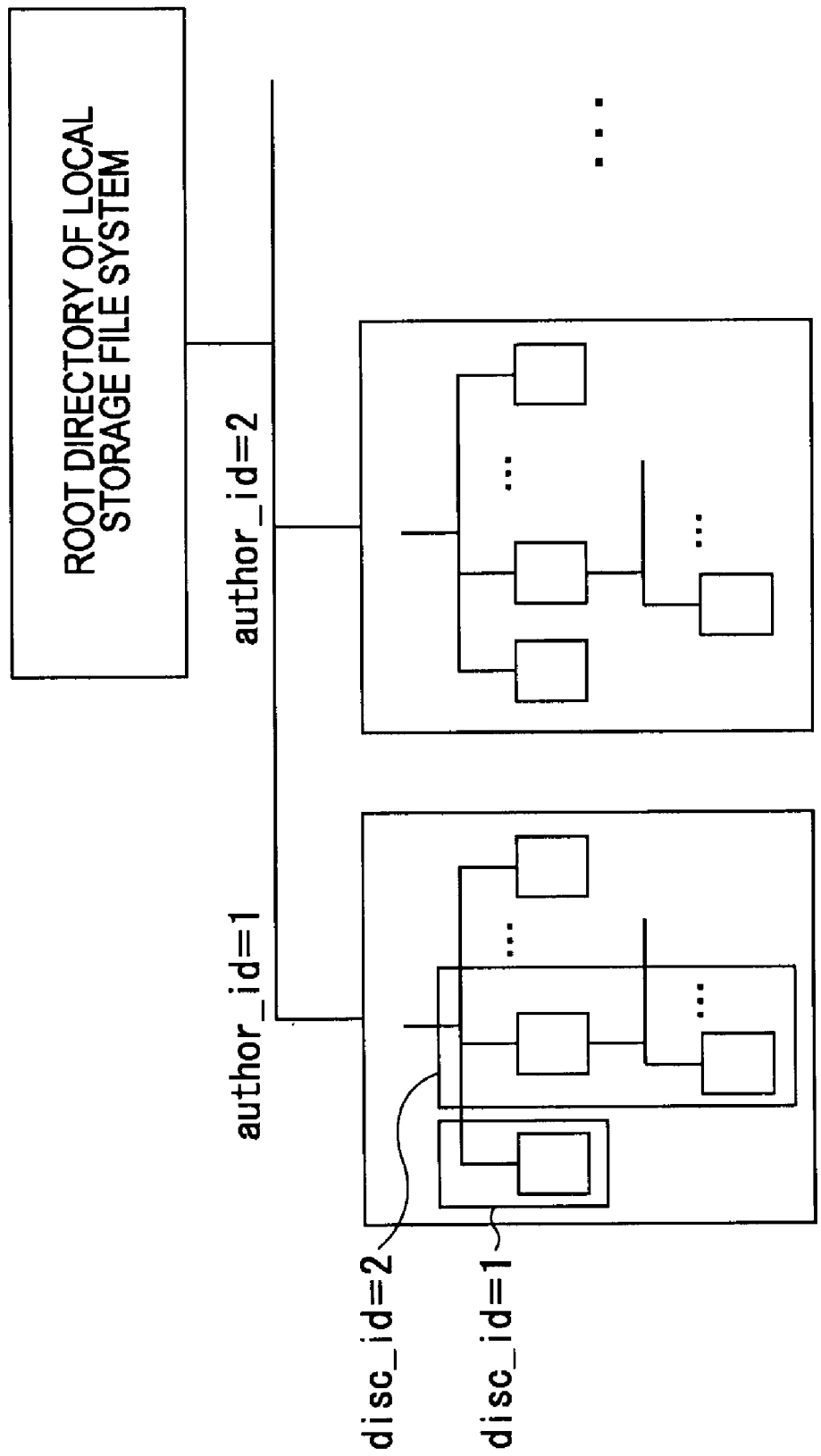
FIG. 11 illustrates a directory structure of the local storage.

The virtual file system has a function of dividing and managing a disk area of the local storage 24. As shown in FIG. 11, the disk area of the local storage 24 has a directory structure in which the disk area is divided into divisions by author_id. Directories disc_id immediately under author_id are flexibly configured in a file/directory structure by a content author. A description of metadata (manifest data to be discussed later) contained in the downloaded data defines where to place data on the local storage 24, i.e., defines the file/directory structure of the downloaded file.

In the file/directory structure of the local storage 24, author_id dividing the directory is an identifier for use in constructing the virtual file system in a corresponding optical disk, and disc_id is an identifier for identifying each content corresponding to the same author_id, and is also used to construct the virtual file system in the corresponding optical disk. The author_id and disc_id may be contained in file management information (manifest data to be discussed later) of data downloaded via the network 2 (or copied from the optical disk 28 if the data stored on the local storage 24 is the data copied from the optical disk 28), or may be information detected from the optical disk 11 by the optical disk directory manager 64.

An author_id identifier may be assigned a content supplier (content author), or each entity such a content producer, or may be assigned a plurality of entities. A plurality of author_id identifiers may be assigned a single entity. A disc_id identifier may be assigned a single optical disk 11 on the premise that one piece of content is recorded on one optical disk 11. If a plurality of pieces of content is recorded on a single optical disk 11, a plurality of disc_id identifiers may be assigned the plurality of pieces of content, respectively. The virtual file system is constructed on each identifier regardless of how the author_id and disc_id identifiers are used. The file management information (manifest file) and author_id and disc_id will be described later.

The file/directory structure of the virtual disk accessible by the application is compatible with the file/directory structure of the optical disk 11. More specifically, the data file structure under the author_id and disc_id identifiers is merged with the data file structure of the optical disk 11. The virtual file system of the virtual disk having file/directory structure compatible with the file/directory structure of the optical disk 11 is thus configured.

The virtual file system also has a function of managing manifest files to be discussed later in addition to the directory and file management function. The purpose of the virtual file system of defining fields of the metadata to a file model of a native file system is three fold, i.e., to display a name representing a content rather than displaying a path or a name of a file of the local storage 24, to prevent double updating of the same file in a download process, and to define a path name in the virtual file system, namely, a path name during playback of the optical disk 11.

The virtual file system provides two functions in metadata management, namely, operation of a manifest file and operation of metadata. The manifest file is metadata representing a variety of attributes of the downloaded files. Manifest ( ) may be stored in a corresponding file or may be merged with one file with a manifest_id identifier (to be discussed later with reference to FIG. 12) of a manifest ( ) section used as a key for identification. In either case, the file is referred to as a manifest file. The recording and reproducing apparatus 1 storing the file downloaded to the local storage 24 must also store a manifest file. The manifest file may be described in mark-up language text such as XML.

FIG. 12 illustrates a syntax of the manifest file.

The manifest_id identifier is an identifier of the manifest ( ) section.

An author_id field specifies an identifier for constructing the virtual file system in the corresponding disk. The identifier is determined by referencing the author_id field of a content distribution file to be discussed later with reference to FIG. 18. The application program or the user cannot freely set any value to this field.

A disc_id field is used to specify an identifier uniquely identifying content corresponding to the same author_id identifier. Like the author_id and disc_id, the disc_id identifier is used to construct the virtual file system in the corresponding disk. The identifier is determined by referencing the disc_id field of the content distribution file to be discussed later with reference to FIG. 18. The application program or the user cannot freely set any value to this field.

A permission field is used for the content author to specify approval information, for example, whether to set a visible attribute or an invisible attribute to the user or whether to inhibit file overwrite. Permission information may be written in a file other than the manifest file or in any independent file.

FIG. 13 lists values specifiable for the permission field contained in the manifest ( ) of FIG. 12.

If 0×00 is described in the 8-bit permission field as shown in FIG. 13, the attribute of a file accompanied by this metadata is invisible to the user. If 0×01 is described in the 8-bit permission field, the attribute of a file accompanied by this metadata is visible to the user. If 0×02 is described in the 8-bit permission field, the attribute of a file accompanied by this metadata is overwrite inhibited.

A src_file_name field contains information that uniquely identifies where the corresponding file is recorded in the directory structure of the file system of the local storage 24. More specifically, this field specifies a "path name" representing a path identifying a file with a file location in the hierarchical layer structure of the file system of the local storage 24. Names of the file and directory representing the path name are coded in accordance with ISO/IEC 646 Standards.

A dst_file_name field contains information that uniquely identifies where the corresponding file is recorded in the directory structure at a bind destination in a virtual disk of the file actually recorded on the local storage 24. More specifically, this field specifies a "path name" representing a path identifying a file with a file location in the hierarchical layer structure of the virtual file system. Names of the file and directory representing the path name are coded in accordance with ISO/IEC 646 Standards.

The src_file_name and the dst_file_name fields can have the same file name.

A credential field contains information that is used to check file access right when a file specified in the src_file_name field is under a different author_id identifier. The local storage 24 shares a content file under a plurality of author_id identifiers.

An operational procedure of the metadata is described below.

The virtual file system defines API for reading the content of the manifest ( ) file without disclosing the file name, the file location, or the physical structure of the manifest ( ) file to the application program or the user.

More specifically, the application program or a resident program to be executed by the recording and reproducing apparatus 1 can indirectly access the manifest ( ) file by calling the following APIs:

getProperty
  argument 1:
  character string type data
  absolute path name of a file to be operated using metadata
  argument 2:
  character string type data
  element name of metadata to be read
  return value:
  character string type data
  metadata corresponding to an element specified by argument
  function:
  reading metadata from manifest ( ) file In practice, detailed definition of API, such as type information, needs to be modified depending on programming language specifications of software execution environment of the recording and reproducing apparatus 1.

Figure 14:
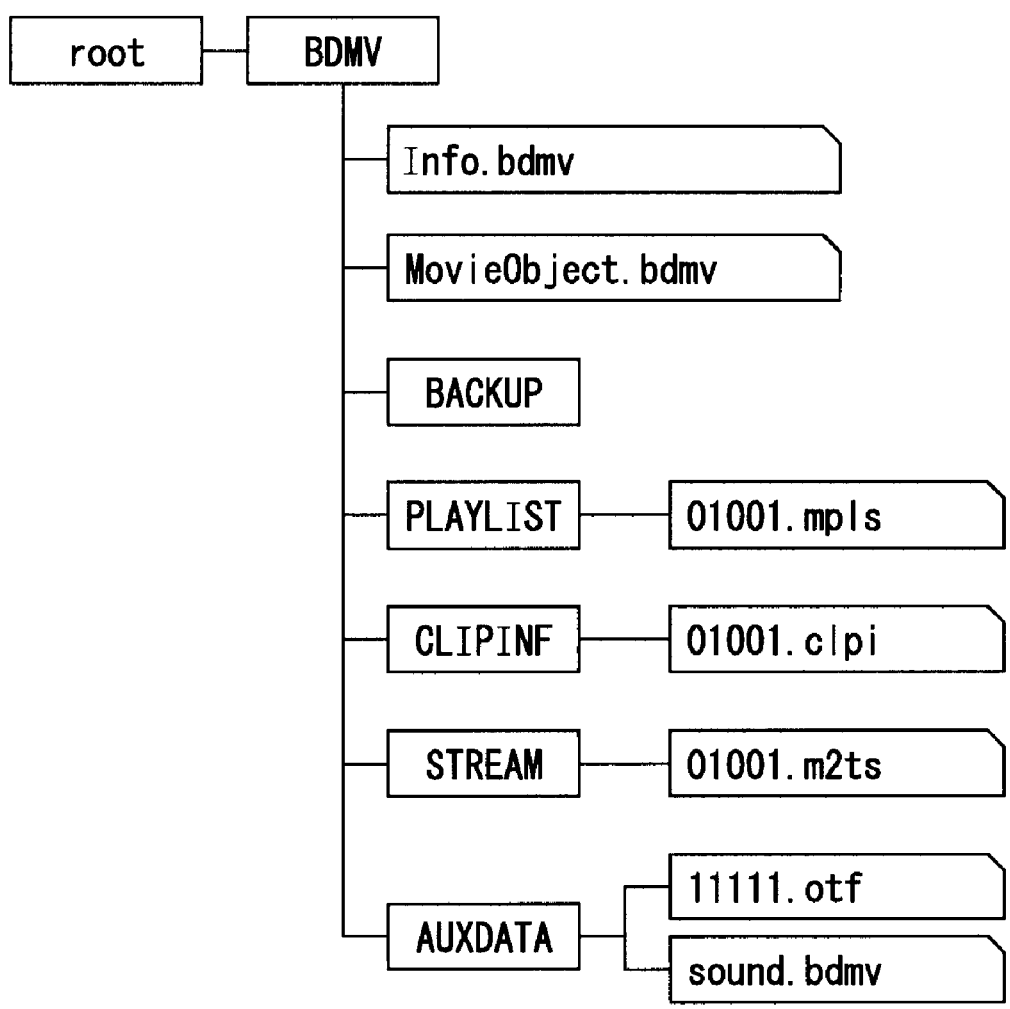
FIG. 14 illustrates a file system of the optical disk.

FIG. 14 illustrates the file system of the optical disk 11. As shown in FIG. 14, the file system of the optical disk 11 has a directory structure.

A directory named "BDMV" is arranged under the root directory of the optical disk 11. Under the directory "BDMV", a file named "Index.bdmv" and a file named "MoveObject.bdmv" are stored. Hereinafter, these files are referred to as an Index file and a MoveObject file, respectively, as appropriate. Each file is referred to as a file name followed by "file", and each directory is referred to as a directory name followed by "directory".

An Info file contains information relating to a menu for the playback of the optical disk 11. The recording and reproducing apparatus 1 causes a display device to display a playback menu screen based on the Info file. The playback menu screen shows items for reproducing all contents on the optical disk 11, reproducing a particular chapter only, reproducing repeatedly a particular chapter, and displaying an initial menu. MoveObject that is executed with any item selected is set in the Info file. When a user selects one item from the playback menu screen, the recording and reproducing apparatus 1 executes a MoveObject command set in the Info file.

The MoveObject file includes MoveObject. MoveObject includes a command controlling the playback of the PlayList recorded on the optical disk 11. The recording and reproducing apparatus 1 selects and executes one of MoveObjects recorded on the recording and reproducing apparatus 1, thereby reproducing the content recorded on the optical disk 11.

Arranged further under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory stores files and data to back up files and data recorded on the optical disk 11.

The PLAYLIST directory stores a PlayList file. Each PlayList file name is composed of a file name of a five digit number with an extension ".mpls" attached thereto as shown in FIG. 14.

The CLIPINF directory stores a clip information file. Each clip information file is composed of a file name of a five digit number with an extension ".clpi" attached thereto as shown in FIG. 14.

The STREAM directory stores a clip AV stream file and a substream file. Each stream file has a file name of a five digit number with an extension ".m2ts" attached thereto as shown in FIG. 14.

The AUXDATA directory stores files of data not contained in but referenced from the clip AV stream file and the substream file and data used separately from the clip AV stream and the substream file. As shown in FIG. 14, the AUXDATA directory stores a caption font file named 11111.otf and an effect sound file named sound.bdmv.

The optical disk 11 stores the author_id and disc_id identifiers in the form of secure electronic data that cannot be rewritten by the user, or in the form of physical pits.

Figure 15:
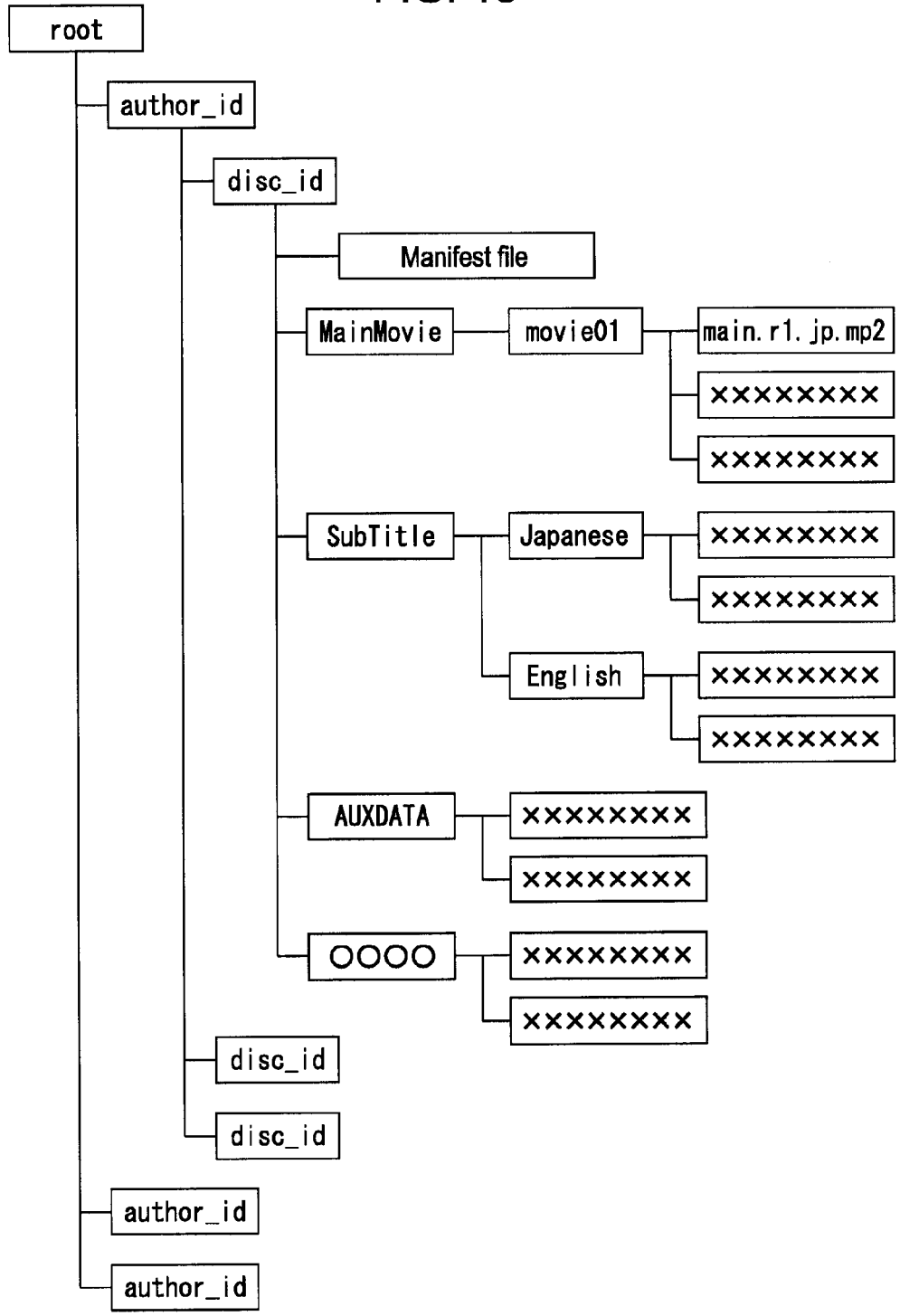
FIG. 15 illustrates a file system of the local storage.

FIG. 15 illustrates the file system of the local storage 24. As shown in FIG. 15, the file system of the local storage 24 has also a directory structure.

At least one directory named author_id is arranged under the root directory of the local storage 24. At least one directory named disc_id is arranged under the author_id directory. The author_id and disc_id identifiers are used to construct the virtual file system, all disc_id identifiers under the author_id identifier under the root directory of the local storage 24 are different from each for identification. The disc_id directory includes a set of manifest ( ) sections or a manifest file composed of one manifest ( ) section. The structure of the other directories and files is freely set by the content author. The other directories and files may have the same file/directory structure as the one of the optical disk 11 discussed with reference to FIG. 14, or may have the one as discussed with reference to FIG. 15, which is quite different from the file/directory structure discussed with reference to FIG. 14.

As shown in FIG. 15, the "disc_id" directory includes, in addition to the manifest file, a plurality of directories including a "MainMovie" directory, a "SubTitle" directory, and an "AUXDATA" directory. Those directories may further contain folders and files.

The file/directory structure of the local storage 24 of FIG. 15 is invisible to the application program executed by the recording and reproducing apparatus 1 or the user.

Figure 16:
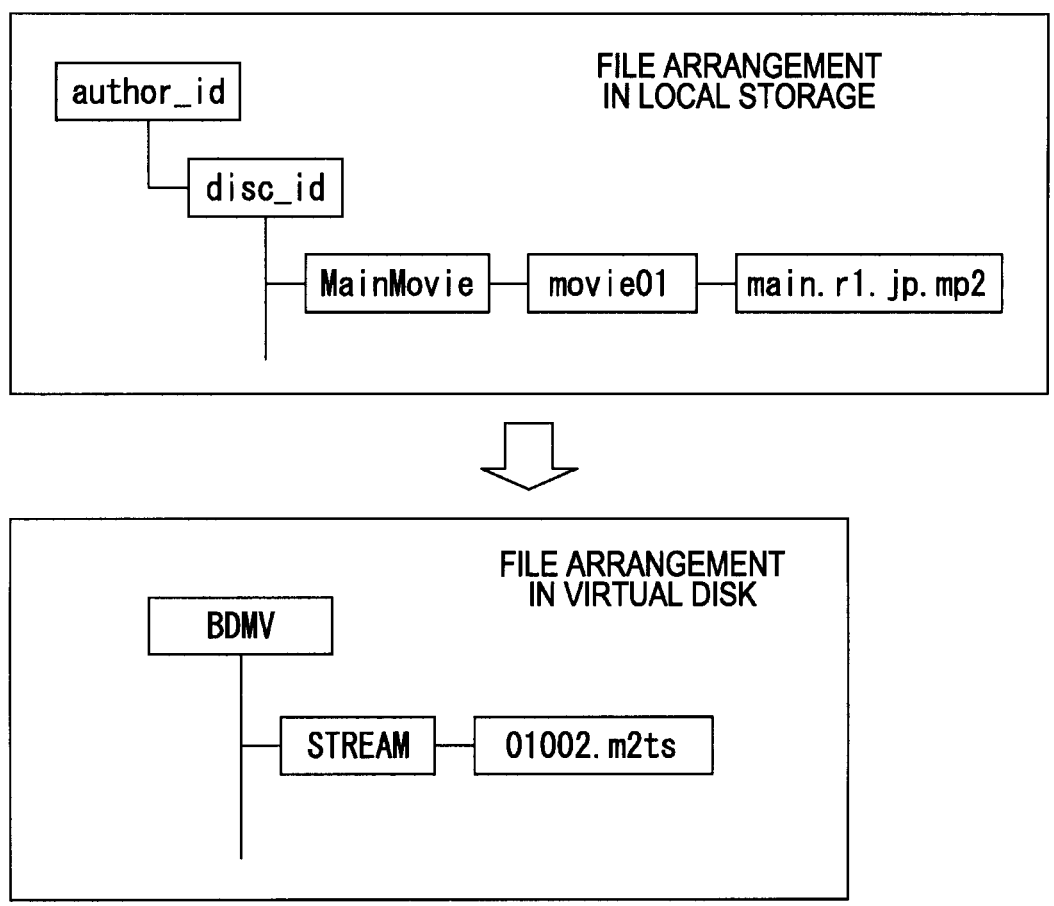
FIG. 16 illustrates path designations.

For example, in the manifest ( ) section of FIG. 12, "/MainMovie/movie01/main.r1.jp.mp2" as the path name thereof might be specified in the src_file_name field, and "/STREAM/01002/m2ts" as the path name thereof might be specified in the dst_file_name field. As shown in FIG. 16, the downloaded data is recorded in a file name of main.r1.jp.mp2 in a movie01 directory within the MainMovie directory under the author_id and disc_id identifiers in the local storage 24. In the virtual file system of the virtual disk, the downloaded data is handled as a file named "01002.m2ts in the STREAM directory.

In this way, the content author can specify the path name of the local storage 24 in the src_file_name field, and the path name in the virtual file system of the virtual disk in the dst_file_name field of the manifest ( ) section of the downloaded package. If the path name adapted to the virtual file system in the virtual disk is set in the dst_file_name field, the content author can freely set a file/directory structure under disc_id of the data actually recorded on the local storage 24 and newly add directories and files under areas identified by the disc_id identifier in the recording and reproducing apparatus 1.

If the dst_file_name field in the manifest ( ) section remains blank at the downloading of an actual file, that file cannot be referenced from the application program being executed by the recording and reproducing apparatus 1 (in other words, the application program being executed by the recording and reproducing apparatus 1 and the user cannot recognize the presence of that file). The actual file is stored on the local storage 24, and the actual file is correctly recognized in the file system of the local storage 24. With the dst_file_name field left blank, the file is considered as being absent from the virtual file system. That file is thus hidden from the application program of the recording and reproducing apparatus 1 and the user.

This feature is taken advantage of. An actual file is downloaded with the dst_file_name field blanked in the manifest ( ) section. Later in the future, a manifest ( ) section having the same manifest_id and a predetermined path name written in the dst_file_name field is downloaded again to overwrite the manifest ( ) section. The application program to be executed by the recording and reproducing apparatus 1 thus operates in the same way as the actual file is downloaded at the same timing as the downloading of the new manifest ( ) section.

For example, a plurality of bonus tracks was downloaded at a time, or delivered in a predetermined recording medium, and later, only the manifest ( ) section containing the dst_file_name field is downloaded for overwriting periodically so that the application program recognizes different bonus tracks. In this arrangement, the user enjoys services in which different bonus tracks are added from time to time without the need for downloading frequently a vast amount of data.

In the synchronization (binding) between the actual file system of the optical disk 11 and the local storage 24 and the file system of the virtual disk, regardless of whether it is a so-called static binding system or a dynamic binding system, a new API for updating the virtual file system (for example, a update ( )) may be defined. When that API is called in response to a user operation or explicitly by the application program, the virtual file system is updated.

In the static binding, the actual file systems in the optical disk 11 and the local storage 24 are referenced at the moment the optical disk 11 is loaded on the recording and reproducing apparatus 1 or at the timing of the switching of reproduction title in order to map the file/directory structure in the virtual file system. In the dynamic binding, required files are searched for at the moment a file input and output request is issued.

The file/directory structure of the virtual disk preferably matches the file/directory structure of the optical disk 11. The file/directory structure of the optical disk 11 is formulated by standards and typically cannot be modified. Preferably, the structure of actual directories and files in the local storage 24 is freely set by the content author. If the file/directory structure of the virtual disk is set based on the fixed file/directory structure of the optical disk 11, a playback process is performed in compliance with standards such as the application format of the optical disk 11 while maintaining the freedom of data distributed by the content author at the same time.

Figure 17:
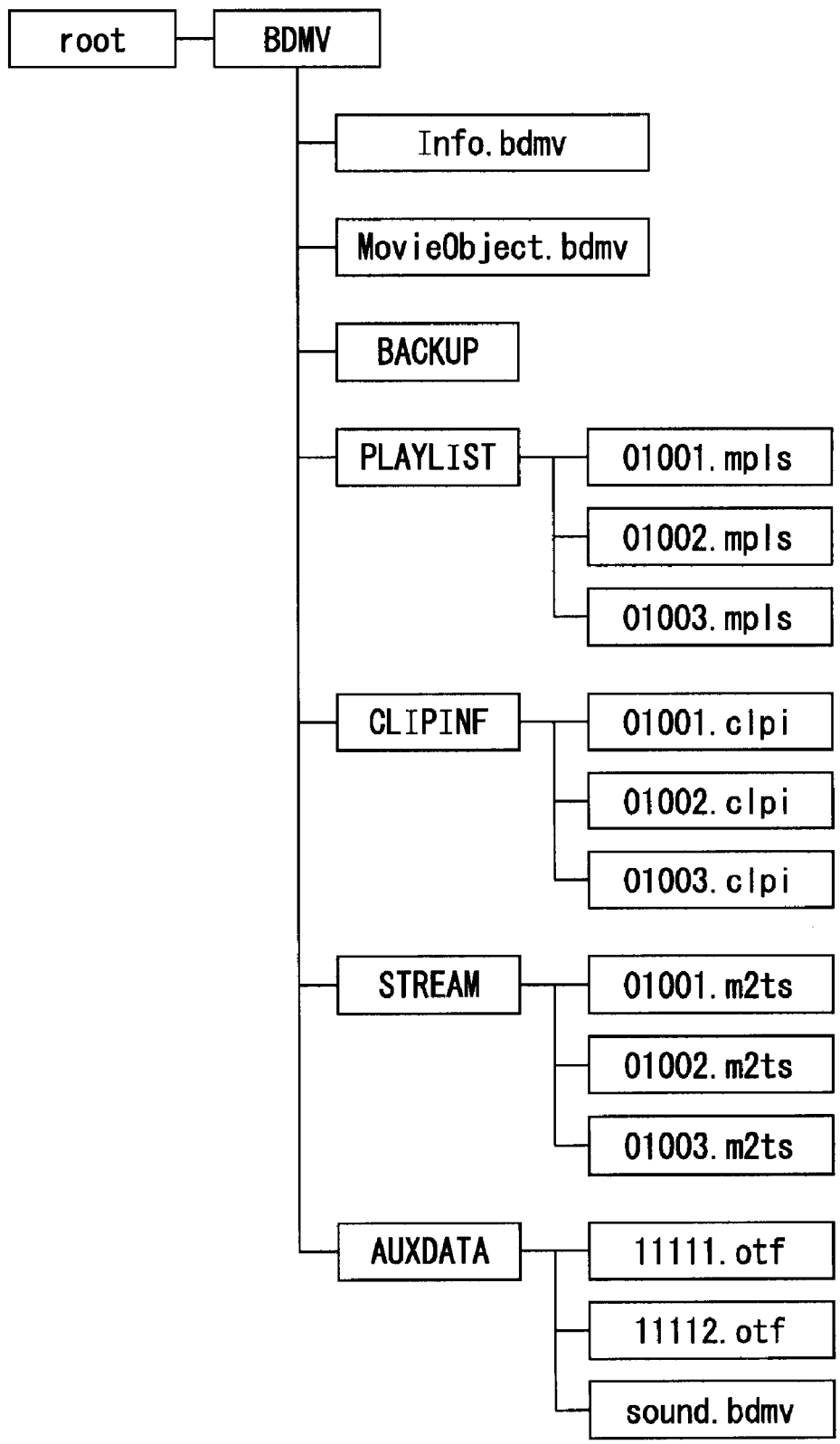
FIG. 17 illustrates a directory/file structure in a virtual disk.

FIG. 17 illustrates the file/directory structure of the virtual disk.

A directory named "BDMV" is arranged under the root directory in the file/directory structure of the virtual disk of FIG. 17. Under that directory, there are arranged a file named "Info.bdmv" and a file named "MovieObject.bdmv".

The Info file contains information relating to a menu for reproducing a content that is stored on the optical disk 11 and the local storage 24 and handled by the application program as the one being recorded on the virtual disk. The recording and reproducing apparatus 1 causes the display device to display the playback menu screen in accordance with the Info file. The playback menu screen may show items for reproducing all contents on the virtual file system, reproducing a particular chapter only, reproducing repeatedly a particular chapter, and displaying an initial menu. MovieObject that is executed with any item selected is set in the Info file. When a user selects one item from the playback menu screen, the recording and reproducing apparatus 1 executes a MoveObject command set in the Info file.

A MovieObject file includes MovieObject. MovieObject includes a command controlling the playback of PlayList that is handled as being recorded on the virtual disk. The recording and reproducing apparatus 1 selects and executes one of MovieObjects that are handled as being recorded on the virtual disk, thereby reproducing the content that is handled as being recorded on the virtual disk.

Arranged under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory stores files and data to back up files and data to be handled as being recorded on the virtual disk.

The PLAYLIST directory stores a PlayList file. Each PlayList file name is composed of a file name of a five digit number with an extension ".mpls" attached thereto in the same way as in the optical disk 11.

The CLIPINF directory stores a clip information file. Each clip information file is composed of a file name of a five digit number with an extension ".clpi" attached thereto in the same way as in the optical disk 11.

The STREAM directory stores a clip AV stream file and a substream file. Each stream file has a file name of a five digit number with an extension ".m2ts" attached thereto in the same way as in the optical disk 11.

The AUXDATA directory stores files of data, not contained in the clip AV stream file and the substream file handled as being recoded on the virtual disk, but referenced from the clip AV stream file and the substream file, and files of data used separately from the clip AV stream file and the substream file.

Information indicating a file on the menu screen displayed to the user has a name typically specified in a display_name field. The file/directory structure of the virtual disk discussed with reference to FIG. 17 is not hidden in nature from the application program and the user. Depending on the application program executed by the recording and reproducing apparatus 1, the file/directory structure of the virtual disk may be displayed to the user.

The definition of the content distribution file format the content author uses to distribute the content is described with reference to FIG. 18. The file format for content distribution may be individually determined on a per content file unit basis. Alternatively, the file format may be an archive type containing metadata (manifest ( )) as shown in FIG. 18.

A package_header ( ) section and a package_body ( ) section in archive may take text expression of mark-up language such as XML.

When the content author distributes contents on a per file basis, metadata (manifest ( )) is handled as an independent binary file or text file. In other words, an appropriate state needs to be described in the manifest ( ) associated with a content distributed on a per file basis in view of a directory structure expected subsequent to file addition.

A compression_type field is used to specify a compression method of data within the package_body ( ). If zero is specified in this field, data within the package_body is non-compressive type.

An encryption_type field is used to specify a scramble (encryption) method of data within the package_body ( ). If zero is specified in this field, the data within the package_body ( ) is non-scrambled type (clear text).

As for the order of scrambling and compression of the data in the package_body, a compression process is performed first, followed by a scrambling process.

A file_count field is used to specify the total number of files to be archived.

A manifest_id field is used to specify an identifier of the manifest ( ) section.

After archive data is downloaded, the manifest ( ) section may be stored on a per file basis (on a per archive data unit basis) on the local storage 24. Alternatively, the manifest ( ) section may be merged with a file with the manifest_id identifier of the manifest ( ) section used as a key for identification.

An author_id field is a field specifying an identifier uniquely for use in constructing the virtual file system in the corresponding optical disk.

A disc_id field is a field specifying an identifier uniquely identifying a content corresponding to the same author_id identifier. This archive is update data for the optical disk 11 specified by the disc_id identifier.

A permission field is used for the content author to specify approval information, for example, as to whether to set data to be visible or not, or whether to inhibit overwrite or not. The values specifiable for the permission field remain unchanged from the values discussed with reference to FIG. 13. Permission information may be written in a file other than the manifest file or in any independent file.

An src_file_name field is used to specify a path name of a file to be recorded on the local storage 24 as previously discussed with reference to FIG. 16. The file/directory name is encoded in accordance with ISO/IEC 646 standard.

A dst_file_name field is used to specify a path name of a file at a binding destination in the virtual disk (virtual file system) as previously discussed with reference to FIG. 16. The file/directory name is encoded in accordance with ISO/IEC 646 Standard.

The src_file_name and dst_file_name fields may take the same name.

A credential field contains information that is used to check file access right when a file specified in the src_file_name field is under a different author_id identifier. The local storage 24 shares a content file under a plurality of author_id identifiers.

A file_size field is used to specify the file size of a file prior to compression by byte.

A file_data field is used to specify file data as a byte sequence.

The data of FIG. 18 having the described content distribution file format is downloaded, and the recording and reproducing apparatus 1 merges the downloaded data with the data recorded on the loaded optical disk 11 to construct a virtual file system in the virtual disk. The user who reproduces a content recorded on the optical disk 11 using the recording and reproducing apparatus 1 feels that the optical disk 11 is updated with bonus tracks and sounds or captions of different language sounds added to the contents recorded on the optical disk 11.

If the content having the above-described format is updated, new data files are downloaded for binding in the virtual file system discussed with reference to FIG. 17. For example, at least one of an Information file (Info.bdmv), a MovieObject file (MovieObjects.bdmv), a PlayList file (***.mpls), a ClipInformation file (*.clpi), and a STREAM file and AUXDATA file (*.m2ts, *.bdmv, and ***.otf) is added or updated. The various types of additions defined by above-referenced operation_type, such as the addition of MainPath and SubPath, are executed so that the above-described files are downloaded and reproduced in association with the contents recorded on the optical disk 11.

If a file stored on the local storage 24 has the same file name as a newly acquired file during file addition or file update, overwriting is performed if file overwrite is permitted in the permission attribute. If the file overwrite is not permitted in the permission attribute, no overwriting is performed. If no overwrite is performed, file copying may be performed with the file name changed. If the file name of the newly acquired file is not the same as any of files pre-stored on the local storage 24, that file is additionally stored on the local storage 24.

The AV stream data other than those having the above-described file structure can be recorded on the optical disk 11, and then decoded by the decoder 26 for playback. However, the AV stream data other than those having the above-described file structure cannot form a virtual file system with the file downloaded to the local storage 24. If the AV stream data other than those having the above-described file structure is recorded on the optical disk 11, the user of the recording and reproducing apparatus 1 cannot handle data in a manner such that the file recorded on the optical disk 11 is added or partially updated.

A data source (content author) may package files for addition and update and may download the files on a disk basis (i.e., on a data unit basis with each data unit for a corresponding directory identified by disc_id identifier) in order to free the recording and reproducing apparatus 1 from file editing process.

The recording and reproducing apparatus 1 downloads new data having the structure of FIG. 18 from the server 3 via the network 2. The data is stored on the local storage 24 in accordance with a path name indicated by src_file_name written in the manifest ( ) section as the metadata, and a path is set in the virtual file system in accordance with a path name indicated by dst_file_name written in the manifest ( ) section. The application of the recording and reproducing apparatus 1 (for example, an application performing a reproducing process) processes the data recorded on the optical disk 11 and the data stored on the local storage 24 in accordance with the dst_file_name in the virtual file system without any discrimination therebetween.

The process performed by the application of the recording and reproducing apparatus 1 is described below. Upon receipt of a data addition command (download command), an application program for performing a data addition transmits a corresponding manifest file (all or part of manifest files) to the server 3 via the network 2, and then acquires a list of content that can be currently added. The application program displays to the user the list of content that can be currently added, and the user selects content to be downloaded from the list of content.

When the user selects content to be downloaded, the application for downloading the data from the server 3 (may be the same application as the one performing data addition process and reproducing process) starts downloading the data from the server 3.

When the downloading of the data is completed, an application for managing the file system mounts the downloaded package group on the virtual file system so that a native file system and the virtual file system are synchronized through the static binding process or the dynamic binding process.

FIGS. 19 through 22 are flowcharts illustrating the reproducing process of the recording and reproducing apparatus 1. In the reproducing process of the recording and reproducing apparatus 1, a new file is acquired from the outside and then stored on the local storage 24 while a virtual file system is produced. Information recorded on the optical disk 11 and information stored on the local storage 24 are then reproduced.

The file-based addition and update process described below with reference to the flowchart of FIG. 19.

In step S1, the operational input acquisition unit 61 in the controller 21 determines, based on a signal supplied from the operation input unit 30, whether a command for a file-based addition process, i.e., a command to start an addition process of adding a file contained in a directory identified by a predetermined disc_id has been received from a user. If it is determined in step S1 that the command to start the file addition process has not been received, step S1 is repeated until it is determined that the command to start the file addition process has been received.

If it is determined in step S1 that the command to start the file addition process has been received, the local storage directory manager 63 in the controller 21 controls the data acquisition unit 33 in step S2, thereby accessing the server 3 via the Internet interface 25 and the network 2 to transmit information indicating the status of the current virtual file system, such as the manifest_id identifier of the manifest ( ) section, to the server 3.

In step S3, the data acquisition unit 33 controls the Internet interface 25, thereby determining whether information corresponding to the list of downloadable files has been received from the server 3 via the network 2.

If it is determined in step S3 that the information corresponding to the list of downloadable files has not been received, the menu screen display controller 62 controls in step S4 displaying of an error message notifying the user that the file addition process is disabled, and then ends the process.

If it is determined in step S3 that the information corresponding to the list of downloadable files has been received, the data acquisition unit 33 supplies in step S5 the menu screen display controller 62 with information regarding the list of downloadable files transmitted from the server 3 and received via the Internet interface 25. The menu screen display controller 62 causes a display device to display a menu screen of the list of downloadable files from which the user is allowed to select one.

In step S6, the operation input acquisition unit 61 determines whether the user has selected an item to be added using one of buttons and icons on the menu screen displayed under the control of the menu screen display controller 62. If it is determined in step S6 that any item the user may want to add has not been selected, step S6 is repeated until it is determined that any item has been selected.

If it is determined in step S6 that the item the user may want to add has been selected, the operation input acquisition unit 61 supplies in step S7, to the data acquisition unit 33, information indicating the content of updating selected by the user. The data acquisition unit 33 controls the Internet interface 25 and transmits information indicating a requested file to the server 3 to request the server 3 to send back the file selected by the user.

In step S8, the data acquisition unit 33 controls the Internet interface 25, thereby causing the server 3 to download one of a PlayList file, a ClipInformation file, a clip AV stream file, an audio file, a caption text stream file, and a font file, prepared as download files. The data acquisition unit 33 then notifies the local storage directory manager 63 that these files have been downloaded.

In step S9, the local storage directory manager 63 determines whether the local storage 24 has already stored directories identified by the author_id and disc_id identifiers contained in the manifest ( ) of the downloaded files. If the corresponding directory is present on the local storage 24, the downloaded data file is expanded on that directory. If no corresponding directory is present, a new directory specified by the author_id and disc_id identifiers is created, and the downloaded data file is then expanded thereon.

Figure 20:
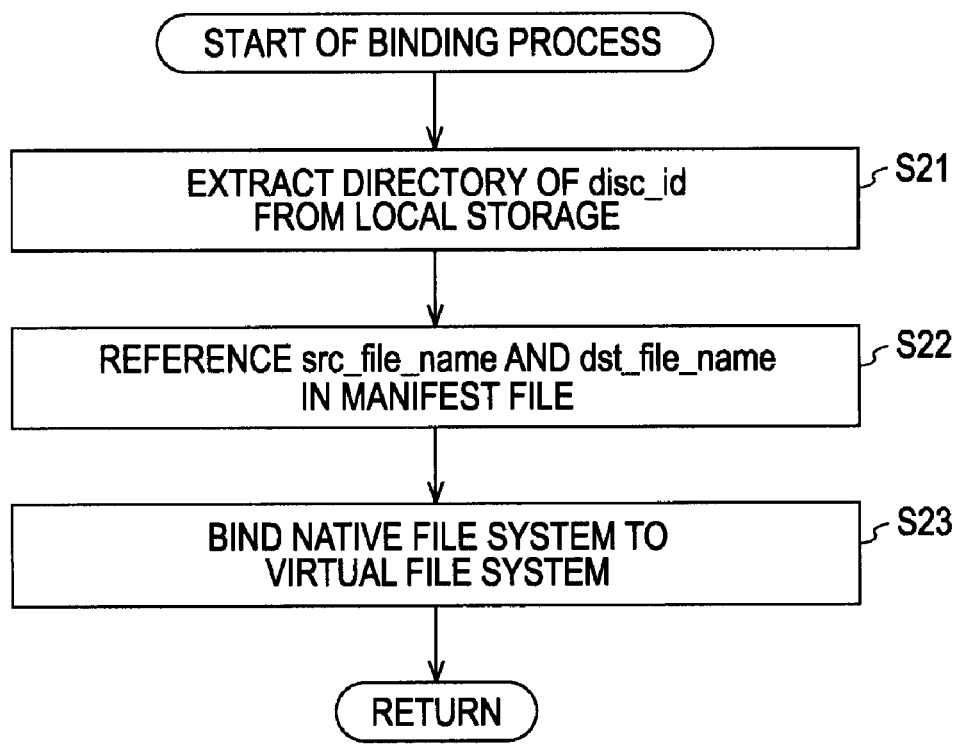
FIG. 20 is a flowchart illustrating a binding process.

In step S10, a binding process to be described later with reference to FIG. 20 is performed.

Through this process, the update file is downloaded from the server 3, stored on the local storage 24, and handled as an update file of the content recorded on the optical disk 11.

For example, a user purchases an optical disk 11 having a content such as a movie recorded thereon. The user then acquires a file required to display a caption of a language unrecorded on the optical disk 11 or a file required to listen to a bonus track, and then stores those files on the local storage 24. The application program for performing the playback process can thus handle the data recorded on the optical disk 11 and the data recorded on the local storage 24 without any difference. As a result, a virtual file system that hides the storage of physical data from the user and the application program is produced.

Those update files may be downloaded free of charge or for a fee.

The binding process executed in step S10 of FIG. 19 is described below with reference to the flowchart of FIG. 20.

In step S21, the local storage directory manager 63 extracts a directory of a corresponding disc_id from a downloaded data group stored on the local storage 24, and then supplies the directory to the file system merge processor 36.

In step S22, the file system merge processor 36 references the src_file_name and dst_file_name fields in the manifest file.

In step S23, the file system merge processor 36 binds a native file system to a virtual file system based on the src_file_name and dst_file_name referenced in step S22.

More specifically, the src_file_name presents a "path name" representing a path, i.e., information uniquely identifying where the corresponding file is recorded in the directory structure in the file system of the local storage 24. The dst_file_name field presents a "path name" representing a path, i.e., information uniquely identifying where the corresponding file is recorded in the directory structure at a binding destination in the virtual disk of the file stored on the local storage 24.

For example, in the manifest ( ) section described with reference to FIG. 12, "/MainMovie/movie01/main.r1.jp.mp2" as a path name might be specified in the src_file_name field and "/STREAM/01002.m2ts" as a path name might be specified in the dst_file_name field. As previously discussed with reference to FIG. 16, the downloaded data is stored under a file name of main.r1.jp.mp2 in a movie01 folder in MainMovie folder on the local storage 24 in accordance with the author_id and disc_id identifiers. In the virtual file system on the virtual disk, the file system merge processor 36 performs the binding process so that the downloaded data is handled as a file having a file name of 01002.m2ts in a STREAM directory.

The content author can specify the path name in the local storage 24 in the src_file_name field of the manifest ( ) section of the downloaded file package, and the path name of the virtual file system on the virtual disk in the dst_file_name field. If the path name adapted to the virtual file system on the virtual disk (i.e., adapted to the file system of the optical disk 11) is set in the dst_file_name field, the content author can freely set the file/directory structure under the disc_id identifier and add newly a directory and a file in an area under the disc_id identifier of the data actually recorded on the local storage 24 in the recording and reproducing apparatus 1.

Figure 21:
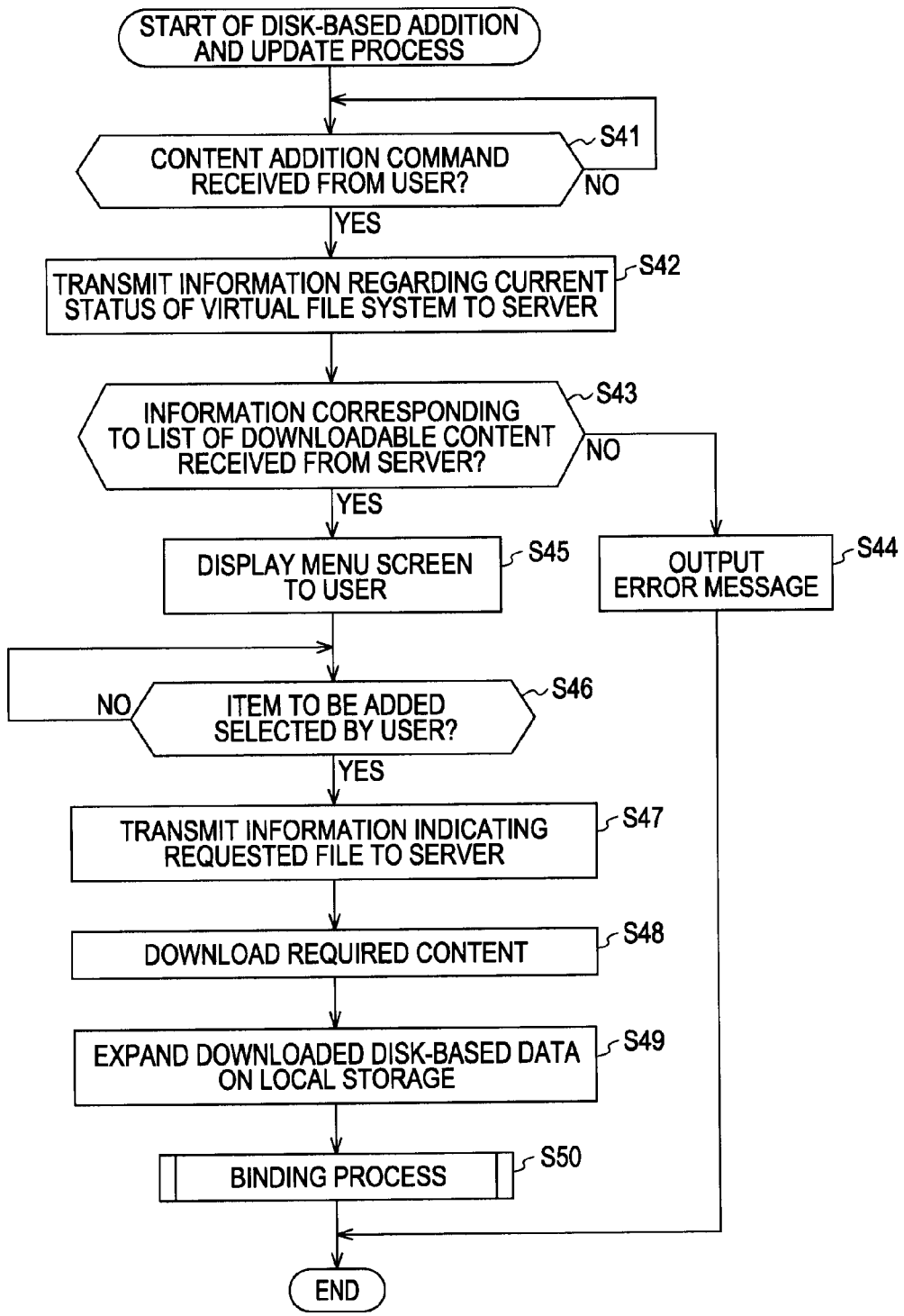
FIG. 21 is a flowchart illustrating a disk-based addition and update process.

The disk-based addition and update process described below with reference to the flowchart of FIG. 21.

In step S41, the operational input acquisition unit 61 in the controller 21 determines, based on a signal supplied from the operation input unit 30, whether a command for a disk-based addition process, i.e., a command to start an addition process of adding a file contained in a directory identified by a predetermined disc_id has been received from a user. If it is determined in step S41 that the command to start the file addition process has not been received, step S1 is repeated until it is determined that the command to start the file addition process has been received.

If it is determined in step S41 that the command to start the file addition process has been received, the local storage directory manager 63 in the controller 21 controls the data acquisition unit 33 in step S42, thereby accessing the server 3 via the Internet interface 25 and the network 2 to transmit information indicating the status of the current virtual file system, such as the manifest_id identifier of all the manifest ( ) section contained in the manifest file under disc_id identifier, to the server 3.

In step S43, the data acquisition unit 33 controls the Internet interface 25, thereby determining whether information corresponding to the list of downloadable disk-based files has been received from the server 3 via the network 2.

If it is determined in step S43 that the information corresponding to the list of downloadable disk-based files has not been received, the menu screen display controller 62 controls in step S44 displaying of an error message notifying the user that the file addition process is disabled, and then ends the process.

If it is determined in step S43 that the information corresponding to the list of downloadable disk-based files has been received, the data acquisition unit 33 supplies in step S45 the menu screen display controller 62 with information regarding the list of downloadable disk-based files transmitted from the server 3 and received via the Internet interface 25. The menu screen display controller 62 causes a display device to display a menu screen of the list of downloadable disk-based files from which the user is allowed to select one.

In step S46, the operation input acquisition unit 61 determines whether the user has selected an item to be added using one of buttons and icons on the menu screen displayed under the control of the menu screen display controller 62. If it is determined in step S46 that any item the user may want to add has not been selected, step S46 is repeated until it is determined that any item has been selected.

If it is determined in step S46 that the item the user may want to add has been selected, the operation input acquisition unit 61 supplies in step S47, to the data acquisition unit 33, information indicating the content of updating selected by the user. The data acquisition unit 33 controls the Internet interface 25 and transmits information indicating a requested file to the server 3 to request the server 3 to send back the disk-based file selected by the user.

In step S48, the data acquisition unit 33 controls the Internet interface 25, thereby causing the server 3 to download a disk-based file group, prepared by the server 3 as download files. The data acquisition unit 33 then notifies the local storage directory manager 63 that the disk-based file group has been downloaded.

In step S49, the local storage directory manager 63 generates on the local storage 24 directories identified by the author_id and disc_id identifiers contained in the downloaded manifest section ( ), and expands the downloaded disk-based data on the directories.

In step S50, a binding process previously described with reference to FIG. 20 is performed.

Through this process, the disk-based update file is downloaded from the server 3, stored on the local storage 24, and handled as an update file of the content recorded on the optical disk 11.

For example, a user purchases an optical disk 11 having a content such as a movie recorded thereon. The user then acquires a file required to display a caption of a language unrecorded on the optical disk 11 or a file required to listen to a bonus track, and then stores those files on the local storage 24. The application program for performing the playback process can thus handle the data recorded on the optical disk 11 and the data recorded on the local storage 24 without any difference. As a result, a virtual file system that hides the storage of physical data from the user and the application program is produced.

As the file-based update files, those disk-based update files may be downloaded free of charge or for a fee.

The process to be performed in response to the file-based download command issued from the user has been discussed with reference to FIG. 19, and the process to be performed in response to the disk-based download command issued by the user has been discussed with reference to FIG. 21. The user may issue a file download command without discriminating between the file-based download and the disk-based download command. More specifically, the expansion method of the data downloaded by the local storage directory manager 63 on the local storage 24 may be changed depending on whether the format of the data downloaded from the server 3 is file-based or disk-based.

Figure 22:
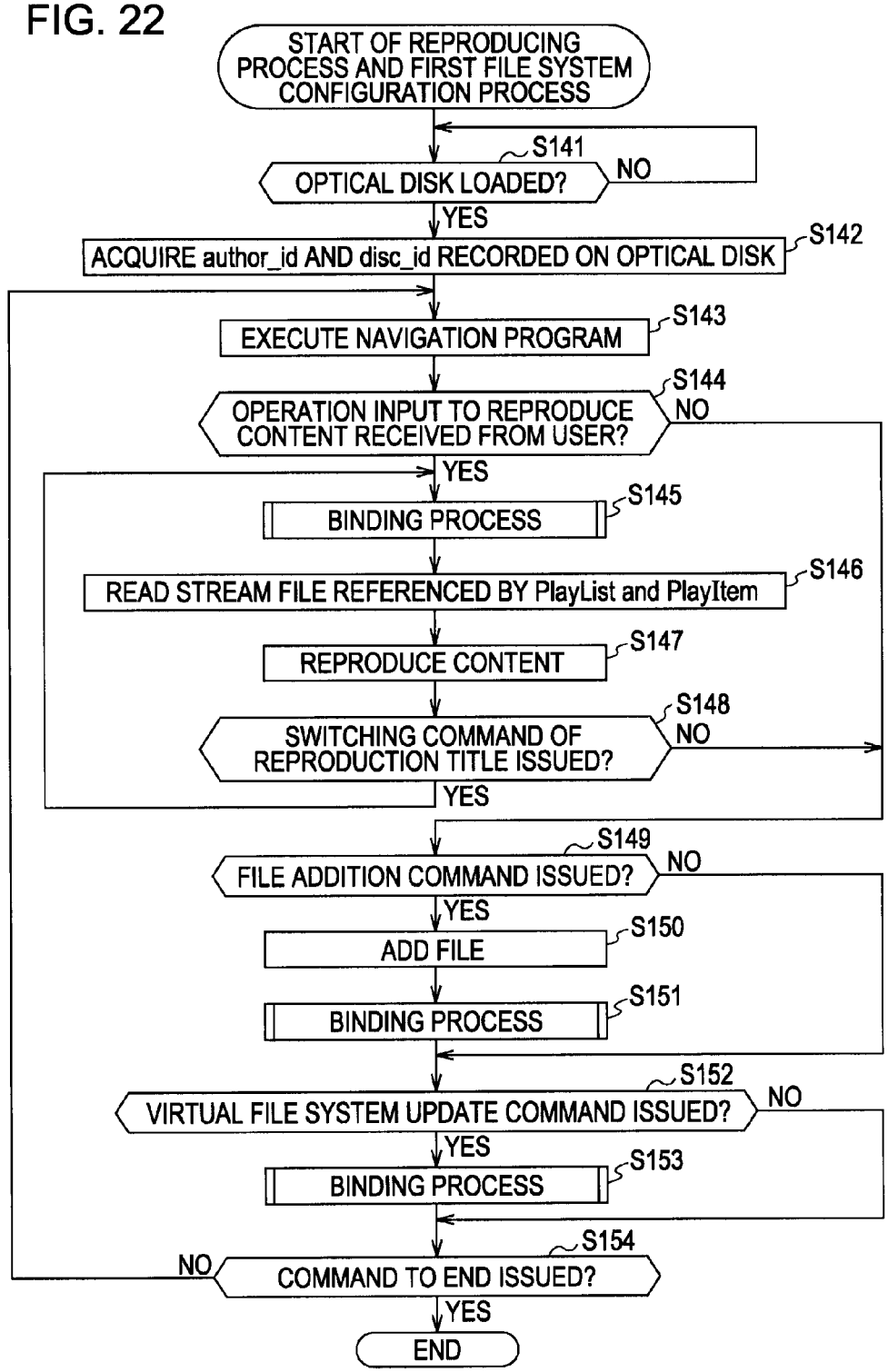
FIG. 22 is a flowchart illustrating a reproducing process and a first file system configuration process.

A reproducing process and a first file system configuration process are described below with reference to a flowchart of FIG. 22.

In step S141, the optical disk directory manager 64 determines whether the optical disk 11 is loaded. If it is determined in step S141 that the optical disk 11 is not loaded, step S141 is repeated until it is determined that the optical disk 11 is loaded.

If it is determined in step S141 that the optical disk 11 is loaded, the optical disk directory manager 64 reads the author_id and disc_id from the optical disk 11 and supplies the read author_id and disc_id to the local storage directory manager 63 and the file system merge processor 36 in step S142.

In step S143, the controller 21 executes the navigation program.

In step S144, the reproducing controller 37 determines based on a user operation input supplied from the operation input acquisition unit 61 whether the operation input requesting content reproduction has been received from the user. If it is determined in step S144 that the operation input requesting content reproduction has not been received from the user, processing proceeds to step S149.

If it is determined in step S144 that the operation input requesting content reproduction has been received, the operation input acquisition unit 61 supplies a signal responsive to the user operation input to the optical disk directory manager 64. The optical disk directory manager 64 outputs the read author_id and disc_id to the local storage directory manager 63. In step S145, the binding process discussed with reference to FIG. 20 is performed.

In step S146, the reproducing controller 37 controls the local storage directory manager 63 and the optical disk directory manager 64, thereby acquiring the PlayList and the SubPlayItem specified by the navigation program as a playback period, reading steam files (such as an AV file, an audio file, a text caption file, etc.) referenced by the acquired PlayList and SubPlayItem, and supplying the stream files to the decoder 26. Timestamp represented by the PlayList and SubPlayItem is converted into an address in accordance with the clip information and the AV stream is thus accessed.

In step S147, the reproducing controller 37 controls the file system merge processor 36, thereby reproducing the content specified by the PlayList.

In step S148, the operation input acquisition unit 61 determined whether an operation input requesting switching of the playback title (of the content to be reproduced) has been received. If it is determined in step S148 that a user operation input requesting switching of the playback title has not been received, processing proceeds to step S149.

If it is determined in step S148 that the user operation input requesting switching of the playback title has been received, the operation input acquisition unit 61 supplies a signal responsive to the user operation input to the optical disk directory manager 64. The optical disk directory manager 64 outputs the author_id and disc_id read from the optical disk 11 to the local storage directory manager 63. Processing returns to step S145 to repeat step S145 and subsequent steps.

If it is determined in step S144 that the user operation input requesting the content playback has not been received or if it is determined in step S148 that the user operation input requesting switching of the playback title has not been received, the operation input acquisition unit 61 determines in step S149 whether a file addition command has been issued by the user.

If it is determined in step S149 that a file addition command has been issued from the user, one of the data acquisition unit 33 and the local storage directory manager 63 performs the file addition process in step S150 in the same manner as described with reference to FIGS. 19 and 21.

In step S151, the binding process discussed with reference to FIG. 20 is performed.

If it is determined in step S149 that no file addition command has been issued from the user, or subsequent to step S151, the operation input acquisition unit 61 determines in step S152 whether a command to update the virtual file system has been issued.

If it is determined in step S152 that a command to update the virtual file system has been issued, API defining the updating of the virtual file system (for example, update ( )) is called. In step S153, the binding process discussed with reference to FIG. 20 is performed.

If it is determined in step S152 that a command to update the virtual file system has not been issued, or subsequent to step S153, the operation input acquisition unit 61 determines in step S154 whether a command to complete the process of the recording and reproducing apparatus 1 (for example, a command to complete the application or a command to switch off the recording and reproducing apparatus 1) has been issued.

If it is determined in step S154 that the command to complete the process of the recording and reproducing apparatus 1 has not been issued, processing returns to step S143 to repeat step S143 and subsequent steps. If it is determined in step S154 that the process of the recording and reproducing apparatus 1 has been issued, processing ends.

The data pre-recorded on the optical disk 11 and the data downloaded from the server 3 and then stored on the local storage 24 are bound to each other at a predetermined timing to form the virtual file system, and the content is reproduced based on the virtual file system.

In the above discussion, the binding process is performed after the file addition process has been performed. It is perfectly acceptable that the binding process is performed after the file deletion process.

Through the above-described process, the update file of the content recorded on the optical disk 11 is downloaded and then stored on the local storage 24 in the recording and reproducing apparatus 1. The content file recorded on the optical disk 11 and the update file stored on the local storage 24 are thus easily handled.

The virtual file system is defined as an upper layer of the native file system of the recording and reproducing apparatus 1 (i.e., the file system of the data recorded on one of the optical disk 11 and the local storage 24). The file systems of the data actually recorded on the optical disk 11 and the local storage 24 are merged into the virtual file system. The author_id and disc_id are described as identifiers in the manifest file as the metadata of the downloaded.

The disk area of the local storage 24 has a directory structure that is partitioned for each author_id identifier, and a flexible file/directory structure is configured by the content author under the disc_id identifier immediately under author_id identifier. The file/directory structure of the downloaded file indicating where the data is placed in the disk area of the local storage 24 is described by a path name in the src_file_name field in the manifest data contained in the downloaded data.

In contrast, the file/directory structure of the virtual disk accessible from the application is designed to comply with the file/directory structure of the optical disk 11. A path name uniquely identifying a bind destination of the file in the virtual disk on the local storage 24 is specified in the dst_file_name field in the manifest data contained in the downloaded data.

In this way, the file/directory structure of the local storage 24 is hidden from the application program of the recording and reproducing apparatus 1 and the user.

Figure 23:
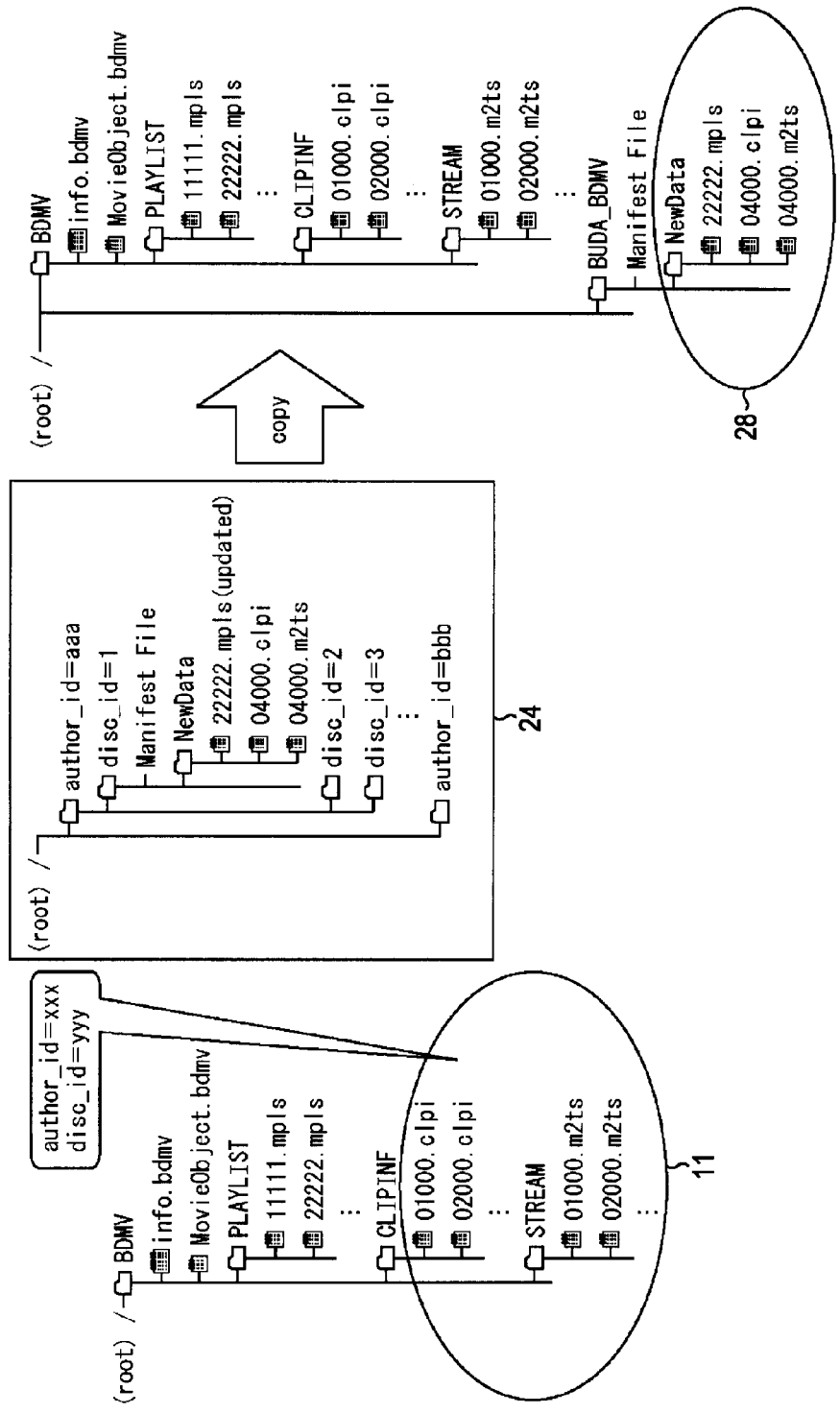
FIG. 23 illustrates a process that is performed to record data recorded on the optical disk and data stored on the local storage on an optical disk loaded on a second drive.

With reference to FIG. 23, the process of the recording and reproducing apparatus 1 is discussed. In the process, at least a portion of each of the data recorded on the optical disk 11 and the data stored on the local storage 24 are recorded on the optical disk 28 loaded on the second drive 27.

As previously discussed, the file system of the data recorded on the optical disk 11 is bound to the file system of the data stored on the local storage 24 into the virtual file system.

In accordance with the virtual file system discussed with reference to FIG. 17, at least a portion of each of the data recorded on the optical disk 11 and the data stored on the local storage 24 are recorded on the optical disk 28 loaded on the second drive 27 in the recording and reproducing apparatus 1.

More specifically, update data might be downloaded and stored on the local storage 24 to reproduce a simple animation in synchronization with the playing of video and audio of a main path recorded on the optical disk 11 in the recording and reproducing apparatus 1. In this case, the file systems of the optical disk 11 and the local storage 24 are bound, and the video and audio of the main path are read from the optical disk 11 while the update data for reproducing the simple animation is read from the local storage 24. In accordance with the virtual file system generated in the recording and reproducing apparatus 1, at least a portion of each of the data recorded on the optical disk 11 and the data stored on the local storage 24 are recorded on the optical disk 28 loaded on the second drive 27.

When the content and the update data recorded on the optical disk 28 are reproduced, there is a possibility that the video and audio of the main path recorded on the optical disk 28 and a plurality of still images forming the animation cannot be read to within the reproducing rate depending on the data reading rate of the recording and reproducing apparatus 1. In such a case, the playing of the video and audio of the main path may have a priority higher than the animation, and the reading of the still image data file from the optical disk 28 may be placed lower in priority. The still image data file cannot be read at all depending on the rate setting of the video and audio of the main path.

The content data copied from the local storage 24 to the optical disk 28 might replace the clip AV stream of the main path originally recorded on the optical disk 11, or might be data having a low reading rate, such as a text caption, popup menu type interactive graphics stream or a browsable slideshow audio stream. In such a case, the recording and reproducing apparatus 1 is free from the problem that the data reading cannot be performed to within the reproducing rate. However, depending on the type of content data copied from the local storage 24 to the optical disk 28, the recording and reproducing apparatus 1 fails to read the data from the optical disk 28 to within the reproducing rate. The content author, who has supplied the optical disk 11 and the update data recorded on the local storage 24, cannot supply the intended reproducing application.

In view of this inconvenience, the recording and reproducing apparatus 1 records the data originally recorded on the optical disk 11 on the optical disk 28 in accordance with the file system of the optical disk 11. A new BUDA_BDMV directory is defined in parallel with a BDMV directory on the optical disk 11. Data stored in the author_id and disc_id directories corresponding to the optical disk 11, out of the data recorded on the local storage 24, is copied to the BUDA_BDMV directory. In this way, the data recorded on the optical disk 11 is discriminated from the data stored on the local storage 24 in the optical disk 28.

The manifest file is recorded together with another file managed by the manifest file under the BUDA_BDMV directory.

The author_id and disc_id information, recorded on the optical disk 11, is recorded on the optical disk 28 in the recording and reproducing apparatus 1.

The author_id and disc_id information is recorded on a predetermined readable location on the optical disk 28 loaded on the recording and reproducing apparatus 1. More specifically, the author_id and disc_id may be recorded at any location under one of the BDMV directory and the BUDA_BDMV directory, or may be recorded at a recording area different from the BDMV directory and the BUDA_BDMV directory.

The data format of the data recorded on the optical disk 28 is backward compatible with the data format of the data recorded on the optical disk 11.

The copying of the data to the optical disk 28 is not limitless but subject to certain limitation.

For example, if an optical disk 11 having content such as a movie recorded thereon is purchased, the content may be copied to a peripheral device to the optical disk 28 by n times, or may be copied to the peripheral device for a fee for each time. With this limitation, the unauthorized circulation of the content is prevented. Once a user purchases a package medium having content recorded thereon, the user can enjoy viewing the content on an apparatus other than the recording and reproducing apparatus 1 with a certain degree of freedom.

Managed copy is available as one of copyright protection techniques.

The managed copy is the function of advanced access content system (AACS) as the copyright protection technique. The managed copy technique allows content recorded on a package medium such as the optical disk 11 to be copied to another medium or to be stream delivered to another apparatus via a predetermined network. To use the managed copy function, each user needs to be authenticated by a managing server such as a content author through a predetermined method.

A process of constructing a virtual file system is described below with reference to FIG. 24. When the data recorded on the optical disk 28 is reproduced, the data under BUDA_BDMV directory copied from the local storage 24, out of the files recorded on the optical disk 28, is copied to the local storage 24 and the binding process is performed in order to construct the virtual file system.

The update data for reproducing and displaying a simple animation in synchronization with the playing of the video and audio of the main path recorded on the optical disk 11 might be downloaded and stored on the local storage 24. The file systems of the optical disk 11 and the local storage 24 are bound and the video and audio of the main path are read from the optical disk 11 while the update data for reproducing and displaying the simple animation is read from the local storage 24.

Through the process discussed with reference to FIG. 23, the optical disk 28 records the update data for reproducing and displaying the simple animation together with the content data file of the video and audio of the main path recorded on the optical disk 11.

If the reading rate of the data from the optical disk 28 is high in the recording and reproducing apparatus 1, the video and audio of the main path are read while the plurality of still images forming the animation is read a predetermined frame rate so that the animation at the predetermined frame rate is reproduced in synchronization with the video and audio of the main path. Depending on the data reading rate of the recording and reproducing apparatus 1, the video and audio of the main path and the plurality of still images forming the animation cannot be read to within the reproducing rate.

A portion of the data recorded on the optical disk 11 can be moved to the local storage 24. The reproducing process can be thus performed at a rate higher than the data reading rate achieved by the optical disk 11 alone.

The data under the BUDA_BDMV directory copied from the local storage 24, out of the data recorded on the optical disk 28, is copied beforehand to the local storage 24 in the recording and reproducing apparatus 1, and then the virtual file system is constructed in this state. The sum of the transfer rate of the optical disk 11 and the transfer rate of the local storage 24 may be set to be a maximum virtual transfer rate. In this way, the recording and reproducing apparatus 1 can perform the reproducing process that requires a transfer rate higher than a transfer rate at which the content data is read from the optical disk 11 alone.

More specifically, when the optical disk 28 is loaded on the first drive 22, the controller 21 determines whether data under the BUDA_BDMV directory copied from the local storage 24 is present on the optical disk 28. If it is determined that the data under the BUDA_BDMV directory is present, the controller 21 executes the navigation program after copying the data under the BUDA_BDMV directory to the local storage 24, and then performs a variety of processes including the reproducing process.

When predetermined data is copied from the optical disk 11 to the local storage 24, the same data is naturally present on both the optical disk 11 and the local storage 24. The corresponding data needs to be read from the local storage 24 rather than from the optical disk 11.

When a new data file is downloaded and stored on the local storage 24, a manifest file is also downloaded together with the data file as necessary. A virtual file system is constructed in accordance with the src_file_name and dst_file_name written in the manifest file. When the data under the BUDA_BDMV directory is copied from the optical disk 28 to the local storage 24, the data under the BUDA_BDMV directory is contained in the manifest file. The binding process is thus performed without any problem. A virtual file system is thus constructed in accordance with the src_file_name and dst_file_name contained in the manifest file.

Figure 24:
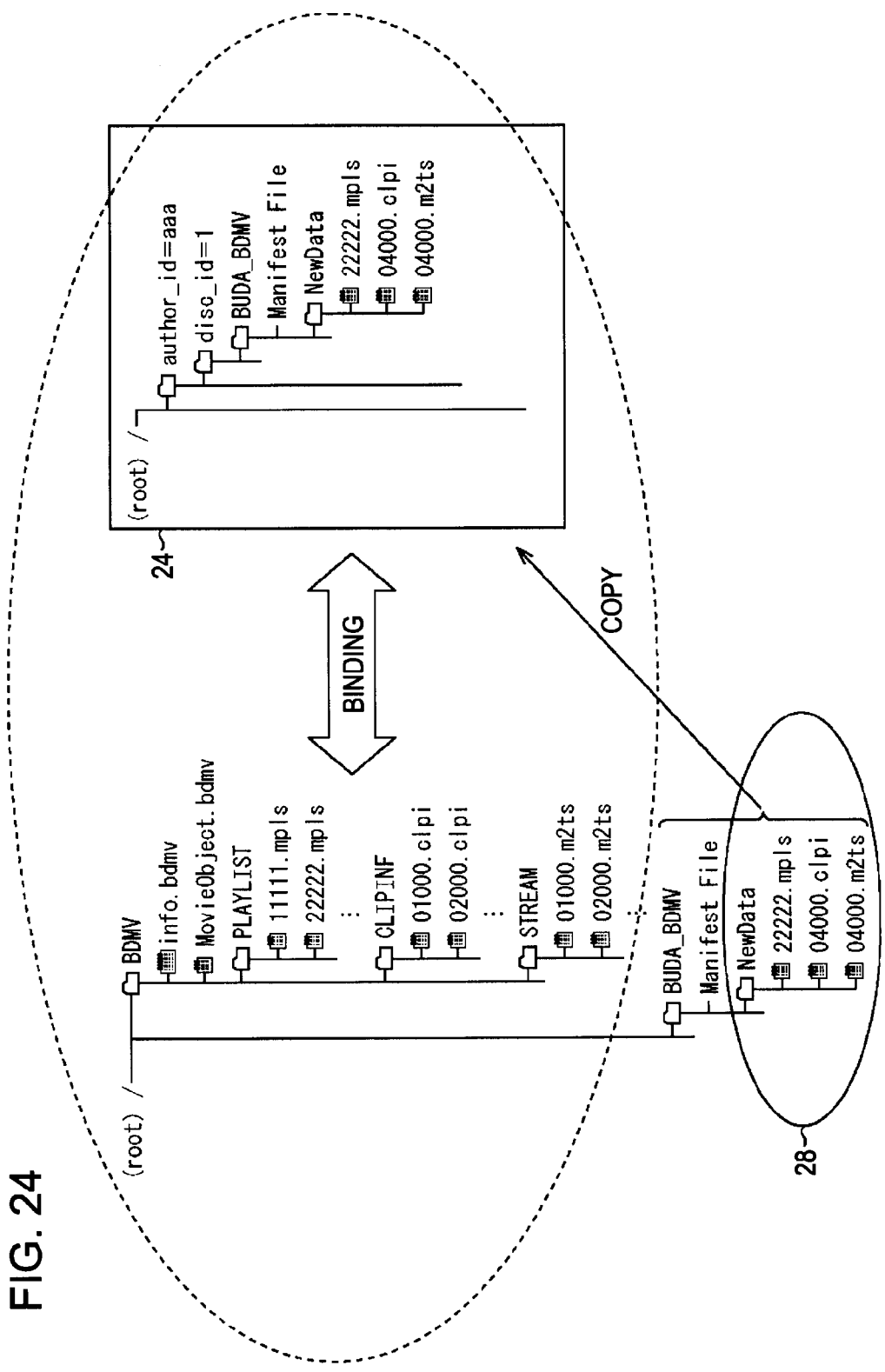
FIG. 24 illustrates a copy process that is performed to copy predetermined data recorded on the optical disk to the local storage.
Figure 25:
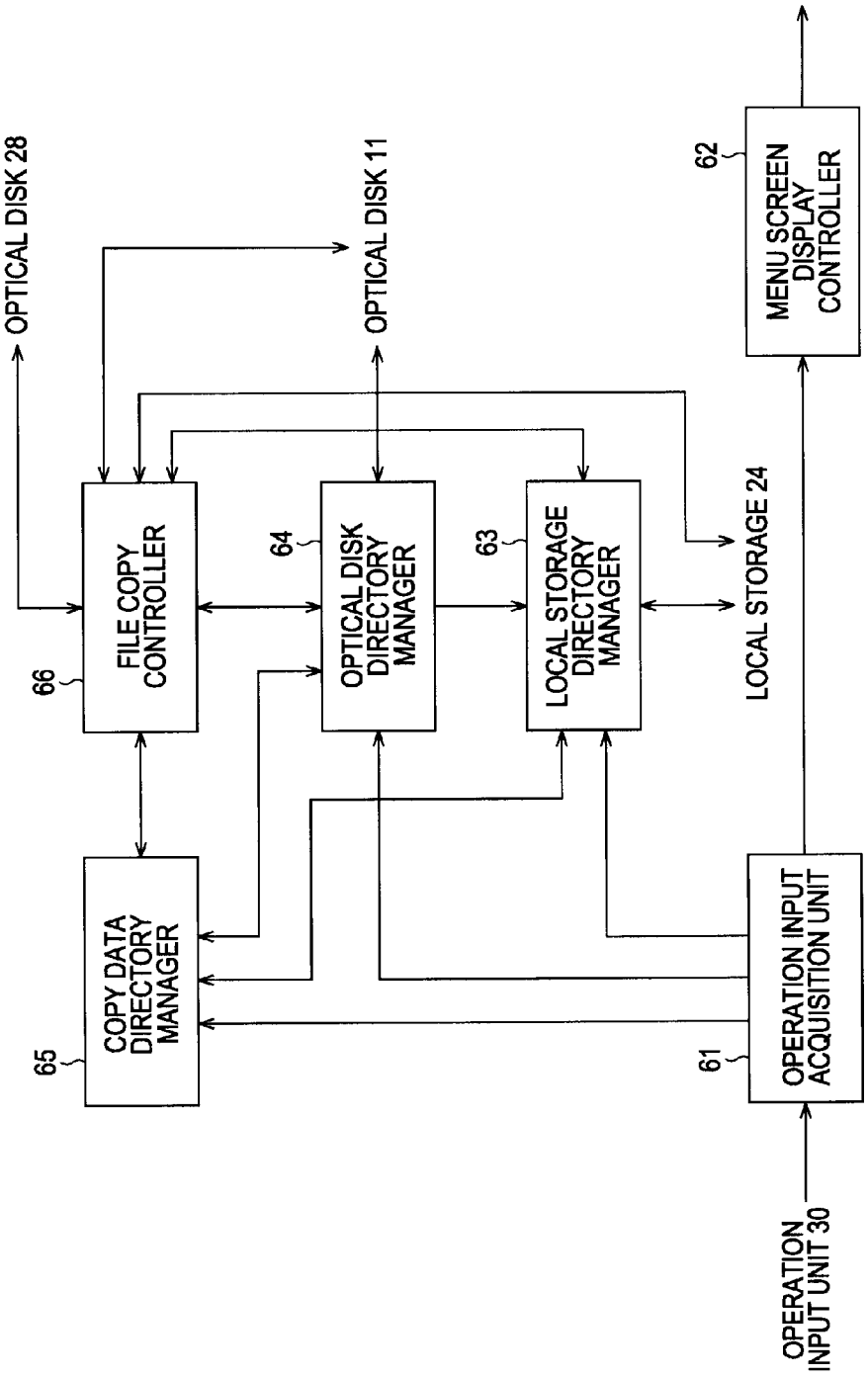
FIG. 25 is a functional block diagram of a function performed by a controller under the control the programs illustrated in FIGS. 23 and 24.

FIG. 25 is a functional block diagram of the function of the controller 21 that executes the program of the process discussed with reference to FIGS. 23 and 24. The process includes a copying operation for copying data from the optical disk 11 and the local storage 24 to the optical disk 28, and a copying operation for copying the data under the BUDA_BDMV directory out of the data recorded on the optical disk 28 to the local storage 24 (after that, the virtual file system is constructed, and the reproducing process is performed).

The process is independent of the above-described navigation program. For example, the program is executed only when the user issues a command to copy the updated content reproducible based on the virtual file system to the optical disk 28 or when the optical disk 28 having the BUDA_BDMV directory is loaded. The updated content reproducible based on the virtual file system includes data recorded on the optical disk 11 specified by author_id and disc_id and data specified by the same author_id and disc_id out of the data recorded on the local storage 24.

When the program of the process discussed with reference to FIGS. 23 and 24 is executed, the controller 21 performs the functions as an operation input acquisition unit 61, a menu screen display controller 62, a local storage directory manager 63, an optical disk directory manager 64, a copy data directory manager 65, and a file copy controller 66 as shown in FIG. 25.

The operation input acquisition unit 61 acquires a signal responsive to a user operation input entered via the operation input unit 30, and outputs the signal responsive to the user operation input to an appropriate point in each of the menu screen display controller 62, the local storage directory manager 63, the optical disk directory manager 64, and the copy data directory manager 65.

The menu screen display controller 62 causes an external display device to display a menu screen containing buttons. The user operates buttons to issue a command to copy the content recorded on the optical disk 11 and the update data stored on the local storage 24 to the optical disk 28.

The local storage directory manager 63 manages the directories of the local storage 24, and controls data writing on the local storage 24 and data reading from the local storage 24. The update data file read from the local storage 24 under the control of the local storage directory manager 63, such as the video data and audio data of the AV stream, and the text data of the text caption file, is output to the second drive 27 to be recorded on the optical disk 11. When the file under the BUDA_BDMV directory recorded on the optical disk 28 is copied to the local storage 24, the local storage directory manager 63 sets a path in the file system of the local storage 24 in accordance with the author_id and disc_id recorded on the optical disk 28.

The optical disk directory manager 64 detects and manages the directories of one of the optical disk 11 and the optical disk 28, and controls data reading from one of the optical disk 11 and the optical disk 28. The author_id and disc_id as the identification information are set in the optical disk 11 and the author_id and disc_id of the optical disk 11 as a copy source are recorded on the optical disk 28 as information for identifying the recorded data. The author_id and disc_id read from one of the optical disk 11 and the optical disk 28 under the control of the optical disk directory manager 64 are output to each of the local storage directory manager 63, the copy data directory manager 65, and the file copy controller 66.

The copy data directory manager 65 manages the directory structure of the data on the optical disk 28 to be copied from the optical disk 11 and the local storage 24 to the optical disk 28.

The file copy controller 66 controls the copying of the data files from the optical disk 11 and the local storage 24 to the optical disk 28 loaded on the second drive 27 and determines whether the directory for the update data, namely, the BUDA_BDMV directory is present on the optical disk loaded on the first drive 22 (one of the optical disk 11 and the optical disk 28). If it is determined that the directory for the update data is present, the file copy controller 66 controls the data reading of the data under that directory while also controlling the file copying to the local storage 24.

More specifically, as described with reference to FIG. 23, the copy data directory manager 65 and the file copy controller 66 copy the data under the BDMV directory on the optical disk 11 to the optical disk 28, define in the file system of the optical disk 28 a new BUDA_BDMV directory in parallel with the BDMV directory on the optical disk 11, and copy the data stored at the author_id and disc_id directories corresponding to the optical disk 11, out of the data recorded on the local storage 24 to the BUDA_BDMV directory. The file copy controller 66 the author_id and disc_id recorded on the optical disk 11 to any area of the optical disk 28 as information identifying the copied data.

In accordance with the author_id and disc_id recorded on the loaded optical disk 28, the file copy controller 66 copies the file data under the BUDA_BDMV directory on the optical disk 28 to the corresponding author_id and disc_id directories managed by the optical disk directory manager 64.

The process discussed with reference to FIGS. 23 through 25 is performed by the program different from the navigation program. It is perfectly acceptable if the navigation program can execute the above-discussed process.

A copying process of updated content is described below with reference to a flowchart of FIG. 26.

Figure 26:
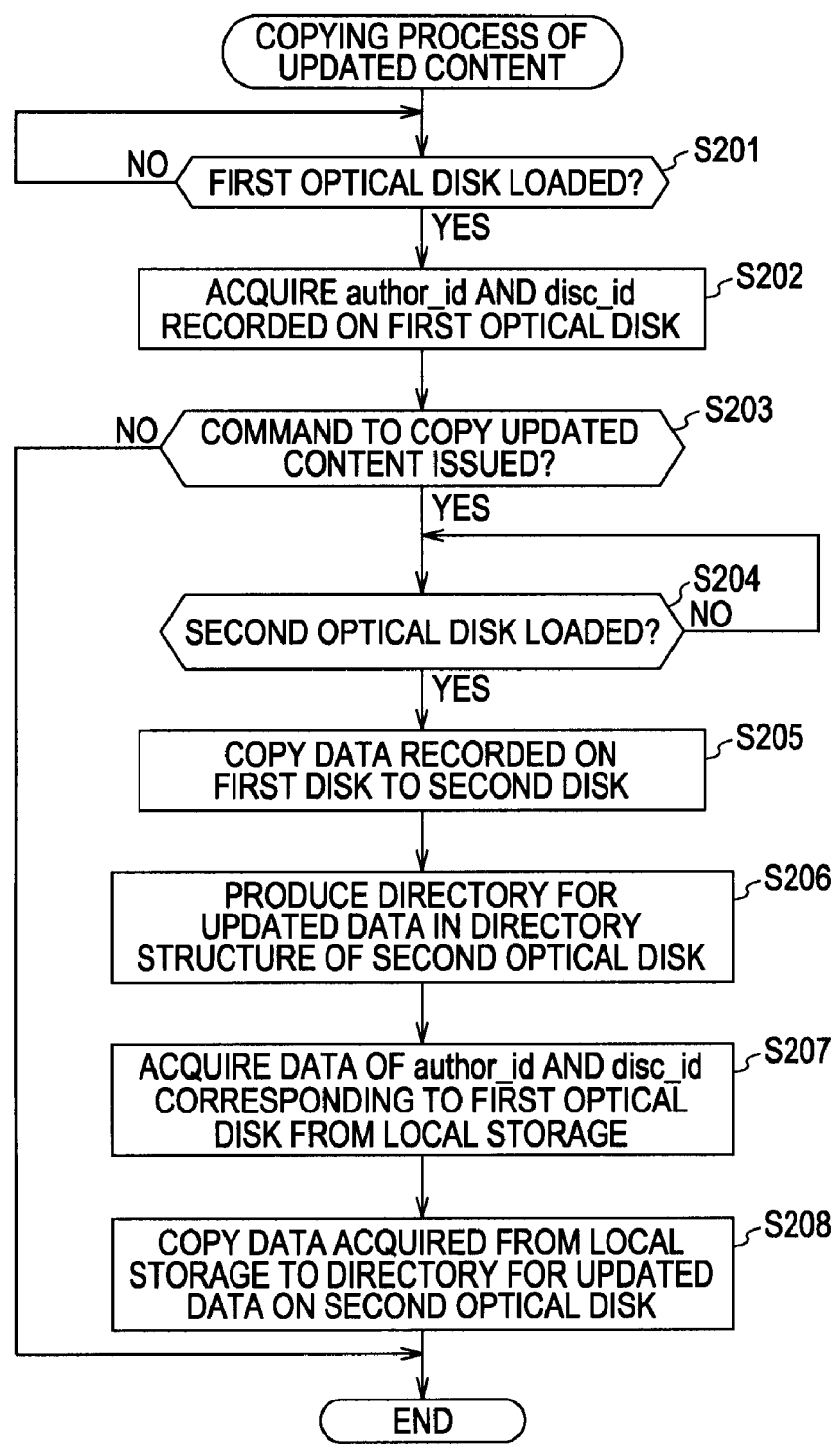
FIG. 26 is a flowchart illustrating a copy process of updated content.

The process of the flowchart of FIG. 26 is performed with the optical disk 11 loaded on the first drive 22. In the process, at least a portion of each of the data recorded on the optical disk 11 and the data stored on the local storage 24 is coped to the optical disk 28 loaded on the second drive 27.

In step S201, the first drive 22 determines whether a first disk, namely, the optical disk 11 is loaded thereon. If it is determined in step S201 that the optical disk 11 is not loaded, step S201 is repeated until it is determined that the optical disk 11 is loaded.

If it is determined in step S201 that the optical disk 11 is loaded, the first drive 22 reads author_id and disc_id from the optical disk 11 and supplies the read author_id and disc_id to the memory 23 in step S202.

In step S203, the operation input unit 30 determines based on a user operation input whether a command to copy the updated content, namely, the content recorded on the optical disk 11 and the update data of the corresponding author_id and disc_id stored on the local storage 24 to the optical disk 28 has been issued. If it is determined in step S203 that the command to copy the updated content to the optical disk 28 has not been issued, processing ends.

If it is determined in step S203 that the command to copy the updated content to the optical disk 28 has been issued, the controller 21 starts in step S204 the application program discussed with reference to FIGS. 23 through 25. The second drive 27 determines whether a second optical disk, namely, the optical disk 28 has been loaded. If it is determined in step S204 that the optical disk 28 has not been loaded, step S204 is repeated until it is determined that the optical disk 28 has been loaded.

If it is determined in step S204 that the optical disk 28 has been loaded, the file copy controller 66 copies the data recorded on the optical disk 11 as the first optical disk to the optical disk 28 as the second optical disk in step S205. The file copy controller 66 then records the author_id and disc_id recorded on the optical disk 11 as the first optical disk to any recording area of the optical disk 28 as the second optical disk.

In step S206, the copy data directory manager 65 creates a directory for the update data, namely, a BUDA_BDMV directory discussed with reference to FIG. 23 in the directory structure of the optical disk 28 as the second optical disk.

In step S207, the local storage directory manager 63 acquires from the local storage 24 the data under directories indicated by the author_id and disc_id corresponding to the optical disk 11 as the first optical disk.

In step S208, the file copy controller 66 copies the data under the directories indicated by the author_id and disc_id corresponding to the optical disk 11, acquired from the local storage 24, to the directory for the update data of the optical disk 28 as the second optical disk, namely, the BUDA_BDMV directory.

Through the above-discussed process, the updated content, namely, the content recorded on the optical disk 11 and the update data specified by the corresponding author_id and disc_id and stored on the local storage 24 are copied to the optical disk 28. The user might purchase the optical disk 11 having content such as a movie recorded thereon. The user can copy the updated content to a peripheral device such as the optical disk 28, and reproduce the updated content on the peripheral device other than the recording and reproducing apparatus 1.

A reproducing process and a second file system configuration process of the recording and reproducing apparatus 1 are described below with reference to a flowchart of FIG. 27.

The reproducing process is performed with the optical disk 28 loaded on the first drive 22 as previously discussed with reference to FIG. 24. The same process can be also performed even with the optical disk 28 loaded on the first drive 22. When the optical disk 11 having data containing no BUD-A_BDMV directory is loaded, the recording and reproducing apparatus 1 simply determines that the optical disk 11 has no directory for update data.

In step S231, the first drive 22 determines whether the optical disk 28 is loaded. If it is determined in step S231 that the optical disk 28 is not loaded, step S231 is repeated until it is determined that the optical disk 28 is loaded.

If it is determined in step S231 that the optical disk 28 is loaded, the first drive 22 reads the author_id and disc_id from the optical disk 28 and supplies the read author_id and disc_id to the memory 23 in step S232.

In step S233, the file copy controller 66 determines whether a directory for the update data is present on the optical disk 28. If it is determined in step S233 that no directory for update data is present, processing proceeds to step S237.

If it is determined in step S233 that a directory for update data is present, the file copy controller 66 inquires the local storage directory manager 63 in step S233 whether a directory having the same path as the directory for update data on the optical disk 28 is present under a directory of the local storage 24 specified by the author_id and disc_id recorded on the optical disk 28 (whether a file having the same file name is present if each file is arranged immediately under the directory specified by the author_id and disc_id of the local storage 24).

If the determination result in step S234 is that there is no directory having the same path as the directory for update data under the directory specified by the author_id and disc_id on the local storage 24, the file copy controller 66 copies data in the directory for update data recorded on the optical disk 28 to the directory of the corresponding author_id and disc_id on the local storage 24 in step S235.

If the determination result in step S234 is that there is no directory having the same path as the directory for update data under the directory specified by the author_id and disc_id on the local storage 24, the file copy controller 66 copies in step S235 the data of the directory for the update data recorded on the optical disk 28 to the directory specified by the author_id and disc_id on the local storage 24.

If the determination result in step S234 is that there is a directory having the same path as the directory for update data under the directory specified by the author_id and disc_id on the local storage 24, the file copy controller 66 changes in step S236 the directory name to the one different from the directory already recorded on the local storage 24, and then copies the data in the directory for the update data recorded on the optical disk 28 to the directory specified by the author_id and disc_id on the local storage 24.

The file copy controller 66 changes the src_file_name of the manifest file recorded on the BUDA_BDMV directory in response to the directory name change, and then copies the new src_file_name to the local storage 24.

If it is determined in step S233 that there is no directory for update date, or subsequent to step S235 or step S236, the first drive 22 reads the navigation program from the optical disk 28 and supplies the read navigation program to the memory 23 in step S237. The controller 21 executes the navigation program. More specifically, the controller 21 performs a variety of functions discussed with reference to FIG. 8. When the navigation program is executed, the reproducing process of the content is also performed in accordance with the navigation program.

In step S238, the file system merge processor 36 determines whether to perform a process, such as the reproducing process requiring the binding process, in accordance with the navigation program or in response to a user operation input entered via the operation input unit 30. If the file system merge processor 36 determines in step S238 not to perform the process requiring the binding process, processing proceeds to step S241.

If the file system merge processor 36 determines in step S238 to perform the process requiring the binding process, the local storage directory manager 63 determines in step S239 whether there is a directory specified by the corresponding author_id and disc_id on the local storage 24. If it is determined in step S239 that no directory specified by the corresponding author_id and disc_id is present, no binding process needs to be performed. Processing proceeds to step S241.

If it is determined in step S239 that there is a directory specified by the corresponding author_id and disc_id, the binding process discussed with reference to the flowchart of FIG. 20 is performed in step S240.

The update data is copied from the optical disk 28 to the directory specified by the author_id and disc_id of the local storage 24 corresponding to the optical disk 28. Although the update data from the optical disk 28 is recorded on the local storage 24, the binding process discussed with reference to the flowchart of FIG. 20 is performed in step S240 to generate the virtual file system.

If it is determined in step S238 that the process requiring the binding process is not to be performed, or if it is determined in step S239 that no directory specified by the corresponding author_id and disc_id is not present, or subsequent to step S240, the controller 21 determines in step S241 whether a command to end the navigation program has been issued.

If it is determined in step S241 that a command to end the navigation program has not been issued, processing returns to step S237 to repeat step S237 and subsequent steps. If it is determined in step S241 that a command to end the navigation program has been issued, processing ends.

When the optical disk 28 having the BUDA_BDMV directory is loaded on the recording and reproducing apparatus 1, the data recorded under the BUDA_BDMV directory is copied from the optical disk 28 to the local storage 24, the binding process is performed, and the reproducing process is then performed.

Through the above-described process, the recording and reproducing apparatus 1 is free from such a problem that the reading rate cannot catch up with the reproducing rate because the reading rate at which the first drive 22 reads the file data from the optical disk 28 is lower than the sum of the reproducing rates of the files that are to be read and reproduced at a time. Even in the recording and reproducing apparatus 1 having a drive of high-speed reading capability only, the reproducing process outperforming the data reading capability of the optical disk 28 is performed.

The recording and reproducing apparatus 1 may store a program, performing the above-described process, independent of the navigation program. The recording and reproducing apparatus 1 is free from the need for further recording, on the optical disk 28 having recorded the data, a program for automatically copying the file under the BUDA_BDMV directory to the local storage 24.

When the reading rate of the file data from one of the first drive 22 and the second drive 27 is sufficient high, the virtual file system is created as necessary by performing the binding process without copying the data recorded under the BUDA_BDMV directory from the optical disk 28 to the local storage 24. The data recorded on the optical disk 28 is thus reproduced.

The src_file_name recorded in the manifest file corresponds to the path of each file under the BUDA_BDMV directory recorded on the optical disk 28. In the same way as previously discussed, the file system of the data recorded under the BDMV directory on the optical disk 28 and the file system of the data recorded under the BUDA_BDMV directory are bound to each other to create the virtual file system.

A reproducing process and a third file system configuration process of the recording and reproducing apparatus 1 are described below with reference to a flowchart of FIG. 28. The reading rate of the file data from one of the first drive 22 and the second drive 27 is sufficiently high here.

One of the optical disk 11 and the optical disk 28 is loaded on the first drive 22 in the process herein. The same process can be performed even with the optical disk 28 loaded on the second drive 27.

In step S271, the first drive 22 determines whether one of the optical disk 11 and the optical disk 28 is loaded. If it is determined in step S271 that none of the optical disk 11 and the optical disk 28 is loaded, step S271 is repeated until it is determined that one of the optical disk 11 and the optical disk 28 is loaded.

If it is determined in step S271 that one of the optical disk 11 and the optical disk 28 is loaded, the first drive 22 reads the author_id and disc_id from the one of the optical disk 11 and the optical disk 28 and supplies the read author_id and disc_id to the memory 23 in step S272.

In step S273, the first drive 22 reads the navigation program from the one of the optical disk 11 and the second drive 27 and supplies the navigation program to the memory 23. The controller 21 performs the navigation program. The controller 21 performs each of the functions described with reference to FIG. 8. With the navigation program performed, the content is reproduced.

In accordance with the navigation program or in response to a user operation input entered via the operation input unit 30, the file system merge processor 36 determines in step S274 whether a process, such as the reproducing process, requiring the binding process is to be performed. If it is determined in step S274 that the process requiring the binding process is not to be performed, processing proceeds to step S281.

If it is determined in step S274 that the process requiring the binding process is to be performed, the optical disk directory manager 64 determines in step S275 whether a directory for update data, namely, a BUDA_BDMV directory is present on the loaded one of the optical disk 11 and the optical disk 28. If it is determined in step S275 that a directory for update data is present, processing proceeds to step S278.

If it is determined in step S275 that no directory for update data is present, the optical disk directory manager 64 determines in step S276 notifies the local storage directory manager 63 of the loaded one of the optical disk 11 and the optical disk 28 that there is no directory for update data. The local storage directory manager 63 determines whether the local storage 24 contains a directory specified by the author_id and disc_id corresponding to the loaded one of the optical disk 11 and the optical disk 28. If it is determined in step S276 that there is no directory specified by the author_id and disc_id, there is no need for performing the binding process. Processing proceeds to step S281.

If it is determined in step S276 that there is a directory specified by the author_id and disc_id, the binding process discussed with reference to the flowchart of FIG. 20 is performed in step S277. Processing proceeds to step S281.

If it is determined in step S275 that a directory for update data is present, in other words, that the loaded disk is the optical disk 28 discussed with reference to FIG. 23, the optical disk directory manager 64 notifies each of the local storage directory manager 63 and the file system merge processor 36 in step S278 that there is a directory for update data on the loaded optical disk 28. The local storage directory manager 63 binds the data of the directory for update data to the data of the other directories.

In the same manner as in the binding process of FIG. 20, the file system merge processor 36 binds the data at the BDMV directory to the data at the BUDA_BDMV directory using the data of the manifest file contained in the directory for update data of the optical disk 28, namely, contained in the BUD-A_BDMV directory, thereby creating a first virtual file system.

In step S279, the local storage directory manager 63 determines whether there is a directory specified by the corresponding author_id and disc_id on the local storage 24. If it is determined in step S279 that there is no directory specified by the corresponding author_id and disc_id, no further binding process is required. Processing proceeds to step S281.

If it is determined in step S279 that there is a directory specified by the corresponding author_id and disc_id, the local storage directory manager 63 notifies the file system merge processor 36 in step S280 that there is a directory specified by the corresponding author_id and disc_id on the local storage 24. The file system merge processor 36 binds the first virtual file system created in step S278 to the data stored in the directory specified by the corresponding author_id and disc_id on the local storage 24 in the same way as in the binding process described with reference to FIG. 20, thereby creating a second virtual file system.

In step S281, the controller 21 determines whether a command to end the navigation program has been issued. The determination in step S281 is performed if it is determined in step S274 that the process requiring the binding process is not to be performed, or if it is determined in step S276 that there is no directory specified by the corresponding author_id and disc_id, or subsequent to step S277, or if it is determined in step S279 that there is no directory specified by the corresponding author_id and disc_id, or subsequent to step S280.

If it is determined in step S281 that a command to end the navigation program has not been issued, processing returns to step S273 to repeat step S273 and subsequent steps. If it is determined in step S281 that a command to end the navigation program has been issued, processing ends.

If there is no need for copying the data in the BUDA_BDMV directory from the optical disk 28 to the local storage 24, the navigation program performs the binding process and the reproducing process is performed.

As described with reference to FIGS. 23 through 28, the recording and reproducing apparatus 1 records at least a portion of each of the data recorded on the optical disk 11 and the data stored on the local storage 24 to the optical disk 28 loaded on the second drive 27, and then reproduces the data recorded on the optical disk 28.

With the file system applied, a recording and reproducing apparatus can perform editing process. For example, in the editing process, the recording and reproducing apparatus adds, to a disk having recorded content data (such as the optical disk 11), data such as sub path for reproducing AV stream data for displaying update data, such as a picture-in-picture display, in response to a user operation input.

Figure 29:
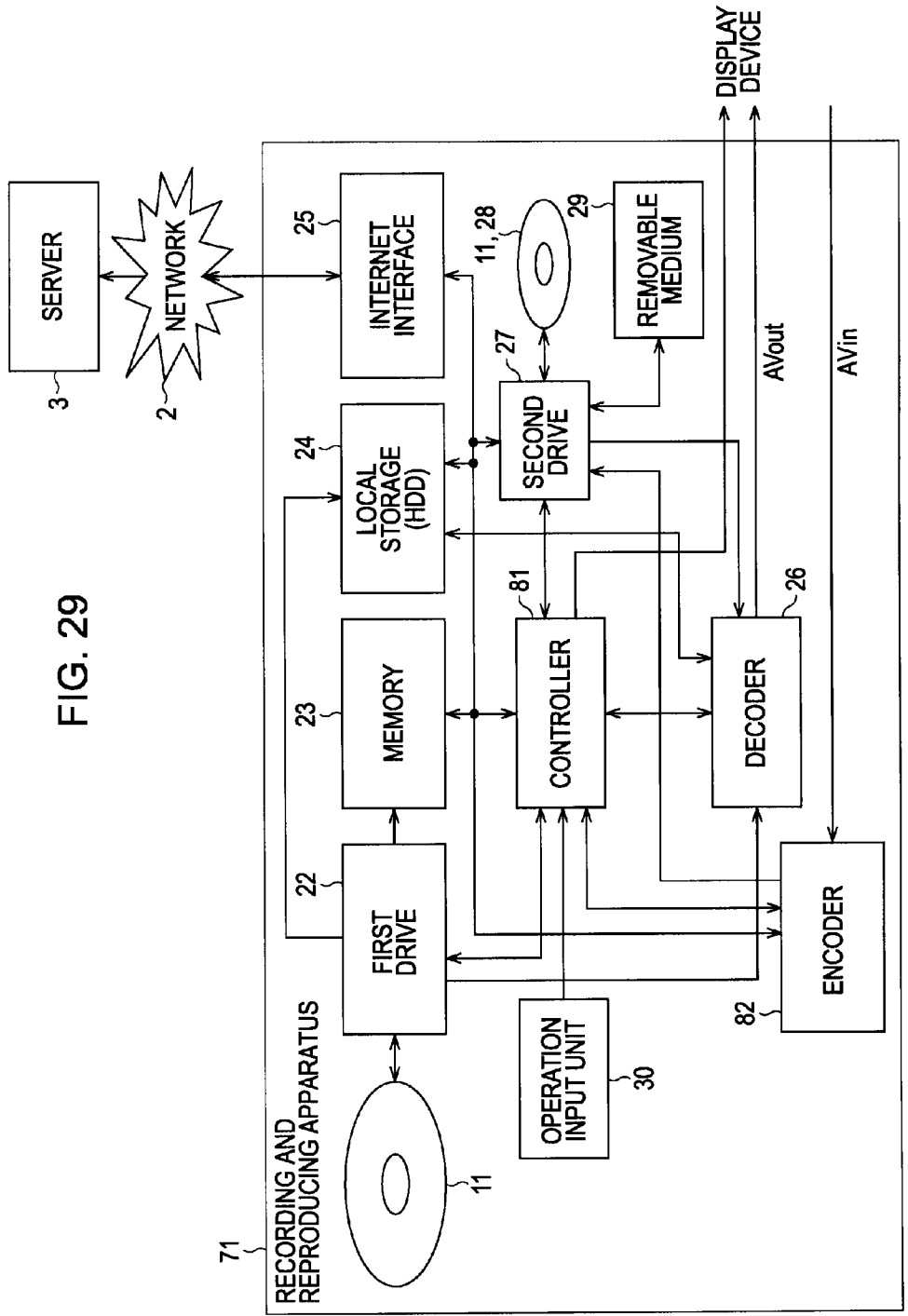
FIG. 29 is a block diagram of a recording and reproducing apparatus different from the apparatus of FIG. 1.

FIG. 29 is a block diagram of a recording and reproducing apparatus 71 that can add update data to content data already recorded on one of the optical disk 11 and the optical disk 28.

Elements identical to those described with reference to FIG. 2 are designated with the same reference numerals and the discussion thereof is omitted.

The recording and reproducing apparatus 71 of FIG. 29 is substantially identical to the recording and reproducing apparatus 1 of FIG. 1 except that a controller 81 instead of the controller 21 and an encoder 82 are included. The controller 81 records update data to content recorded on one of the optical disk 11 and the optical disk 28 loaded on the second drive 27. The encoder 82 encodes uncompressed AV data input from the outside (referred to as AVin) into data in a format supported by one of the optical disk 11 and the optical disk 28. As shown in FIG. 29, one of the optical disk 11 and the optical disk 28 is shown as a recording medium such as an optical disk, which permits not only data reading but also data recording to be performed.

Process of the recording and reproducing apparatus 71 is described below with reference to FIG. 30.

The encoder 82 under the control of the controller 81 encodes the uncompressed data input from the outside, such as 22222.mpls, 04000.clpi, and 04000.m2ts, into data in a data format recordable on the optical disk 11 and the optical disk 28, and then supplies the output data to the second drive 27.

If an extension of the uncompressed data supplied to the encoder 82 is not set, the controller 81 may display a graphic user interface (GUI) on an external display device prompting a user to set an extension of the data or to enter an operation input to set the type of data. In response to the user operation input entered via the operation input unit 30, the controller 81 sets the extension encoded by the encoder 82 to data in a data format recordable on one of the optical disk 11 and the optical disk 28.

The controller 81 sets the file structure of the files 22222.mpls, 04000.clpi, and 04000.m2ts to be additionally recorded on one of the optical disk 11 and the optical disk 28 to be compatible with the above-mentioned format. More specifically, the controller 81 arranges the files 22222.mpls, 04000.clpi, and 04000.m2ts directly under the BUDA_B-DMV directory or in a predetermined folder (a NewData folder in FIG. 30), and generates a manifest file and records the manifest file under the BUDA_BDMV directory.

The second drive 27 under the control of the controller 81 records each encoded file and the generated manifest file under the BUDA_BDMV directory that is set up in parallel with the BDMV directory recorded on the loaded one of the optical disk 11 and the optical disk 28.

In the recording and reproducing apparatus 71, the content data recorded on a first optical disk loaded on the first drive 22 and the updated data entered from the outside and encoded by the encoder 82 may be recorded in the same directory structure on a second optical disk loaded on the second drive 27. In this case, as well, the controller 81 generates a manifest file for managing the update data entered from the outside and encoded by the encoder 82. The generated manifest file is recorded under the BUDA_BDMV directory set in parallel with the BDMV directory together with the update data entered from the outside and encoded by the encoder 82. The author_id and disc_id are read from the first optical disk loaded on the first drive 22 and then recorded on any area on the second disk loaded on the second drive 27.

Furthermore in the recording and reproducing apparatus 71, not only the data supplied from the outside, but also data supplied via the network 2 and acquired through the Internet interface, or data supplied from the removable medium 29 via the second drive 27 may be encoded as necessary and the file format of the these piece of data is set to be compatible with the above-mentioned format. Furthermore, a manifest file is generated. The data and the manifest file are then recorded on one of the optical disk 11 and the optical disk 28 loaded on the second drive 27.

Figure 30:
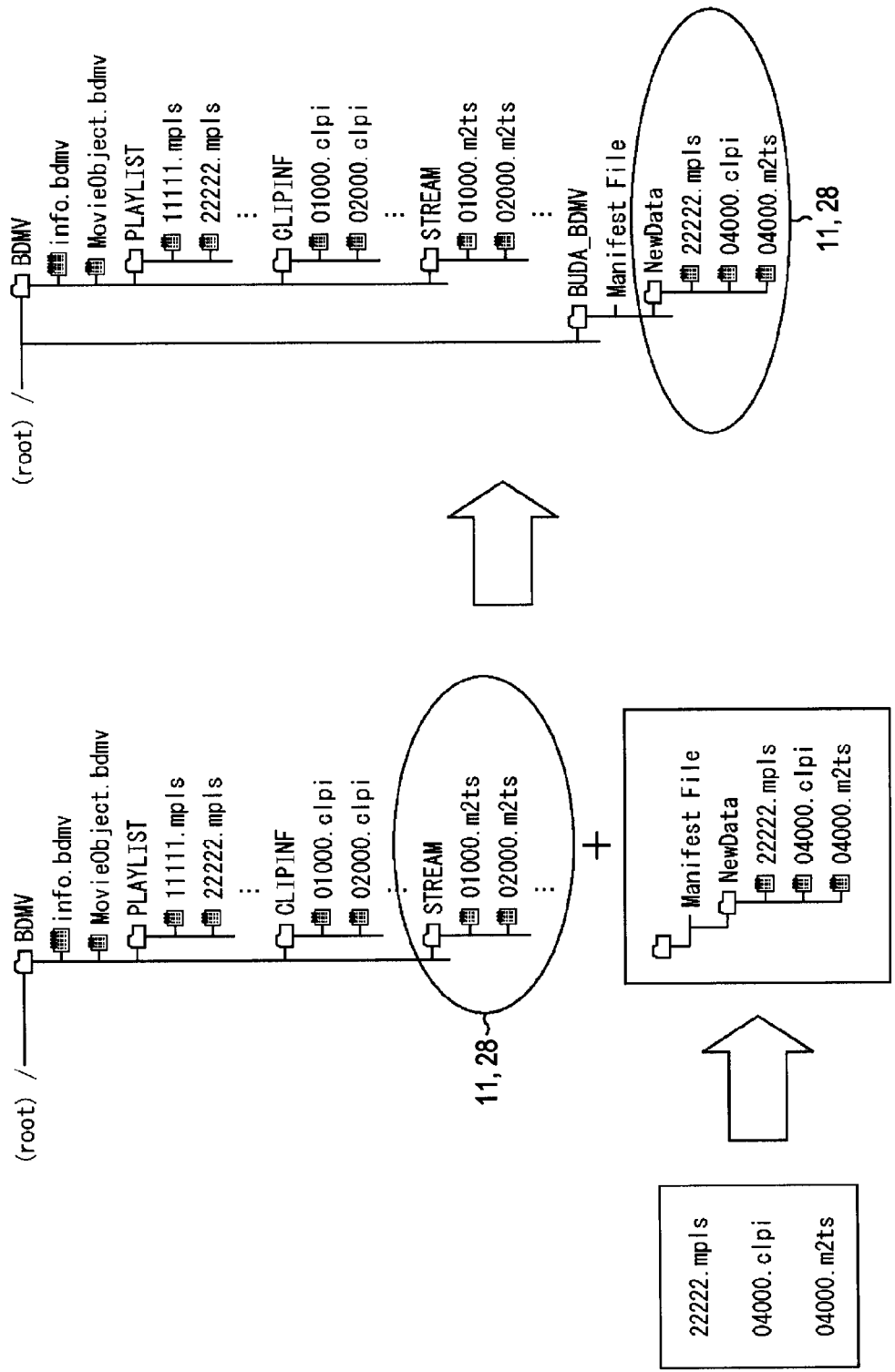
FIG. 30 illustrates a process performed by the recording and reproducing apparatus of FIG. 29.

With reference to FIG. 30, the recording and reproducing apparatus 71 includes the two drives, namely, the first drive 22 for reading the data from the optical disk 11 and the second drive 27 for reading the data from one of the optical disk 11 and the optical disk 28. The number of drives in the recording and reproducing apparatus 71 may be other than two. The recording and reproducing apparatus 71 may include three drives or more. The recording and reproducing apparatus 71 may include at least one drive that can read data from and write data to a recording medium such as an optical disk.

Figure 31:
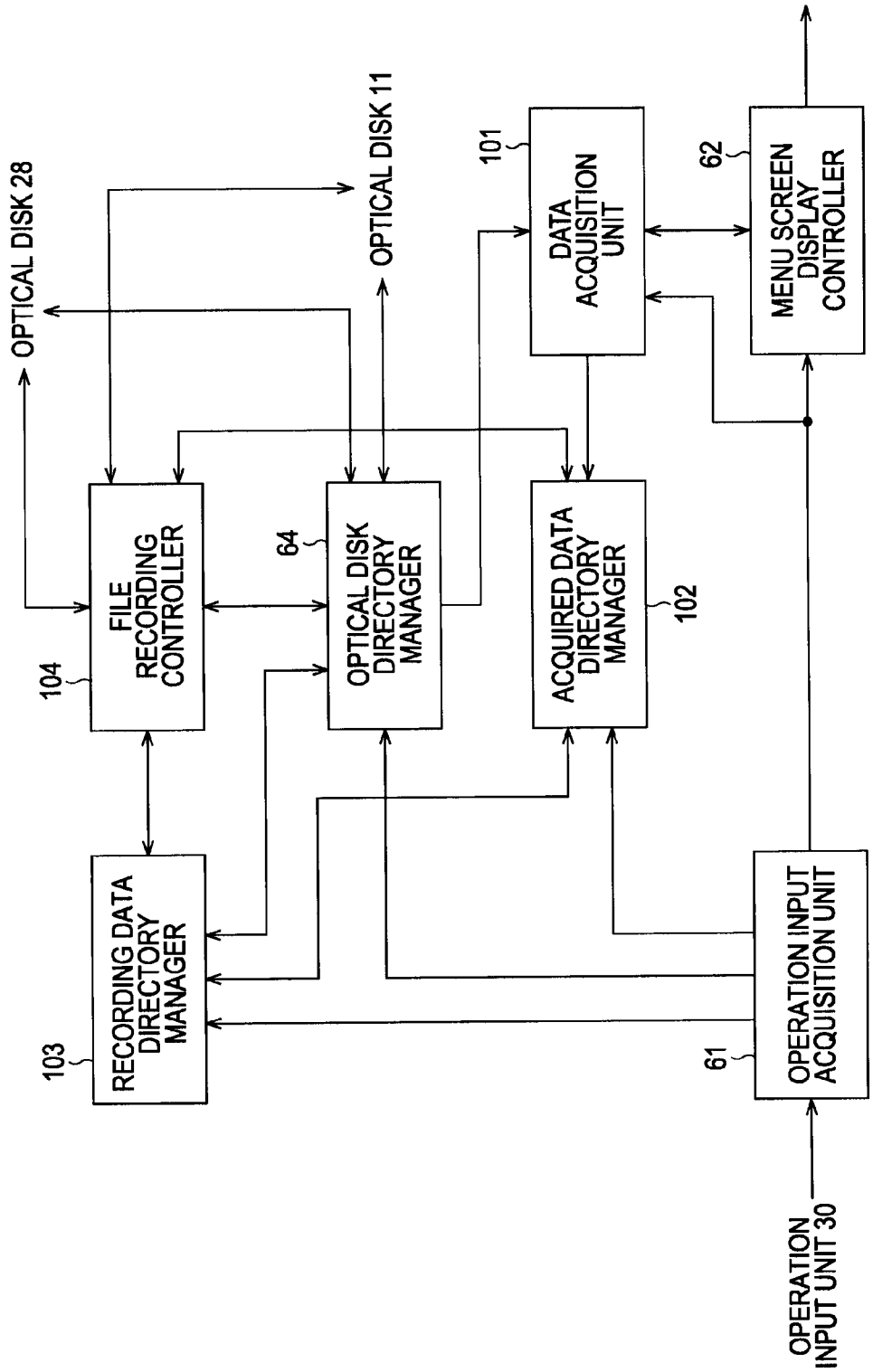
FIG. 31 is a functional block diagram of a function performed by the controller under a program for a content editing process or a process for recording content update data on the optical disk.

FIG. 31 is a functional block diagram of the function of the controller 81 in the recording and reproducing apparatus 71 that performs the program of the process of FIG. 30. In the process, the update data is acquired from the loaded one of the optical disk 11 and the optical disk 28, encoded into data recordable on the one of the optical disk 11 and the optical disk 28 in order to set the directory structure compatible with the format of the above-mentioned format. The corresponding manifest file is generated. The data and the manifest file are recorded on the loaded one of the optical disk 11 and the optical disk 28.

The program is independent of the navigation program, and is executed only when the user issues a command to record the content or to edit the recorded content.

As shown in FIG. 31, elements identical to those described in FIG. 25 are designated with the same reference numerals, and the discussion thereof is omitted herein.

When the program discussed with reference to FIG. 30 is being executed, the controller 81 performs, as shown in FIG. 31, the functions of the operation input acquisition unit 61, the menu screen display controller 62, and the optical disk directory manager 64 basically in the same manner as discussed with reference to FIG. 25 and further the functions of a data acquisition unit 101, an acquired data directory manager 102, a recording data directory manger 103, and a file recording controller 104.

The data acquisition unit 101 controls acquisition of the data supplied from the outside and encoded by the encoder 82, communication performed via the Internet interface 25, and acquisition of data in the course of information exchange of the second drive 27 with the removable medium 29. For example, the data acquisition unit 101 acquires the update file supplied from the outside and encoded by the encoder 82, or the update file downloaded from the server 3 in response to a user instruction, or the update file read from the removable medium 29. The data acquisition unit 101 supplies the acquired file to the second drive 27 while outputting information regarding the acquired data to the acquired data directory manager 102.

As previously discussed with reference to FIG. 30, the acquired data directory manager 102 sets the directory structure of the data acquired by the data acquisition unit 101 and added to one of the optical disk 11 and the optical disk 28 to be compatible with the above-mentioned format. More specifically, the acquired data directory manager 102 sets the acquired data file to be directly under the BUDA_BDMV directory or in a predetermined folder under the BUDA_B-DMV directory (NewData folder in FIG. 30), and outputs information regarding the set directory to the recording data directory manger 103. The acquired data directory manager 102 controls generation of a manifest file for managing the acquired data, and records the manifest file under the BUD-A_BDMV directory.

The recording data directory manger 103 receives, from the optical disk directory manager 64, information regarding the directory structure of the content data pre-recorded on one of the optical disk 11 and the optical disk 28. The recording data directory manger 103 also receives, from the acquired data directory manager 102, information regarding the directory structure of the data to be added to one of the optical disk 11 and the optical disk 28. The recording data directory manger 103 thus manages the directory structure of the content file and the update data to be recorded on one of the optical disk 11 and the optical disk 28.

The update data is supplied to and additionally recorded on the second drive 27 under the control of the data acquisition unit 101 and the manifest file is generated. The file recording controller 104 controls then recording of the update data and the manifest file to one of the optical disk 11 and the optical disk 28 in the directory managed by the recording data directory manger 103.

The content data recorded on the first optical disk loaded on the first drive 22 and the update data to be supplied to and additionally recorded on the second drive 27 under the control of the data acquisition unit 101 are thus recorded on the second disk loaded on the second drive 27. In this case, the file recording controller 104 further controls recording of the content data recorded on the first optical axis loaded on the first drive 22 and the author_id and disc_id on the second optical disk in the directory managed by the recording data directory manger 103.

A content editing process and a recording process performed by the recording and reproducing apparatus 71 are described below with reference to a flowchart of FIG. 32.

In step S311, one of the first drive 22 and the second drive 27 determines whether the first optical disk is loaded. If it is determined in step S311 that the first optical disk is not loaded, step S311 is repeated until if it is determined that the first optical disk is loaded.

When the update data to be added, namely, the update data supplied from the outside and encoded by the encoder 82, and the manifest file managing the update data, are to be recorded on the first optical disk in addition to the content recorded on the first optical disk, the first optical disk is loaded on the second drive 27. In contrast, when the content recorded on the loaded first optical disk, the update data to be added and the manifest file managing the update data are to be recorded on the second optical disk different from the first optical disk, the first optical disk is loaded on the first drive 22 and the second optical disk is loaded on the second drive 27.

If it is determined in step S311 that the first optical disk is loaded, one of the first drive 22 and the second drive 27 reads the author_id and disc_id from the first optical disk and supplies the read author_id and disc_id to the memory 23 in step S312.

In step S313, the controller 81 determines in response to a user operation input supplied from the operation input unit 30 whether the user has issued a command to add and edit the update data on one of the first optical disk and the second optical disk loaded on the second drive 27. If it is determined in step S313 that the command to add and edit the update data is not issued, processing ends.

If it is determined in step S313 that the command to add and edit the update data is issued, the controller 81 executes the program for the function discussed with reference to FIG. 31. In step S314, the data acquisition unit 101 determines whether the data to be added is supplied from the outside and encoded or acquired via the network 2 or from the removable medium 29. If it is determined in step S314 that the data to be added has not been acquired, step S314 is repeated until it is determined that the data to be added has been acquired.

If it is determined in step S314 that the data to be added has been acquired, the data acquisition unit 101 controls in step S315 the supplying of the acquired data to the second drive 27 while outputting information regarding the acquired data to the acquired data directory manager 102. The acquired data directory manager 102 sets the directory structure of the acquired data, and then supplies the directory structure to the recording data directory manger 103. The optical disk directory manager 64 supplies the recording data directory manger 103 with information regarding the directory structure of one of the first optical disk and the second optical disk loaded on the second drive 27, namely, the optical disk serving as a recording destination of the update data. The recording data directory manger 103 produces a directory for the update data, namely, a BUDA_BDMV directory in the directory structure of the optical disk serving as a recording destination of the update data.

In step S316, the file recording controller 104 controls the second drive 27, thereby controls recording of the acquired data to the directory for the update data on the optical disk serving as the recording destination of the update data, namely, one of the first optical disk and the second optical disk loaded on the second drive 27.

When the content recorded on the first optical disk loaded on the first drive 22, the update data input from the outside, and the manifest file managing the update data are recorded on the second optical disk loaded on the second drive 27, different from the first optical disk, the file recording controller 104 reads the content data from the first optical disk loaded on the first drive 22, and controls supplying of the read content data to the second drive 27 and controls the second drive 27 in the recording (copying) the content data to the second optical disk.

In step S317, the acquired data directory manager 102 generates the manifest file managing the data additionally recorded.

In step S318, the file recording controller 104 records the manifest file generated in step S317 to the directory for the update data on the one of the first optical disk and the second optical disk loaded on the second drive 27, namely, to the BUDA_BDMV directory. Processing then ends.

Through the above process, the update data may be further recorded in addition to the content recorded on loaded one of the optical disk 11 and the optical disk 28, and the acquired update data may be recorded on an optical axis together with the content recorded on the loaded one of the optical disk 11 and the optical disk 28.

The user can thus perform the editing process by adding the update data to the optical disk having recorded the content data. More specifically, the user may perform the editing process adding a sub path to an optical disk that has recorded, as a main path, data of a movie and audio. The sub path may display a comment from a movie directory in a picture-in-picture form in synchronization with the movie. The apparatus thus permits the edited content to be reproduced from the optical disk.

The content recorded on the recording medium and the update file stored on the recording and reproducing apparatus or acquired from the outside can thus be recorded on a single recording medium.

Even when the reproducing rate of the updated content recorded on the recording medium is higher than the reading rate of the disk on the recording and reproducing apparatus, the reproducing process may be performed in the same manner as when the update file is pre-recorded on the local storage.

The acquired update data may be further recorded on the recording medium having recorded the content, in other words, may be edited and added on the recording medium.

In the recording and reproducing apparatus 1, the local storage 24, such as a semiconductor, may be removably installed. Data has a content delivery file format that is used when the content author described with reference to FIG. 18 distributes content. Such data may be recorded in the directory structure discussed with reference to FIG. 15 is stored on the removable medium 29 loaded on the second drive 27. With this arrangement, the file system of the data recorded on the removable medium 29 and the file system of the data recorded on the optical disk 11 are bound to each other without the need for storing the data on the local storage 24.

The data recorded on the optical disk 11 and the data recorded on the removable medium 29 are recorded in the file structure discussed with reference to FIG. 23 on the optical disk 28 loaded on the second drive 27 in the same process as previously discussed. When data is reproduced from the optical disk 28, the same process as the one discussed with reference to FIG. 24 is performed.

The content data and the data required to reproduce the content data (such as PlayList, SubPlayItem, the manifest file, etc.) are recorded in the directory structure discussed with reference to FIG. 15 on each of the local storage 24 and the removable medium 29. With the arrangement, the file system of the data recorded on the local storage 24, the file system of the data recorded on the removable medium 29, and the file system of the data recorded on the optical disk 11 may be bound together. In this case, the file system of the data recorded on the local storage 24 and the file system of the data recorded on the optical disk 11 are bound into the first virtual file system, and the file system of the data recorded on the removable medium 29 and the first virtual file system are bound in the second virtual file system.

In this arrangement, the data recorded on the local storage 24 is recorded in the file structure discussed with reference to FIG. 23 on the optical disk 28 loaded on the second drive 27 in the same process as described above in addition to the data recorded on the optical disk 11 and the data recorded on the removable medium 29. When data is reproduced from the optical disk 28, the same process as the one discussed with reference to FIG. 24 is performed.

The program for the controller in the recording and reproducing apparatus to perform the recording process of the content and the update data onto the optical disk may be independent of the navigation program or may be part of the navigation program. The program for the controller in the recording and reproducing apparatus to perform the recording process of the content and the update data onto the optical disk may be recorded together with the content on the optical disk, or may be recorded on one of the internal memory 23 and the local storage 24 of the recording and reproducing apparatus, or may be supplied in the removable medium 29.

The program for the controller in the recording and reproducing apparatus to perform the recording process of the content and the update data onto the optical disk is appropriately supplied taking into consideration the storage capacity of the optical disk and the internal memory of the recording and reproducing apparatus and the size of the navigation program. The program is then performed by the controller of the recording and reproducing apparatus.

In the above description, the data containing the BDMV directory and the BUDA_BDMV directory is recorded on the optical disk 28 loaded on the second drive 27 under the control of the controller 21 and the controller 81 as previously discussed with reference to FIG. 23 or 30. In each of the recording and reproducing apparatuses 1 and 71, such data is recorded on the optical disk 28. Alternatively, such data may be output via the local storage 24 or any other external output terminal (not shown), and then recorded on the optical disk 28 or any other recording medium using an external device.

The content author may record the data containing the BDMV directory and the BUDA_BDMV directory on the recording medium such as the optical disk as previously discussed with reference to FIGS. 23 and 30, and then supply the recording medium to the user as a package medium. The data containing the BDMV directory and the BUDA_BDMV directory on the recording medium such as the optical disk as previously discussed with reference to FIGS. 23 and 30 may be recorded beforehand on the recording medium such as the optical disk, and that recording medium may be installed in one of the recording and reproducing apparatus 1 and the recording and reproducing apparatus 71. In this case, the data under the BUDA_BDMV directory, as part of the data on the recording medium loaded, is copied to the local storage 24 as the internal recording medium in the previously discussed method. The data is then reproduced in synchronization with the data one the recording medium, namely, the data on the BDMV directory. With this arrangement, the reproducing process is performed at a rate higher than the reading rate of the data from the recording medium loaded on the first drive 22.

To reproduce an animation in synchronization with the video and audio of the main path, the data of the video and audio of the main path is recorded under the BDMV directory on the recording medium, and a plurality of sill image data units forming the animation is recorded on the recording medium under the BUDA_BDMV directory. Image tearing can thus be controlled even when the sum of reproducing rates of the video and audio of the main path and the animation is higher than the data transfer rate from the recording medium. Videos of high frame rates may be merged and displayed. In this case, video data of a first frame rate may be recorded under the BDMV directory on the recording medium and video data of a second frame rate may be recorded under the BUDA_BDMV directory on the recording medium. With this arrangement, the video of the first frame rate and the video of the second frame rate may be merged and reproduced even in a reproducing apparatus having a recording medium offering a data reading rate that is not so sufficiently high.

The data containing the BDMV directory and the BUDA_BDMV directory on the recording medium such as the optical disk as previously discussed with reference to FIGS. 23 and 30 may be recorded beforehand on the recording medium such as the optical disk, and that recording medium may be installed in one of the recording and reproducing apparatus 1 and the recording and reproducing apparatus 71. In this case, the sum of the transfer rates of the loaded recording medium and the local storage 24 may be set to be a maximum virtual transfer rate. When the package medium containing the data containing the BDMV directory and the BUDA_BDMV directory is supplied to the user, the reproducing process can be performed at a reproducing rate higher than the transfer rate at which the content data is read from the package medium. The user thus can enjoy more freedom in the setting of the content.

A manufacturing method of an optical disk storing data replayable (the data having the directory structure discussed with reference to FIG. 14, or the data containing the BDMV directory and the BUDA_BDMV directory discussed with reference to FIGS. 23 and 30) on the recording and reproducing apparatus 1 or 71 is described below with reference to FIGS. 33 and 34. As shown, the recording medium is an optical disk, and the recording medium is one of the optical disk 11 and the optical disk 28 of FIG. 1, and the removable medium 29. If the removable medium 29 is not a disk-like recording medium, data replayable on one of the recording and reproducing apparatus 1 and the recording and reproducing apparatus 71 is recorded on the recording medium using any known recording medium manufacturing method.

Figure 33:
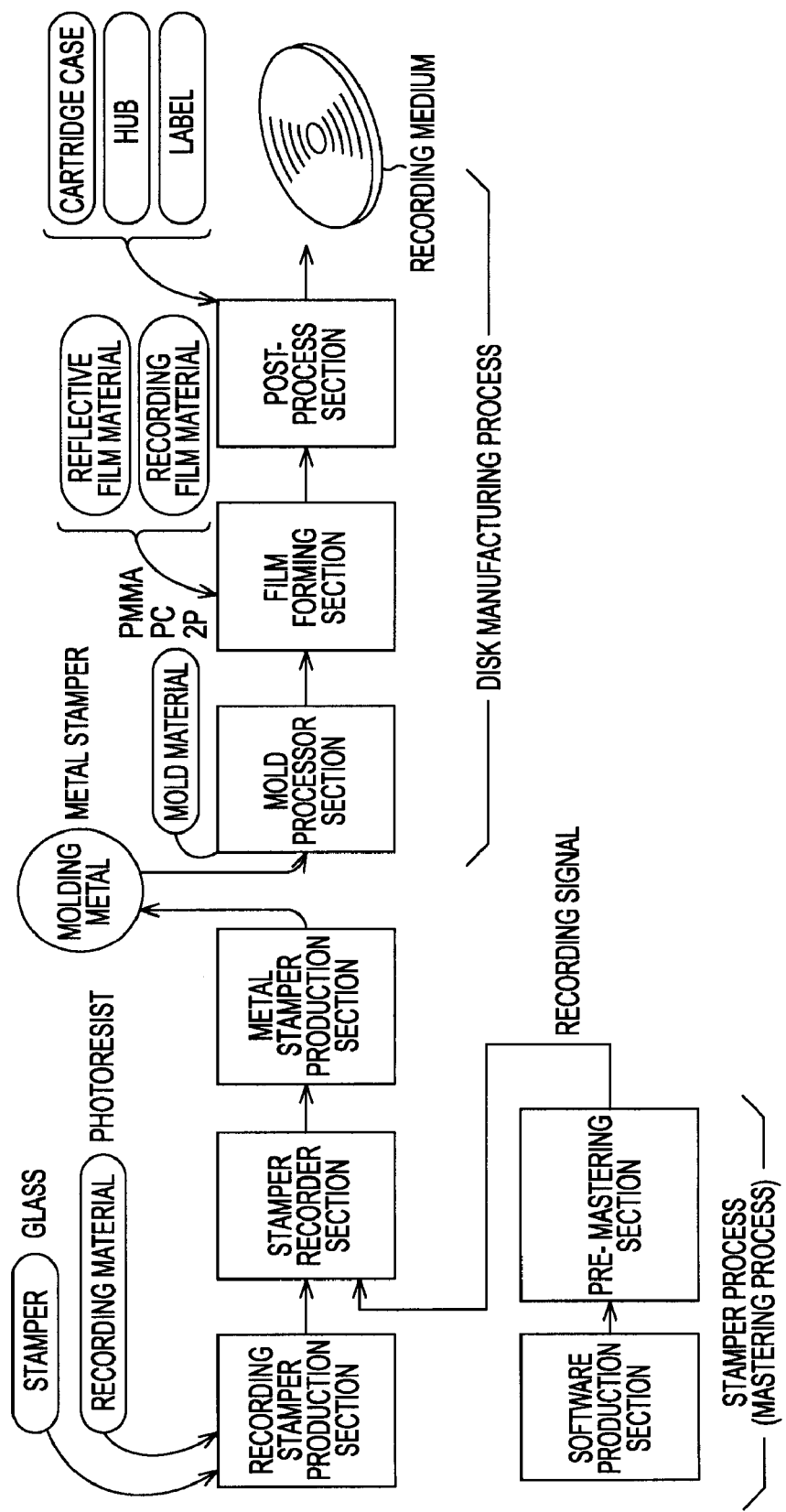
FIG. 33 illustrates a manufacturing process of a recording medium on which the reproducing apparatus has recorded reproducible data.

As shown in FIG. 33, a master disk made of glass is prepared. A recording material made of photoresist or the like is applied on the master disk. The recording master disk thus results.

Figure 34:
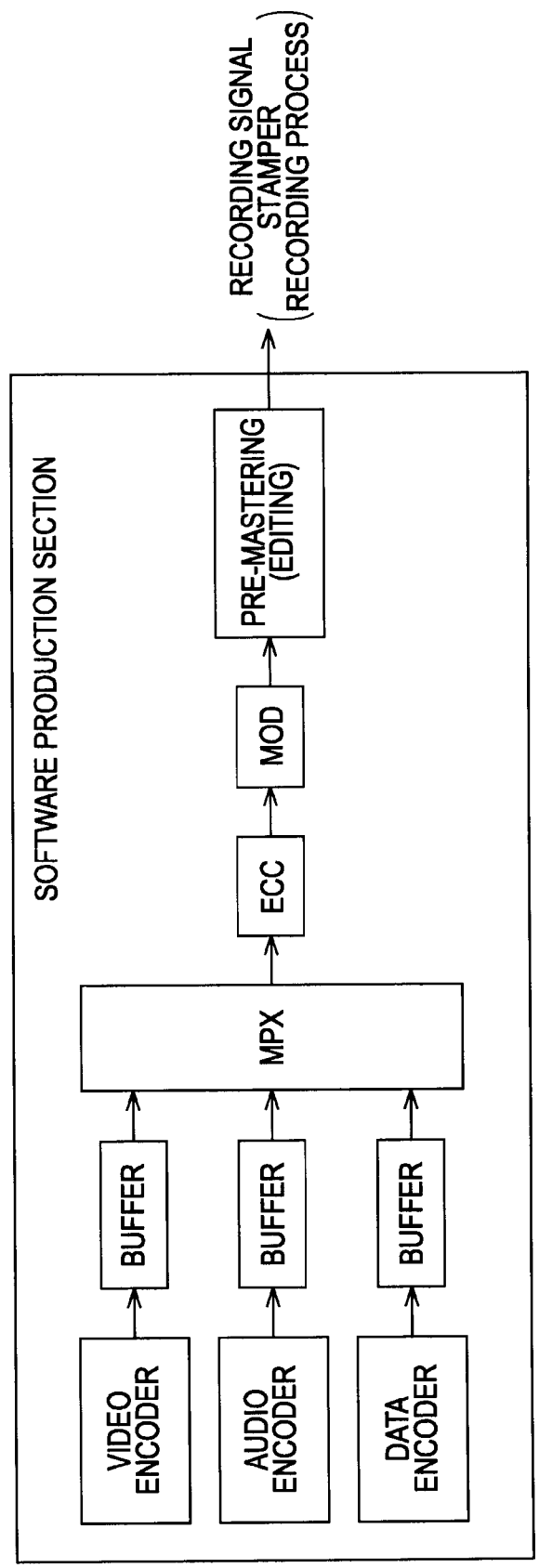
FIG. 34 illustrates a structure of the recording medium on which the reproducing apparatus has recorded the reproducible data.

As shown in FIG. 34, video data in a format replayable on one of the recording and reproducing apparatus 1 and the recording and reproducing apparatus 71 encoded by a video encoder in a software production section is stored temporarily on a buffer. Audio data encoded by an audio encoder is temporarily stored on a buffer. Data other than streams (for example, Indexes, Playlist, PlayItem, etc.) encoded by a data encoder is temporarily stored on a buffer. The video data, the audio data, and the data other than the stream stored on the respective buffers are multiplexed by a multiplexer (MPX) in synchronization with a synchronization signal, and an error correction code (ECC) circuit attaches an error correction code to the multiplexed signal. The resulting signal is modulated by a modulator (MOD) circuit, and then stored on a magnetic tape in accordance with a predetermined format. Thus, a software program is manufactured to be recorded onto one of the optical disk 11, the optical disk 28 and the removable medium 29 replayable on one of the recording and reproducing apparatus 1 and the recording and reproducing apparatus 71.

The software program is edited (pre-mastered) as necessary, and a signal having a format to be recorded on the optical is thus produced. A laser beam is modulated In accordance with the recording signal, and then directed to the photoresist on the master disk. The photoresist on the master disk is thus exposed to the laser beam modulated with the recording signal.

The master disk is then developed, and pits are arranged on the master disk. The master disk is then subjected to electroforming to manufacture a metal master disk into which the pits of the glass master disk are transferred. From the metal master disk, a metal stamper is produced and used as a mold.

A material such as PMMA (acryl) or PC (polycarbonate) is injected into the mold and solidified. Alternatively, after applying 2P (ultraviolet curing resin) on the metal stamper, ultraviolet light is directed to the metal stamper for curing. In this way, the pits on the metal stamper are transferred to a replica made of the resin.

A reflective film is formed on thus constructed replica using deposition or sputtering technique. Alternatively, a reflective film is formed on the replica using spin coating technique.

The inner circular edge and the outer circular edge of the disk is then neatly shaped and a process required to bond two disks together is also performed. Further, a label is glued on the disk and a hub is attached to the disk, and the resulting disk is inserted into a cartridge. The optical disk 11, the optical disk 28 or the removable medium 29 having data replayable on one of the recording and reproducing apparatus 1 and the recording and reproducing apparatus 71 are thus manufactured.

In the above discussion, each of the recording and reproducing apparatus 1 and the recording and reproducing apparatus 71 can reproduce data from and record data to an optical disk. The recording process discussed above may be performed a recording apparatus that can perform only the recording process. The reproducing processed discussed above may be performed by a reproducing apparatus that can perform only the reproducing apparatus.

The above-referenced series of process steps may be performed using software. A program of the software may be installed from a recording medium onto a computer built in dedicated hardware or a general-purpose personal computer enabled to perform a variety of functions with a variety of programs installed thereon.

As shown in FIG. 1 or 29, the recording medium includes the removable medium 29 distributed to a user separate from a computer to provide the user with the program. The recording media include the removable medium 29, such as one of a magnetic disk (including a flexible disk), an optical disk (such as compact disk read-only memory (CD-ROM)), or digital versatile disk (DVD)), a magneto-optical disk (such as mini-disk (MD®), and a semiconductor memory. The recording media also include the memory 23, such a ROM or a RAM, or the local storage 24 such as a hard disk, each storing the program and supplied in the apparatus to the user.

The process steps describing the program stored on the recording medium may be performed in the time-series order sequence as previously stated. Alternatively, the process steps may be performed in parallel or separately.

In this description, the system refers to an entire apparatus including a plurality of units.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a reading unit configured to read data from a recording medium loaded in the apparatus;
   a storage unit configured to store a variety of types of data;
   a control unit configured to control setting of a directory structure when a first data group recorded on a first recording medium loaded and a second data group recorded on the storage unit are recorded on a second recording medium different from the first recording medium, the control unit including:
      a first detecting unit configured to detect a directory structure of the first data group recorded on the first recording medium;
      a second detecting unit configured to detect a directory structure of the second data group recorded on the storage unit; and
      a setting unit configured to set a directory structure in accordance with which the first data group read by the reading unit from the first recording medium and the second data group stored on the storage unit are recorded on the second recording medium, the setting unit configured to set the directory structure on the second recording medium by setting a first directory with the directory structure of the first data group detected by the first detecting unit maintained, and to set a second directory in parallel with the first directory so that the directory structure of the second data group detected by the second detecting unit is contained in the second directory, the setting unit configured to record the first data group in the first directory and the second data group in the second directory on the second recording medium, the first recording medium and the second recording medium being separate removable optical recording media.

2. The information processing apparatus according to claim 1, wherein the reading unit reads, from the first recording medium, identification information for use in uniquely identifying the first recording medium, and wherein the second data group is recorded in a directory identifiable by the identification information on the storage unit.

3. The information processing apparatus according to claim 1, further comprising a recording unit configured to record, on the second recording medium loaded, the first data group and the second data group with the setting of the directory structure thereof controlled by the control unit.

4. The information processing apparatus according to claim 3, wherein the reading unit reads, from the first recording medium, identification information for use in uniquely identifying the first recording medium, and wherein the recording unit records on the second recording medium the identification information read by the reading unit.

5. The information processing apparatus according to claim 1, wherein the storage unit stores thereon file management information, the file management information containing first information indicating a path of a file in the directory structure of the second data group stored on the storage unit, and second information indicating a path of a file in a virtual file system of the second data group, and wherein the control unit controls the setting of the directory structure in accordance with which the file management information is recorded on the second recording medium together with the first data group and the second data group.

6. The information processing apparatus according to claim 1, wherein the reading unit reads, from the second recording medium loaded, the first data group, the second data group and file management information, wherein the file management information contains first information indicating a path of a file in the directory structure of the second data group stored on the storage unit, and second information indicating a path of a file in a virtual file system of the second data group, and wherein the control unit comprises: storage control unit for controlling storage of the second data group, read by the reading unit from the second recording medium, onto the storage unit; and virtual file system generating unit for generating the virtual file system, containing at least a portion of each of the first data group and the second data group, in accordance with the directory structure of the first data group detected by the first detecting unit and the file management information read by the reading unit from the second recording medium.

7. The information processing apparatus according to claim 6, further comprising a reproducing unit configured to reproduce, in accordance with the virtual file system generated by the virtual file system generating unit, the first data group read by the reading unit and the second data group that is stored on the storage unit under the control of the storage control unit.

8. The information processing apparatus according to claim 1, further comprising an output unit configured to output the first data group and the second data group with the directory structures thereof set under the control of the control unit.

9. An information processing method of an information processing apparatus setting a directory structure in accordance with which a first data group recorded on a first recording medium loaded and a second data group recorded on a storage unit are recorded on a second recording medium, the information processing method comprising:

setting a first directory of the second recording medium with a directory structure of the first data group recorded on the first recording medium;

copying the first data group read from the first recording medium into the first directory;

setting a second directory of the second recording medium in parallel with the first directory, the second directory containing data to be copied to a recording unit of the apparatus that reproduces data recorded on the second recording medium; and setting the directory structure of the second recording medium so that the second data group read from the storage unit is contained in the second directory, the setting including recording the first data group in the first directory and the second data group in the second directory on the second recording medium, the first recording medium and the second recording medium being separate removable optical recording media.

10. A computer readable medium including computer executable instructions, wherein the instructions, when executed by a processor, cause the processor to perform a method to set a directory structure in accordance with which a first data group recorded on a first recording medium loaded and a second data group recorded on a storage unit are recorded on a second recording medium, the method comprising:

setting a first directory of the second recording medium with a directory structure of the first data group recorded on the first recording medium;

copying the first data group read from the first recording medium into the first directory; setting a second directory of the second recording medium in parallel with the first directory, the second directory containing data to be copied to a recording unit of the apparatus that reproduces data recorded on the second recording medium; and setting the directory structure of the second recording medium so that the second data group read from the storage unit is contained in the second directory, the setting including recording the first data group in the first directory and the second data group in the second directory on the second recording medium, the first recording medium and the second recording medium being separate removable optical recording media.

11. The information processing apparatus according to claim 1, wherein the storage unit is a hard disk drive.

\* \* \* \* \*